US012803769B2

(12) United States Patent
Abdelghaffar et al.

(10) Patent No.: US 12,803,769 B2
(45) Date of Patent: Nov. 17, 2026

(54) TRANSMISSION SCHEMES IN SUB-BAND FULL DUPLEX (SBFD) RESOURCES

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US); Abdelrahman Mohamed Ahmed Mohamed Ibrahim, San Diego, CA (US); Ahmed Attia Abotabl, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 287 days.

(21) Appl. No.: 18/620,160

(22) Filed: Mar. 28, 2024

(65) Prior Publication Data

US 2025/0310072 A1 Oct. 2, 2025

(51) Int. Cl.

| | |
|---|---|
| ***H04L 5/14*** | (2006.01) |
| ***H04W 72/0453*** | (2023.01) |
| ***H04W 72/1273*** | (2023.01) |
| ***H04W 72/231*** | (2023.01) |
| ***H04W 76/20*** | (2018.01) |

(52) U.S. Cl.

CPC ........... *H04L 5/14* (2013.01); *H04W 72/0453* (2013.01); *H04W 72/1273* (2013.01); *H04W 72/231* (2023.01); *H04W 76/20* (2018.02)

(58) Field of Classification Search

None

See application file for complete search history.

(56) References Cited

U.S. PATENT DOCUMENTS

| | | | | |
|---|---|---|---|---|
| 2025/0048389 | A1 * | 2/2025 | Rudolf | H04W 72/232 |
| 2025/0055660 | A1 * | 2/2025 | Rudolf | H04L 5/0035 |

FOREIGN PATENT DOCUMENTS

| | | | | |
|---|---|---|---|---|
| WO | WO-2024073330 A1 * | 4/2024 | | H04W 72/1268 |
| WO | WO-2024181417 A1 * | 9/2024 | | H04W 72/1263 |

* cited by examiner

*Primary Examiner* — Peter P Chau

(74) *Attorney, Agent, or Firm* — ARENTFOX SCHIFF, LLP

(57) ABSTRACT

Aspects of the disclosure are directed to methods and techniques for wireless communication between a half-duplex user equipment (UE) and a base station comprising multiple transmission/reception points (mTRPs). In one example, the UE may fall back from an mTRP communication scheme to a single-TRP (sTRP) communication scheme. Here, the UE may go from receiving downlink signaling from mTRPs during a non-subband full-duplex (non-SBFD) downlink symbol (e.g., as part of a downlink TDD slot) to receiving a downlink signal from a single TRP during an SBFD downlink symbol.

30 Claims, 30 Drawing Sheets

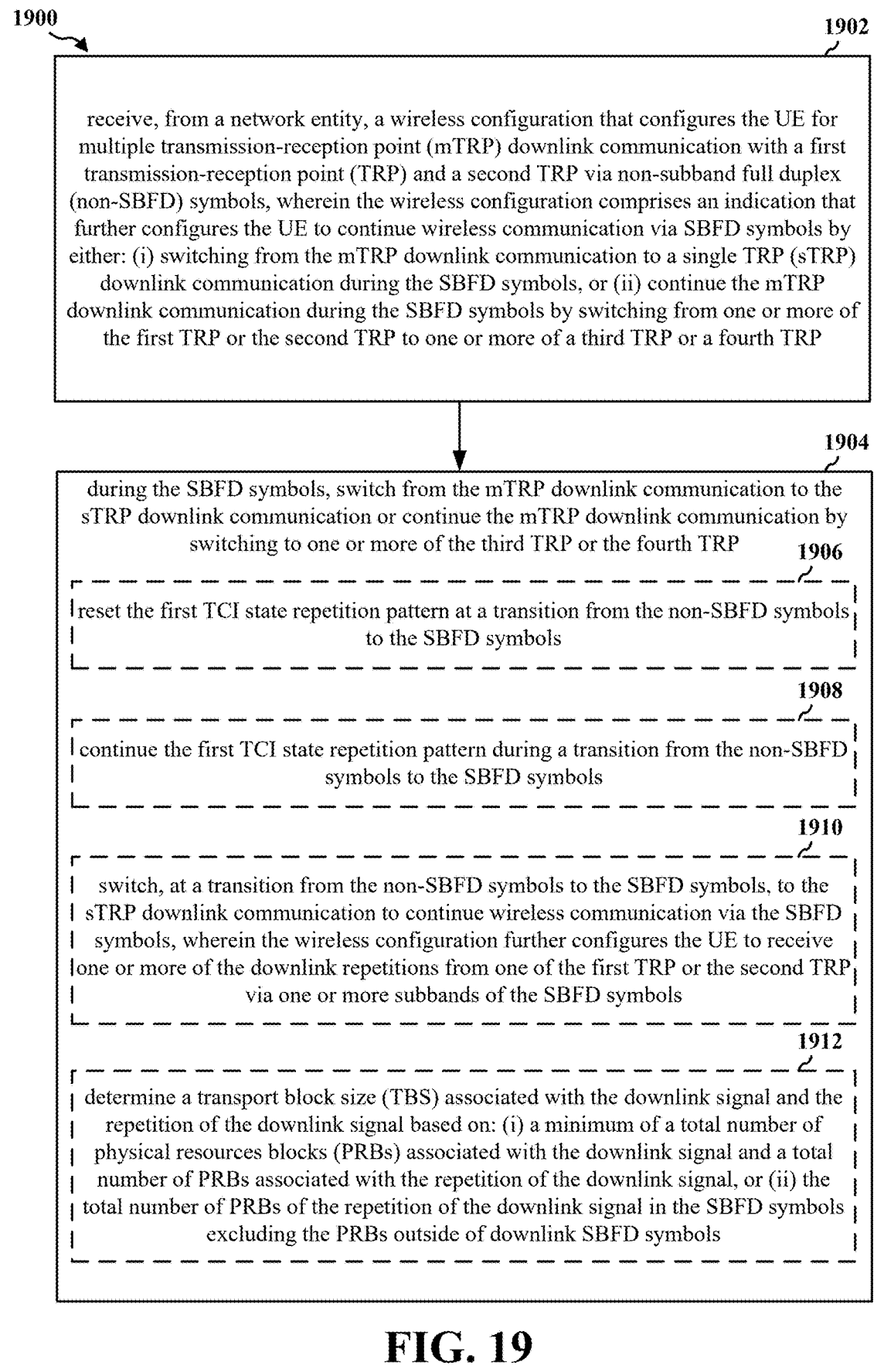

1900

1902 receive, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP

1904 during the SBFD symbols, switch from the mTRP downlink communication to the sTRP downlink communication or continue the mTRP downlink communication by switching to one or more of the third TRP or the fourth TRP

1906 reset the first TCI state repetition pattern at a transition from the non-SBFD symbols to the SBFD symbols

1908 continue the first TCI state repetition pattern during a transition from the non-SBFD symbols to the SBFD symbols

1910 switch, at a transition from the non-SBFD symbols to the SBFD symbols, to the sTRP downlink communication to continue wireless communication via the SBFD symbols, wherein the wireless configuration further configures the UE to receive one or more of the downlink repetitions from one of the first TRP or the second TRP via one or more subbands of the SBFD symbols

1912 determine a transport block size (TBS) associated with the downlink signal and the repetition of the downlink signal based on: (i) a minimum of a total number of physical resources blocks (PRBs) associated with the downlink signal and a total number of PRBs associated with the repetition of the downlink signal, or (ii) the total number of PRBs of the repetition of the downlink signal in the SBFD symbols excluding the PRBs outside of downlink SBFD symbols

FIG. 19

TRANSMISSION SCHEMES IN SUB-BAND FULL DUPLEX (SBFD) RESOURCES

BACKGROUND

Technical Field

The present disclosure generally relates to communication systems, and more particularly, to communications between wireless nodes via sub-band full duplex (SBFD) resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the disclosure are directed to a method of wireless communication at a user equipment (UE). In some examples, the method includes receiving, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the method includes, during the SBFD symbols, switching from the mTRP downlink communication to the sTRP downlink communication or continue the mTRP downlink communication by switching to one or more of the third TRP or the fourth TRP.

Aspects of the disclosure are directed to a method of wireless communication at base station. In some examples, the method includes transmitting, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the method includes, during the SBFD symbols, switching from the mTRP downlink communication to the sTRP downlink communication or continue the mTRP downlink communication by switching to one or more of the third TRP or the fourth TRP.

Aspects of the disclosure are directed to an apparatus configured for wireless communication. In some examples, the apparatus includes means for receiving, from a network entity, a wireless configuration that configures the apparatus for multiple transmission-reception point (mTRP) downlink communication with a first transmission-reception point (TRP) and a second TRP via non-subband full duplex (non-SBFD) symbols, wherein the wireless configuration comprises an indication that further configures the apparatus to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the apparatus includes, during the SBFD symbols, means for switching from the mTRP downlink communication to the sTRP downlink communication or continue the mTRP downlink communication by switching to one or more of the third TRP or the fourth TRP.

Aspects of the disclosure are directed to an apparatus configured for wireless communication. In some examples, the apparatus includes means for transmitting, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the apparatus includes, during the SBFD symbols, means for switching from the mTRP downlink communication to the sTRP downlink communication or continue the mTRP downlink communication by switching to one or more of the third TRP or the fourth TRP.

Aspects of the disclosure are directed to a user equipment (UE) comprising one or more memories, individually or in combination, having instructions, and one or more processors, individually or in combination, configured to execute the instructions. In some examples, the one or more processors are configured to receive, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the one or more processors are configured to, during the SBFD symbols, switch from the mTRP downlink communication to the sTRP downlink communication or continue the mTRP downlink communication by switching to one or more of the third TRP or the fourth TRP.

Aspects of the disclosure are directed to a base station comprising one or more memories, individually or in combination, having instructions, and one or more processors, individually or in combination, configured to execute the instructions. In some examples, the one or more processors are configured to transmit, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the one or more processors are configured to, during the SBFD symbols, switch from the mTRP downlink communication to the sTRP downlink communication or continue the mTRP downlink communication by switching to one or more of the third TRP or the fourth TRP.

Aspects of the disclosure are directed to a non-transitory, computer-readable medium comprising computer executable code. The code when executed by one or more processors causes the one or more processors to, individually or in combination, perform an operation at a user equipment (UE). In some examples, the operation includes receiving, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the operation includes, during the SBFD symbols, switching from the mTRP downlink communication to the sTRP downlink communication or continue the mTRP downlink communication by switching to one or more of the third TRP or the fourth TRP.

Aspects of the disclosure are directed to a non-transitory, computer-readable medium comprising computer executable code. The code when executed by one or more processors causes the one or more processors to, individually or in combination, perform an operation at base station. In some examples, the operation includes transmitting, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the operation includes, during the SBFD symbols, switching from the mTRP downlink communication to the sTRP downlink communication or continue the mTRP downlink communication by switching to one or more of the third TRP or the fourth TRP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 19 is a flowchart illustrating a method of wireless communication.

DETAILED DESCRIPTION

Figure 1:
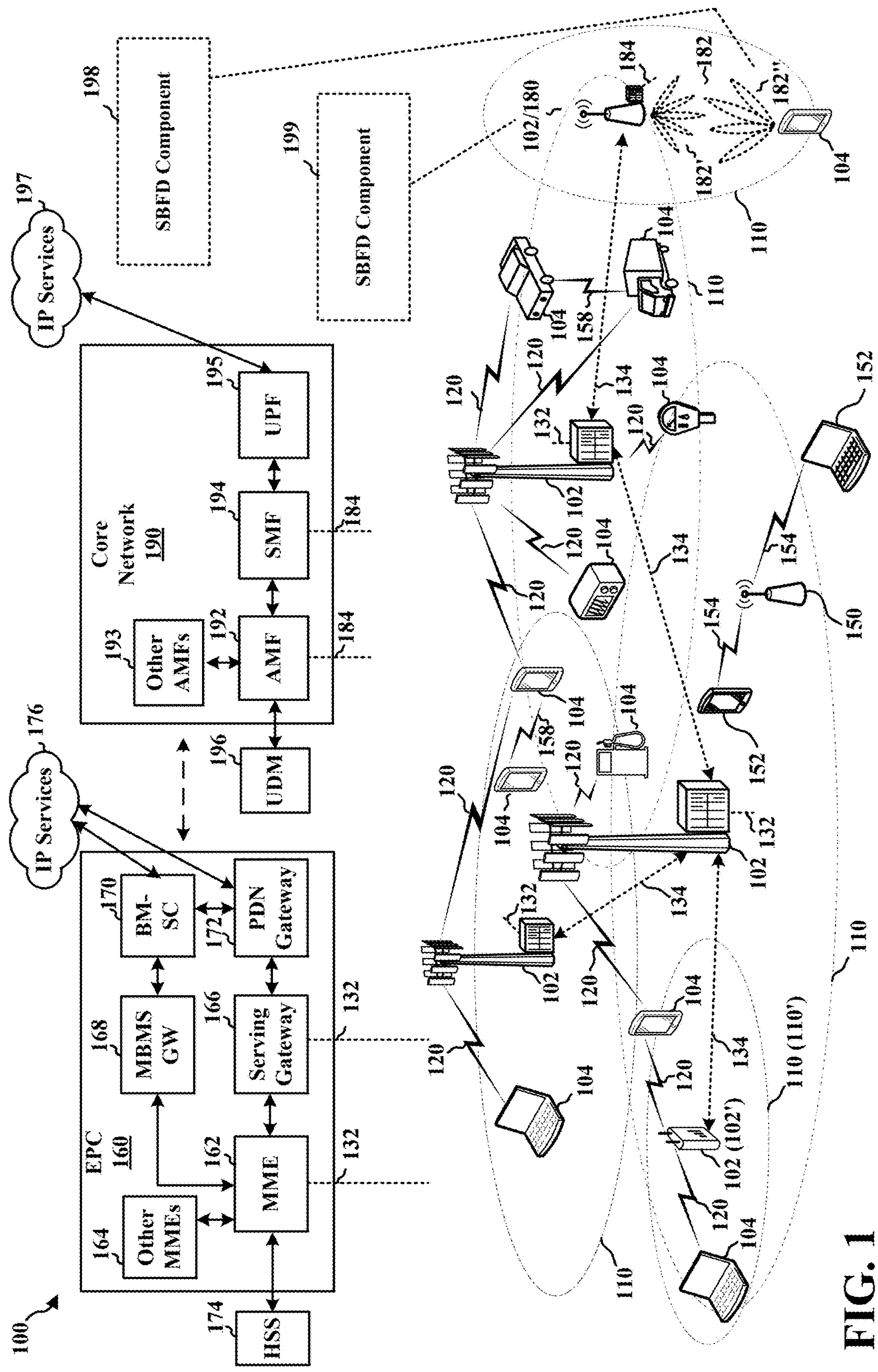
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a multiple transmission reception point (mTRP) network, a user equipment (UE) may communicate with multiple TRPs. In some examples, a disaggregated base station may have multiple TRPs associated with it, where the multiple TRPs are in different locations. mTRP communications may include transmitting the same downlink transmissions from each of the mTRPs to improve reliability of the UE receiving the downlink data or transmitting multiple layers from different TRPs to improve the capacity. Such mTRP communications may be based on single downlink control information (sDCI) messaging or multi-DCI (mDCI) messaging, and may be performed via time-division multiplexing (TDM), frequency-division multiplexing (FDM), single frequency network (SFN), and/or spatial-division multiplexing (SDM). In order to improve uplink coverage and reduce latency between the UE and mTRPs, the network may designate some of the symbols used for communication as sub-band full duplex (SBFD) symbols. For example, an SBFD symbol may include an uplink subband and a downlink subband to provide both uplink and downlink opportunities using the same time resources. However, each of the mTRPs, on its own, may not be capable of the simultaneous uplink reception and downlink transmission associated with an SBFD symbol. Accordingly, in some examples, a first TRP may perform the downlink transmission via the downlink subband of an SBFD symbol while a second TRP performs the uplink reception via the uplink subband of the SBFD symbol. In this manner, the base station of which the mTRPs are a part, is an SBFD-capable base station.

A challenge for effectively enabling full duplex at a base station that uses multiple TRPs is the handling of self-interference and cross-link interference. Thus, in some examples, the base station may be configured as a disaggregated base station having multiple TRPs that are spatially isolated and physically separated from each other. The large spatial isolation may reduce or eliminate the need for electronic signal isolators (e.g., electro-magnetic isolators) or reduce the requirement of digital interference mitigation or cancellation. Accordingly, a physical distance between TRPs may provide enough isolation to manage any inter-TRP interference resulting from full duplex communications. Thus, the base station may utilize multiple TRPs to perform full-duplex communications.

However, the UE may be configured as a half-duplex UE. That is, the UE may not be capable of transmitting an uplink signal while receiving a downlink signal at the same time as provided in an SBFD symbol. Thus, there needs to be a method of communication in an mTRP communication scheme that allows the UE to continue communications with one or more of the TRPs during an SBFD symbol.

Thus, aspects of the disclosure are directed to several methods and techniques for communication. In one example, the UE may fallback from the mTRP communication scheme to a single-TRP (sTRP) communication scheme. Here, the UE may go from receiving downlink signaling from mTRPs during a downlink symbol (e.g., as part of a downlink TDD slot) to receiving a downlink signal (e.g., via the downlink subband(s)) from a single TRP during an SBFD symbol.

In certain aspects, the UE may continue to operate in the mTRP communication scheme during an SBFD symbol but may switch from one or more of the current TRPs to another one or more TRPs. For example, the UE may receive downlink signaling from a first TRP and a second TRP during a downlink symbol (e.g., as part of a downlink TDD slot), then switch from the first TRP to a third TRP during an SBFD symbol so that the UE continues to receive mTRP downlink signaling during the SBFD symbol.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHZ-300 GHz) which is identified by the International Telecommunications Union (ITU) as a “millimeter wave” band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “millimeter wave” or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity.

Referring again to FIG. 1, the UE 104 may include an SBFD component 198. As described in more detail elsewhere herein, the SBFD component 198 may be configured to receive, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. The SBFD component 198 may be further configured to, during the SBFD symbols, switch from the mTRP downlink communication to the sTRP downlink communication or continue the mTRP downlink communication by switching to one or more of the third TRP or the fourth TRP. Additionally, or alternatively, the SBFD component 198 may perform one or more other operations described herein.

The base station 102/180 may include an SBFD component 199. As described in more detail elsewhere herein, the SBFD component 199 may be configured to transmit, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. In some examples, the SBFD component 199 may be configured to, during the SBFD symbols, switch from the mTRP downlink communication to the sTRP downlink communication or continue the mTRP downlink communication by switching to one or more of the third TRP or the fourth TRP. Additionally, or alternatively, the SBFD component 199 may perform one or more other operations described herein.

Figure 2A:
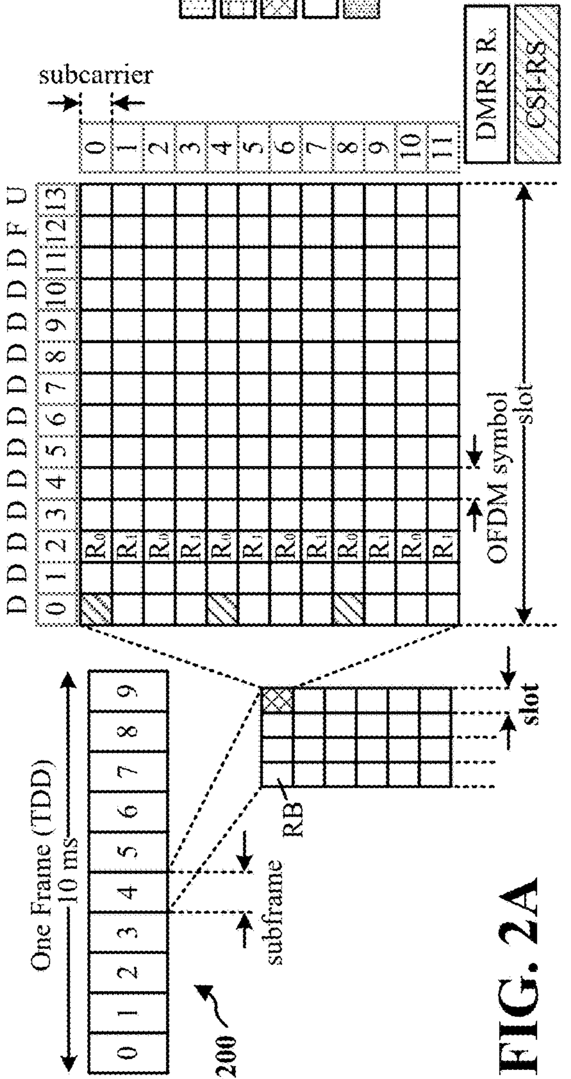
FIG. 2A is a diagram illustrating an example of a first frame, in accordance with various aspects of the present disclosure.
Figure 2B:
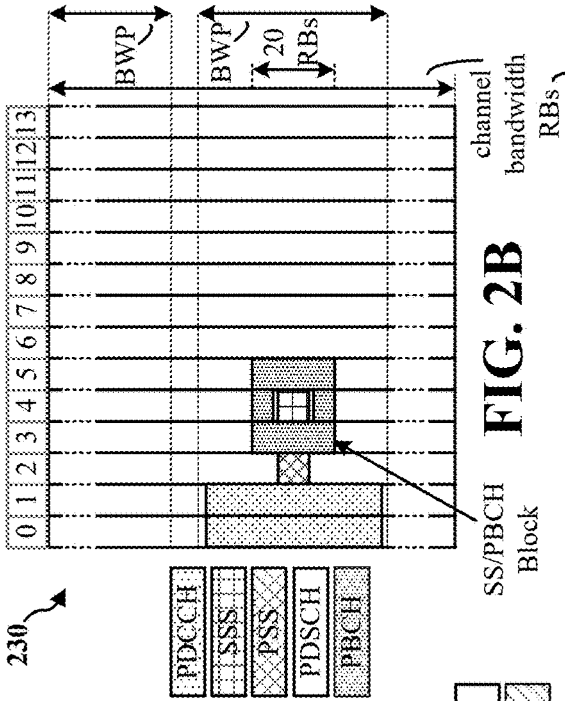
FIG. 2B is a diagram illustrating an example of DL channels within a subframe, in accordance with various aspects of the present disclosure.
Figure 2C:
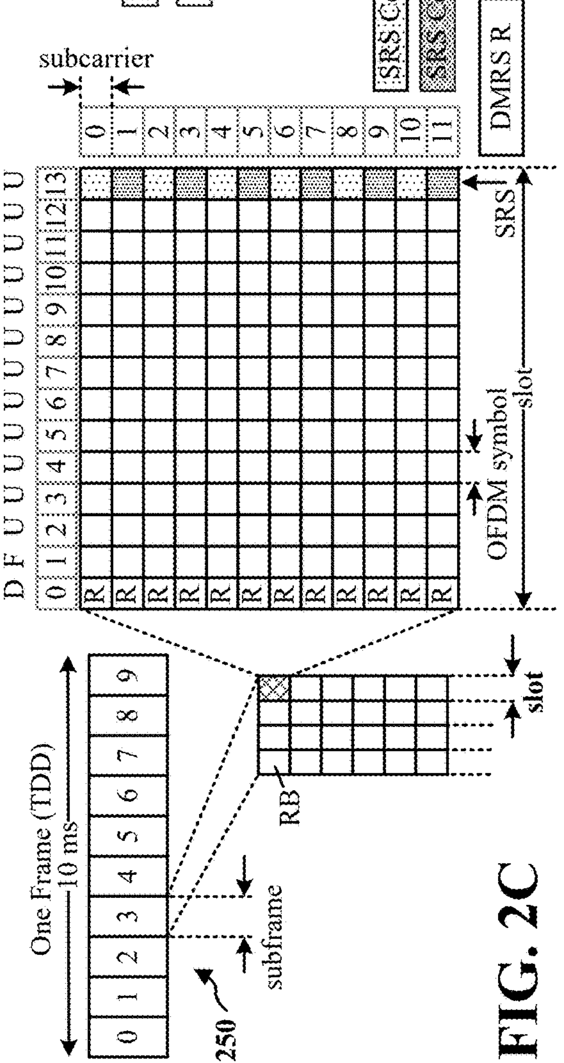
FIG. 2C is a diagram illustrating an example of a second frame, in accordance with various aspects of the present disclosure.
Figure 2D:
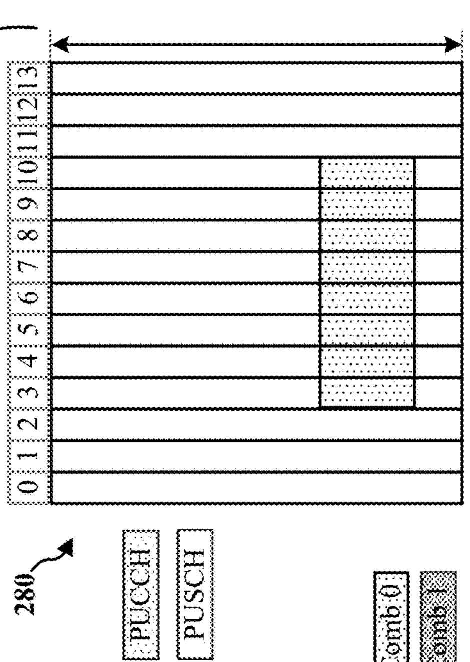
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
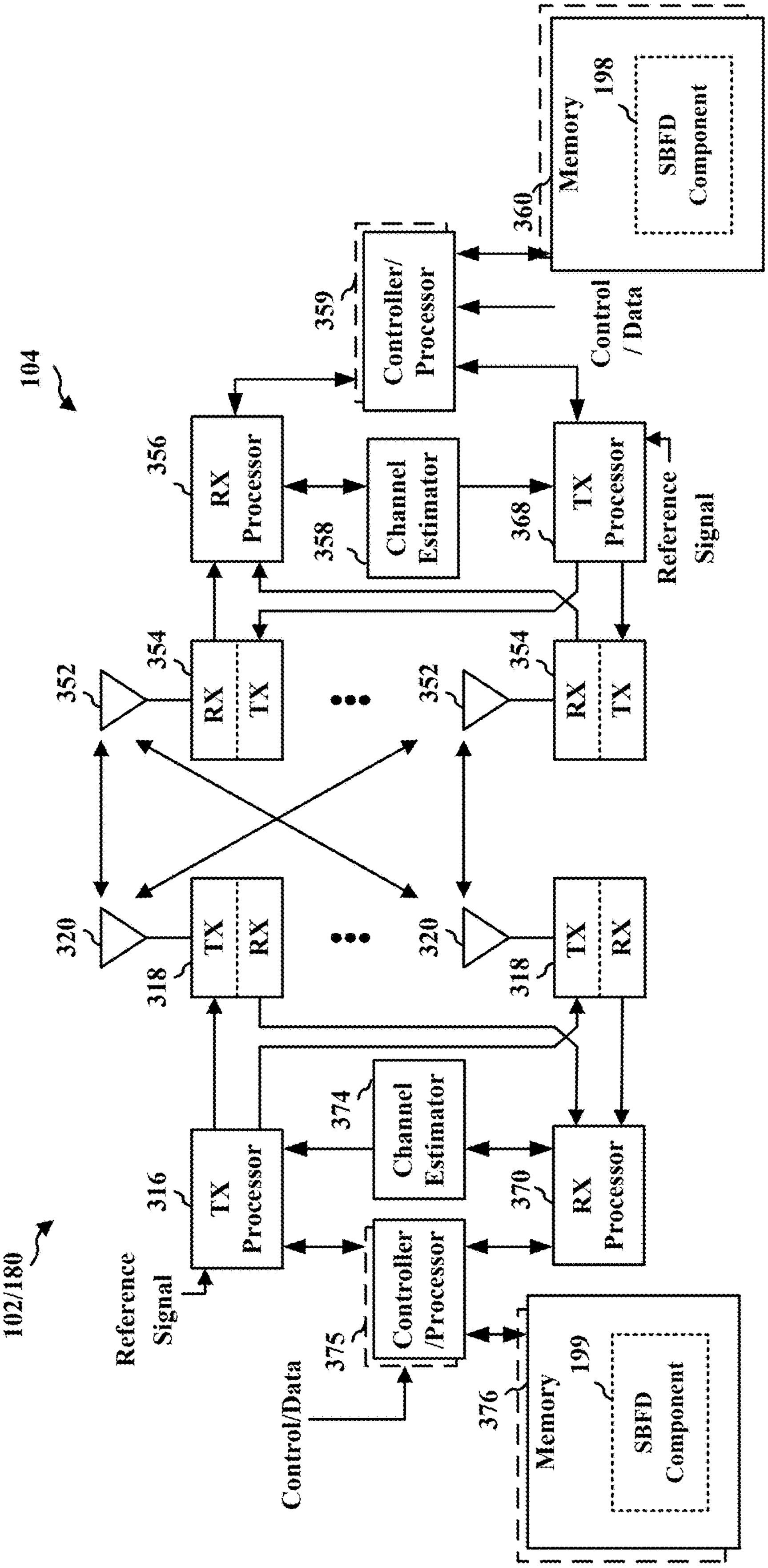
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to one or more controller/processors 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
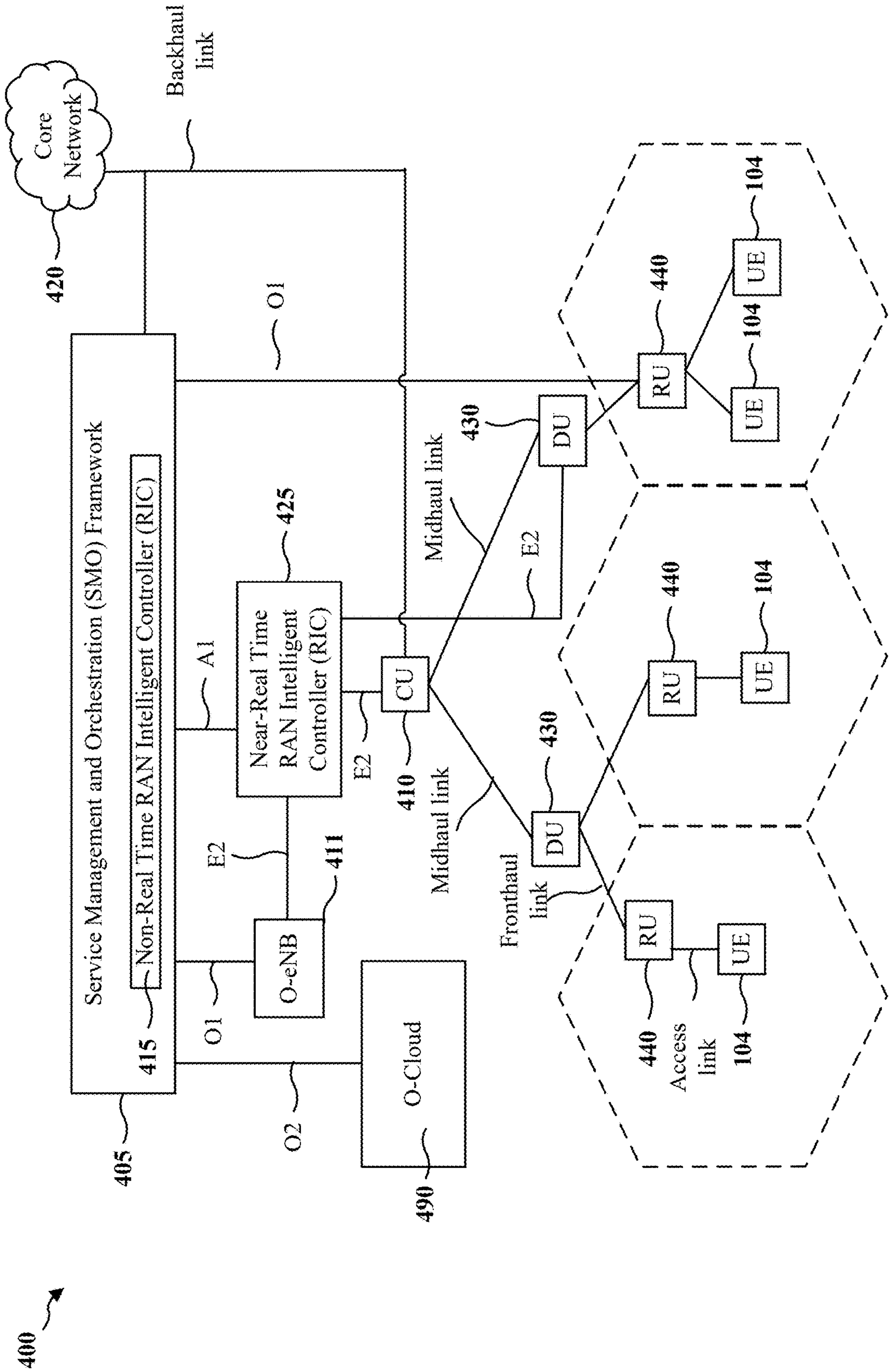
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station. An RU 440 may also be referred to as a radio head, a smart radio head, a remote radio head (RRH), or a remote radio unit (RRU). An RU 440 and/or a DU 430 may be referred to as a transmission reception point (TRP).

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Example of Multi-Transmission/Reception Point (TRP) Communication

Figure 5:
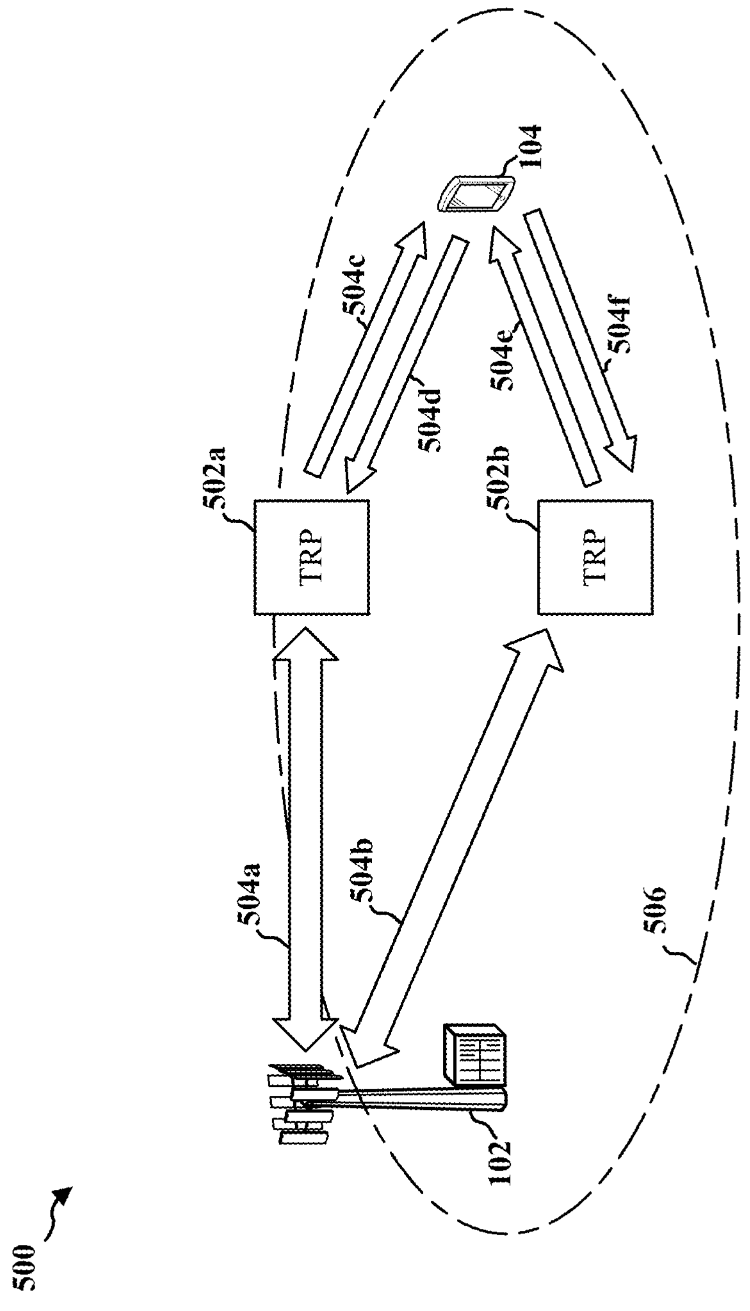
FIG. 5 is a network diagram illustrating an example of a wireless communications system that supports techniques for implementing half-duplex and full-duplex communications via multiple transmit/receive points (mTRPs) in accordance with one or more aspects of the present disclosure.

FIG. 5 is a network diagram illustrating an example of a wireless communications system 500 that supports techniques for implementing half-duplex and full-duplex communications via mTRPs in accordance with one or more aspects of the present disclosure. The wireless communications system 500 may include network entity 102, UE 104, and TRPs (e.g., first TRP 502*a* and second TRP 502*b*-referred to collectively as mTRP 502), which may be examples of a base station 102 or disaggregated base station 400, UE 104, and TRPs as described with reference to FIGS. 1, 3, and 4. The network entity 102 may serve a geographic coverage area 506. In some cases, wireless communications system 500 may represent an mTRP communications system in which the UE 104 may communicate with the network entity 102 via one or more TRPs such as mTRP 502. The wireless nodes may communicate via communication links 504 (e.g., communication links 504*a*, 504*b*, 504*c*, 504*d*, 504*e*, 504*f*), which may be wireless links, wireline links, channels, and/or beams. Techniques may be implemented in wireless communications system 500 to support full-duplex and half-duplex communications between the UE 104 and the mTRP 502.

In some wireless communications systems, such as wireless communications system 500, wireless nodes (e.g., network entities 102, UEs 104, TRPs 502) may be capable of performing half-duplex operations, full-duplex operations, or both. In accordance with half-duplex operations, a wireless node may transmit or receive during a time period, but not both. In accordance with full-duplex operations (e.g., in-band full duplex (IBFD), sub-band full duplex (SBFD)), however, a wireless node may transmit and receive simultaneously in the same, partial overlapping, or different frequency resources. In accordance with IBFD, a wireless node may transmit and receive on the same time resources and at least partially overlapping frequency resources. In some cases, the frequency resources may be the same for the uplink and downlink communications (e.g., completely overlap). In some cases, the downlink frequency resources may be a subset of the uplink frequency resources, or vice versa. In accordance with SBFD (e.g., flexible duplex), a wireless node may transmit and receive at the same time but on different frequency resources, such that the downlink frequency resources and the uplink frequency resources are separated. In some cases, the downlink frequency resources and the uplink frequency resources may be separated by a guard band.

In some implementations, a full-duplex network entity 102 may communicate with half-duplex wireless nodes, such as half-duplex UEs 104 (e.g., UEs that are not capable of transmitting and receiving simultaneously, and in some examples, UEs that are SBFD-aware). In some cases, such a scenario may be implemented in non-overlapping uplink and downlink subbands, in time-division duplex (TDD) for example. In some implementations, a full-duplex network entity 102 may communicate with full-duplex wireless nodes, such as full-duplex UEs 104, in partially or fully overlapping uplink and downlink frequency resources. In some implementations, a full-duplex network entity 102 may communicate with SBFD wireless nodes, such as SBFD UEs 104, in partially or fully overlapping uplink and downlink frequency resources.

In some cases, a wireless node may be configured with resources in which the wireless node may perform half-duplex operations, or full-duplex operations. For example, the wireless node may receive a slot configuration indicating one or more slots that are allocated for uplink communication, one or more slots that are allocated for downlink configuration, one or more slots allocated for full-duplex (e.g., uplink and downlink communications), one or more slots that may be flexibly configured (e.g., flexible slots), or a combination thereof. In an example of a full-duplex slot, a slot may be indicated as a "D+U" slot. The full-duplex slot is a slot in which the frequency band is used for both uplink and downlink transmissions. The downlink and uplink transmissions may occur in overlapping subbands (IBFD) or adjacent subbands (SBFD). In a given full-duplex symbol, a half-duplex UE 104 either transmits in the uplink suband or receives in the downlink subband(s). In a given full-duplex symbol, a full-duplex UE 104 may transmit in the uplink band and/or receive in the downlink band in the same slot. A full-duplex slot may include downlink only symbols, uplink only symbols, full-duplex symbols, or a combination thereof.

In some cases, a UE 104, or some other wireless node may communicate with TRPs 502 in an mTRP system, such that the UE 104 may communicate with a network entity via a first TRP 502*a*, and a second TRP 502*b* (or via any number of TRPs). mTRP operation may be defined in a given geographic coverage area 506 (e.g., serving cell) from the perspective of a UE 104. It may be beneficial to implement mTRPs to support half-duplex and full-duplex communications. For example, in half-duplex communications, the first TRP 502*a* may transmit PDSCH in a slot and the second TRP 502*b* may retransmit the PDSCH the same or different slot so that reliability is improved.

In some cases, mTRP operations may include multiple modes of operation: single DCI (sDCI), and multi-DCI (mDCI). With single-DCI based multi-TRP transmission, one DCI may be used to schedule a message (e.g., a PDSCH) transmitted from multiple TRPs. For example, the first TRP 502*a* (or the second TRP 502*b*) may transmit an sDCI to UE 104, where the sDCI schedules a message that both TRPs will transmit to the UE 104. Single-DCI operation may be applicable to ideal backhaul and may be implemented via different schemes (e.g., PDSCH schemes) for robustness or capability, such as SDM, FDM, TDM, and single frequency network (SFN). Single-DCI based schemes may be focused on PDSCH and/or PDCCH reliability enhancements, such as reliable communications (e.g., spatial diversity) when the signal from one of the first TRP 502*a* or the second TRP 502*b* is blocked.

Example of a Sub-Band Full Duplex (SBFD) Communication Scheme

The simultaneous use of the same set of frequency resources (e.g., same carrier bandwidth, same frequency band) for both uplink and downlink in a given time slot may be referred to herein as sub-band full duplex (SBFD), also referred to as flexible duplex, in which transmissions in different directions are carried in different sub-bands or bandwidth parts (BWPs) of a carrier bandwidth or frequency band. Wireless nodes (e.g., UEs or other wireless communication devices) that are able to operate in a full-duplex mode may be able to use SBFD to increase the amount of data transferred in comparison to TDD because, as with FDD, data may be transmitted and received at the same time, while in contrast to FDD, the data may be transmitted and received in the same carrier bandwidth or frequency band.

As used herein, the term "duplex mode" refers to an operational mode of a wireless node (e.g., a UE) or network entity (e.g., a base station). Examples of duplex modes may include but are not limited to half-duplex, full-duplex capable, and full-duplex-aware (FD-aware) or SBFD-aware. In a half-duplex operational mode, the wireless node may have two-way communications (e.g., uplink and downlink), but the half-duplex two-way communications do not occur simultaneously. Time division duplex (TDD) is an example of a half-duplex system. In a full-duplex operational mode, the wireless node may have two-way communications, and the full-duplex communications may occur simultaneously. Two types of full-duplex communication systems are provided as non-limiting examples herein; broadly, they may be referred to as paired spectrum and unpaired spectrum full-duplex communication schemes. FDD is an example of a full-duplex paired spectrum scheme (where uplink and downlink may occur at the same time in different but paired, pre-defined frequency bands). SBFD is a non-limiting example of a full-duplex unpaired spectrum scheme (where uplink and downlink may occur at the same time in the same frequency band/carrier bandwidth).

In an SBFD-aware operational mode, the wireless node may be aware that time-frequency resources may be allocated according to any type of full-duplex communication system; however, the wireless node may not be configured as a full-duplex device (e.g., the wireless node is only a half-duplex device). Examples described herein may be explained in the context of SBFD-aware wireless nodes operating within an SBFD communication scheme; however, the use of SBFD communication schemes is exemplary and non-limiting. Other types of unpaired spectrum full-duplex communication systems are within the scope of the disclosure. Network entities (e.g., base stations or other RAN nodes) that support SBFD can provide improved use of bandwidth for wireless nodes that are SBFD capable or SBFD-aware. A network entity may configure a time slot (including a set of OFDM symbols) for SBFD by configuring a frequency resource (e.g., use of one new radio (NR) operating band radio channel currently designated for TDD half-duplex operation) for both transmission and reception.

However, not all wireless nodes can communicate using an SBFD scheme. For example, some wireless nodes may be legacy devices without SBFD capability, or have an inexpensive front end that includes a switch that couples an antenna to either the wireless nodes receiver or the wireless nodes transmitter, depending on the state of the switch. Thus, such non-SBFD wireless nodes may be configured for either transmission or reception, but not both at the same time. A non-SBFD wireless node may be configured as a half-duplex (HD) wireless node and may also be an SBFD-aware wireless node.

Figure 6:
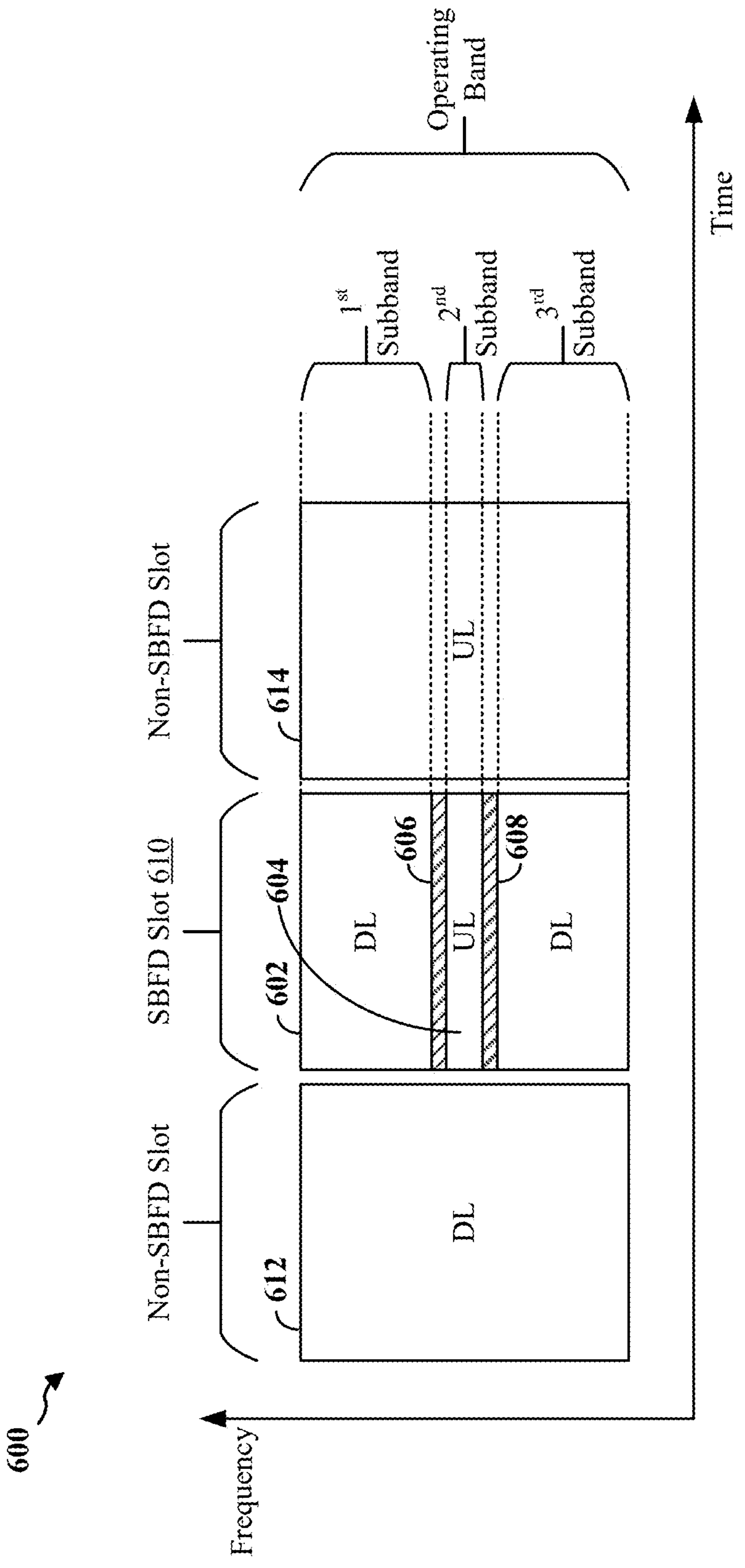
FIG. 6 is a block diagram illustrating an example scheme including subband full duplex (SBFD) and non-SBFD aspects.

FIG. 6 is a block diagram illustrating an example communication scheme 600 including SBFD and non-SBFD aspects. In this example, time is illustrated along a horizontal axis, while frequency is illustrated along a vertical axis. Here, a full-duplex network may utilize SBFD so that transmissions in different directions (e.g., UL and DL) are carried in different sub-bands or BWPs of the carrier bandwidth (e.g., of a frequency band). As illustrated, the example communication scheme 600 includes three contiguous slots: a first non-SBFD slot 612 (e.g., a downlink TDD slot), a second non-SBFD slot (e.g., an uplink TDD slot 614), and an SBFD slot 610 having a first subband allocated for downlink, a second subband allocated for uplink, and a third subband allocated for downlink. It should be noted that any suitable subband configuration may be used, including SBFD schemes with more or fewer subbands. For example, an SBFD slot having a single downlink subband and a single uplink subband, or any other suitable number of subbands.

The SBFD slot 610 may include one or more downlink subbands 602 (e.g., PDSCH and/or PDCCH reception in the subband) and one or more uplink subbands 604 (e.g., PUSCH and/or PUCCH transmission in the uplink subband) are all depicted as occupying a single operating band. The SBFD slot 610 utilizes the single operating band for uplink and downlink without separating the uplink and downlink in time (e.g., uplink and downlink resources occupy the same time slots simultaneously). A first guard band 606 and a second guard band 608 may be the same bandwidth or different bandwidths and may be used to separate the downlink frequency resources from the uplink frequency resources. Either or both of the first guard band 606 and the second guard band 608 may be zero bandwidth guard band.

Referring now to the combination of FIGS. 5 and 6, during the first non-SBFD slot 612, which is configured for downlink transmission, a first TRP 502*a* may transmit a downlink signal to the UE 104. At the SBFD slot 610, a second TRP 502*b* may transmit a repetition of the downlink signal to the UE 104 using the two downlink subbands. Such a communication may be performed in an mTRP TDD communication scheme. In an mTRP FDD communication scheme, the first TRP 502*a* may transmit a downlink signal to the UE 104 via one of the downlink subbands of the SBFD slot 610 while the second TRP 502*b* may transmit a repetition of the downlink signal via the other of the downlink subbands. However, as discussed in more detail below, in some cases the UE 104 may fall back to an sTRP communication scheme for the SBFD slot 610.

Examples of Half-Duplex UE mTRP Communications with SBFD Symbols

Although a TRP may operate as a half-duplex wireless node, the base station may use multiple TRPs for simultaneous transmission and reception of wireless signaling. As such, the base station may operate as a full-duplex wireless node via its use of multiple half-duplex TRPs. However, a UE may be configured as a half-duplex UE that is not capable of transmitting an uplink signal while receiving a downlink signal at the same time. As such, the UE may not be capable of both transmission and reception of wireless signaling at SBFD symbols. Accordingly, aspects of the disclosure are directed to methods of communication that allow for a half-duplex UE to continue receiving downlink wireless communications from the base station during full-duplex symbols (e.g., SBFD symbols).

In certain aspects, the base station may configure an mTRP downlink transmission scheme for communication with the UE. The downlink transmission scheme may be any of TDM, FDM, SFN, or SDM. For example, the base station may transmit (e.g., RRC configuration message) a wireless configuration to the UE that configures the UE for mTRP communication with a first TRP of the base station and a second TRP of the base station via non-SBFD symbols (e.g., downlink slots such as the first non-SBFD slot 612 of FIG. 6). The base station may also configure the UE for downlink communication during SBFD symbols. In one example, the SBFD symbol configuration may be part of the wireless configuration for configuring the UE for mTRP communications. In another example, the SBFD symbol configuration may be another message (e.g., DCI) or a combination of messages (e.g., RRC, DCI, and/or MAC-CE).

Figure 7:
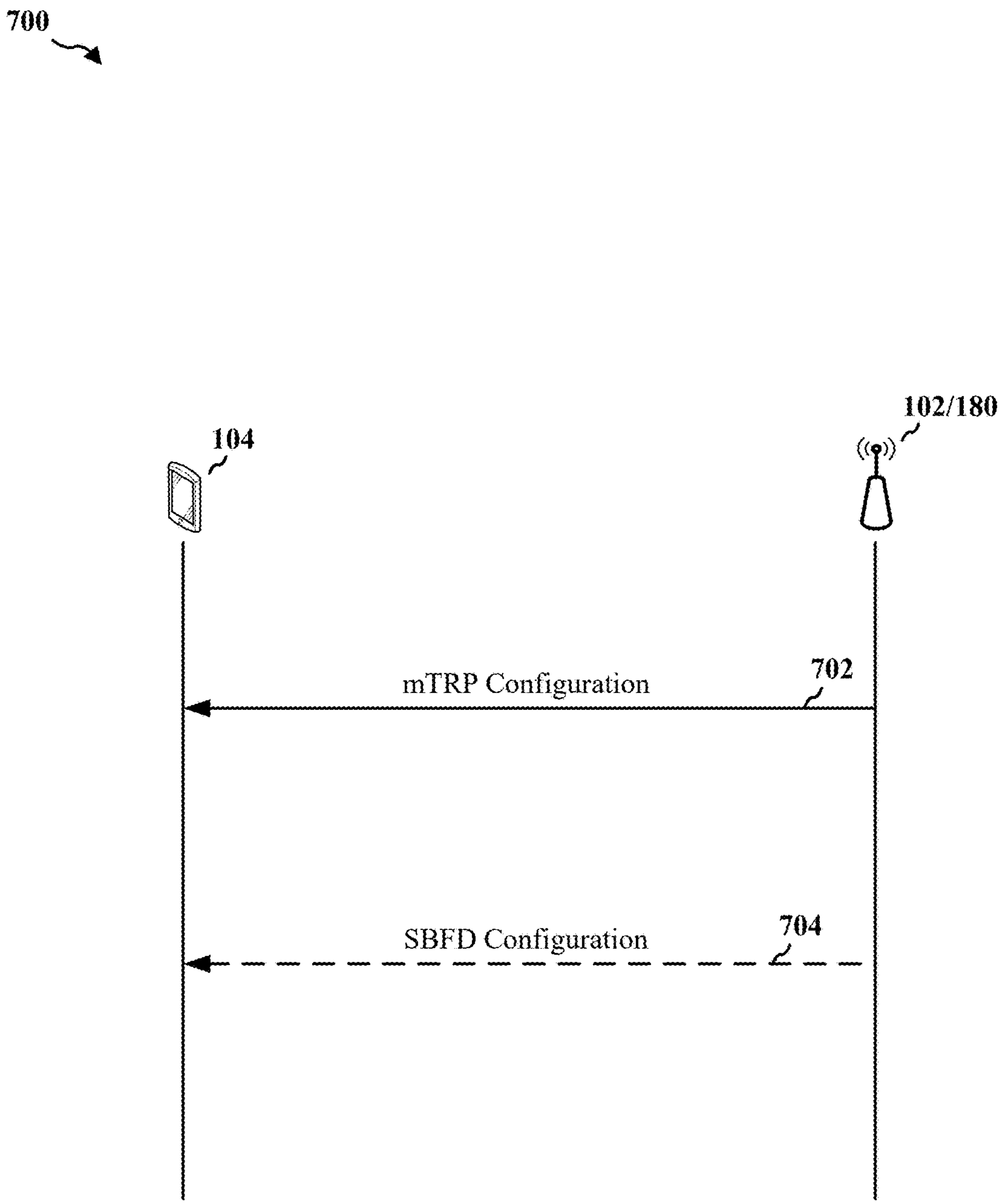
FIG. 7 is a call flow diagram illustrating wireless communications between a UE and a base station.

FIG. 7 is a call flow diagram illustrating wireless communications 700 between a UE 104 and a base station 102. In some examples, the base station 102 may transmit the illustrated signals to the UE 104 via one or more TRPs. The UE 104 may be configured for half-duplex communications. In this illustration, time moves forward in the downward direction, and communication signals between the illustrated entities are denoted with arrows between the lines below the respective entities.

At a first communication 702, the base station 102 may transmit an mTRP wireless configuration that configures the UE 104 for mTRP communication with the base station 102 via at least a first TRP and a second TRP via non-subband full duplex (non-SBFD) symbols. The mTRP wireless configuration may include an indication of a TCI state (e.g., an indication of a beam from which the UE 104 may receive downlink signaling) associated with each TRP (e.g., a beam from which the UE 104 may receive downlink signaling). The mTRP wireless configuration may also include an indication of a symbol/slot pattern (e.g., time and/or frequency resources and a corresponding type, such as uplink, downlink, flexible). In some examples, the first communication 702 may be an RRC message. The mTRP wireless configuration may also include a downlink transmission scheme used by the base station 102 (e.g., TDM, SFN, SDM, FDM, etc.).

The base station may also provide the UE 104, via the mTRP wireless configuration or an optional second communication 704, an SBFD configuration to configure the UE 104 to communicate in a particular manner during an SBFD symbol (e.g., when the UE 104 switches from a TDD slot to an SBFD slot, or the like). In some examples, the optional second communication 704 may include a DCI.

In certain aspects, the SBFD configuration may configure the UE 104 to fall back from the mTRP communication mode to an sTRP communication mode for communication via an SBFD symbol. For example, for receiving a downlink communication during an SBFD slot, the UE 104 may fall back to an sTRP communication mode where the UE 104 receives downlink signaling from only one of the TRPs. This is because another TRP from which the UE 104 received mTRP downlink signaling may be transmitting on an uplink band associated with the SBFD symbol.

For example, referring back to FIG. 5, the UE 104 may receive repetitive downlink transmissions from the first TRP 502*a* and the second TRP 502*b* via contiguous TDD downlink slot (e.g., non-SBFD slots). At a transition from a non-SBFD slot to an SBFD slot, the UE may fall back to sTRP communications and receive a downlink transmission from one of the TRPs (e.g., where the UE does not expect a repeated downlink transmission from the other TRP) via the downlink subbands of the SBFD slot. It should be noted that this example is not limiting, and as described below, falling back to an sTRP communication mode may be performed by the UE 104 with other modes of communication (e.g., FDD, etc.).

In certain aspects, the SBFD configuration may configure the UE 104 to continue to operate in an mTRP communication mode during an SBFD symbol. For example, the UE 104 may be configured to receive downlink repetitions from a first TRP and a second TRP (e.g., based on a first TCI state of the first TCI and a second TCI state of the second TCI). At an SBFD symbol, the UE 104 may switch from one or both of the first TRP and/or the second TRP to a third TRP and/or a fourth TRP for receiving repetitive downlink communications during SBFD symbols.

Figure 8:
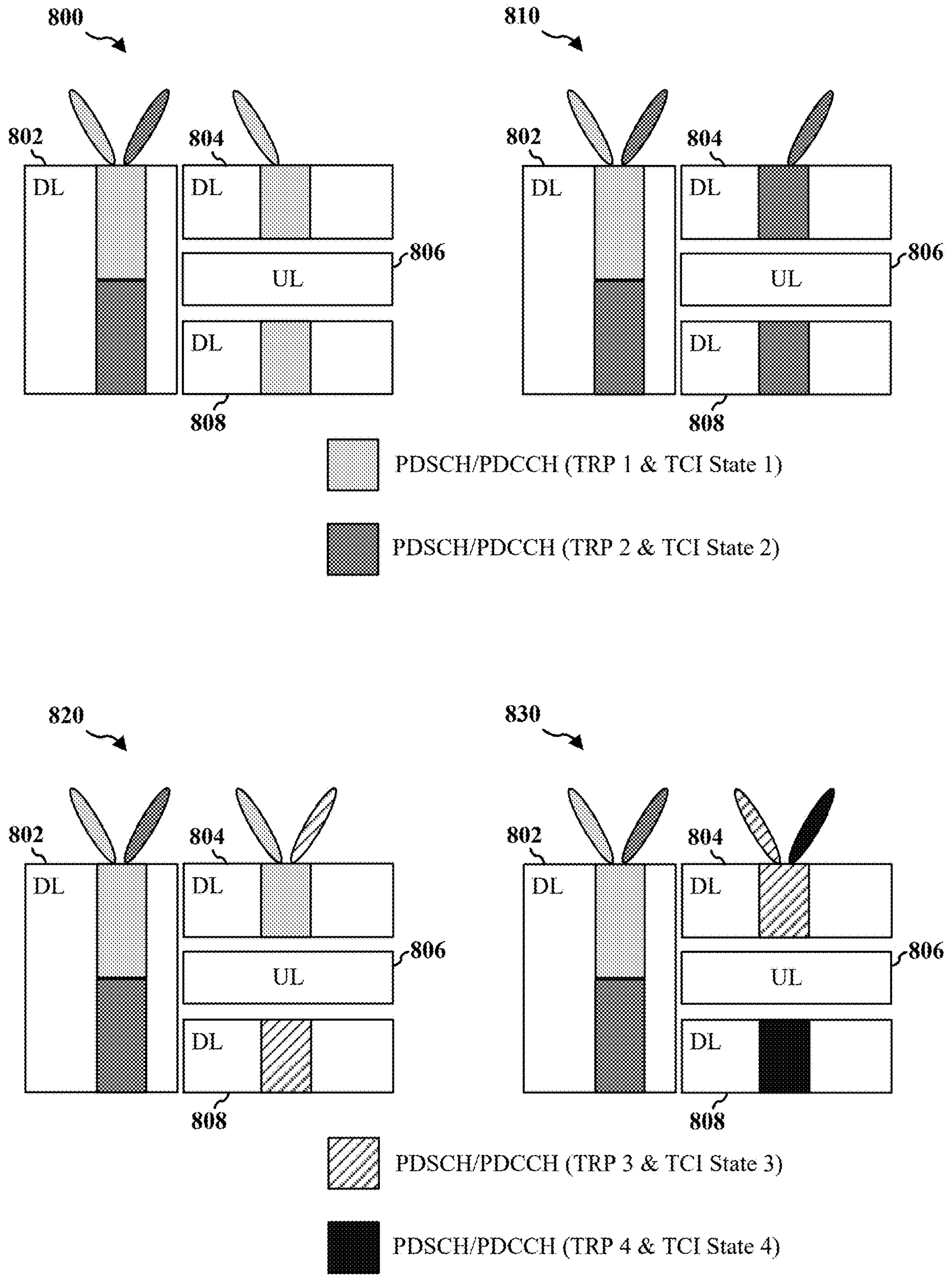
FIG. 8 is a block diagram illustrating examples of SBFD configurations, including single TRP (sTRP) fallback and continued mTRP during SBFD symbols.

FIG. 8 is a block diagram illustrating examples of SBFD configurations, including sTRP fallback and continued mTRP during SBFD symbols. In this illustration, time moves forward in the right-hand direction along an x-axis, and time frequency changes in a vertical direction along a y-axis.

In a first diagram 800, the UE 104 may be configured by the base station 102 to fallback to sTRP communications (e.g., via one or more of the first communication 702 and/or the optional second communication 704 of FIG. 7) during an SBFD symbol in order to receive downlink communications (e.g., PDSCH/PDCCH) during the SBFD symbol. At a first downlink resource 802, the UE 104 may receive a PDSCH from the first TRP and receive a repetition of the PDSCH from the second TRP according to the mTRP configuration (e.g., first communication 702 of FIG. 7). Both the PDSCH and the repetition of the PDSCH may be received at the same symbol but in different bands (e.g., FDM repetition of the PDSCH). In some examples, the first downlink resource 802 may be a TDD downlink slot. An SBFD resource may contiguously follow the first downlink resource, and may include a second downlink resource 804, an uplink resource 806, and a third downlink resource 808. Here, the UE 104 may fallback to sTRP communications and thus may receive a PDSCH from the first TRP in both the second downlink resource 804 and the third downlink resource 808. In a second diagram 810, the UE 104 may also be configured by the base station 102 to fallback to sTRP communications, but this time, configured to fallback to the second TRP for sTRP communications. At the end of the SBFD resources, the UE 104 may switch back to the mTRP communication mode.

In a third diagram 820, the UE 104 may be configured by the base station 102 to maintain mTRP communications during the SBFD resources. Here, the UE 104 may receive PDSCH from the first TRP via the second downlink resources 804 and receive a repetition of the PDSCH from a third TRP via the third downlink resource 808. Thus, in this example, one of the original TRPs from which the UE 104 received downlink signaling via the first downlink resource 802 is maintained during the SBFD resource. In a fourth diagram 830, the UE 104 may also be configured by the base station 102 to maintain mTRP communications, but this time, the UE 104 may receive PDSCHs from a third TRP and a fourth TRP during the SBFD resources. Here, during the SBFD resources, the UE 104 may receive a PDSCH from a third TRP via the second downlink resource 804 and receive a repetition of the PDSCH from a fourth TRP via the third downlink resource 808. It should be noted that the UE 104 may be configured by the base station with the TCI states of each TRP via the mTRP configuration message and/or the SBFD configuration message illustrated in FIG. 7. At the end of the SBFD resources, the UE 104 may switch back to receiving downlink signaling from the first TRP and the second TRP.

In certain aspects, the SBFD configuration and/or mTRP configuration may explicitly indicate the UE's 104 behavior during an SBFD symbol (e.g., whether the UE falls back to sTRP or maintains mTRP using one or more different TRPs). For example, the first communication 702 of FIG. 7 may include an RRC message with an explicit field indicating whether the UE 104 is to fallback to sTRP or maintain mTRP during SBFD symbols. Here, a bit may indicate whether mTRP is enabled or disabled for SBFD symbols. If the RRC message does not include an explicit indication of the mode of communication during SBFD symbols, the UE 104 may rely on a pre-configured or default behavior wherein it either falls back to the sTRP communication mode or maintains mTRP.

In certain aspects, the SBFD configuration and/or mTRP configuration may implicitly indicate the UE's 104 behavior during an SBFD symbol. For example, the mTRP configuration (e.g., first communication 702 of FIG. 7) may provide the UE 104 with multiple TCI states each associated with one of multiple TRPs. In other words, the UE 104 may be provided with a pair of unified TCI states for downlink transmissions in non-SBFD symbols (e.g., TCI states associated with a first TRP and a second TRP), and a different pair of unified TCI states for downlink transmission in SBFD symbols (e.g., TCI states associated with a third TRP and a fourth TRP). In this example, the UE 104 may assume that it should maintain mTRP communications during an SBFD symbol and use the different pair of unified TCI stated to receive downlink transmissions. If the different pair of TCI states includes one or more TCI states associated with only one TRP, then the UE 104 may assume that it should fallback to sTRP during SBFD symbols.

Figure 9:
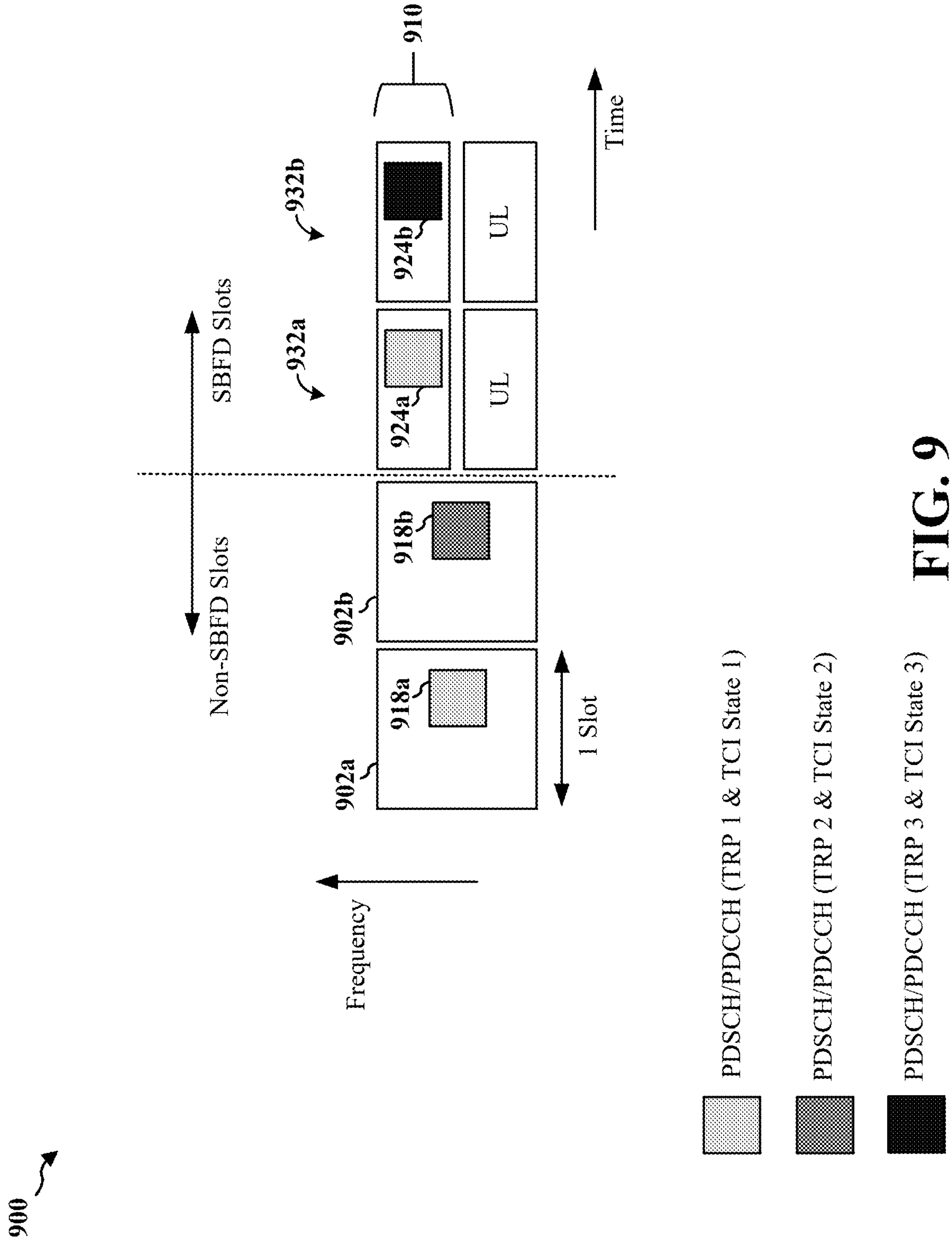
FIG. 9 is a block diagram illustrating an example time-division multiplexed (TDM) communication scheme for downlink repetition communications between a UE and a base station.

FIG. 9 is a block diagram illustrating an example mTRP TDM communication scheme 900 for downlink repetition communications between a UE 104 and a base station 102. In this illustration, time moves forward in the right-hand direction along an x-axis, and time frequency changes in a vertical direction along a y-axis. It should be noted that FIG. 9 is not limiting, and the SBFD slots may include any suitable subband configuration, including SBFD schemes with more or fewer subbands.

A wireless network may be configured to support consecutive downlink transmission of a same set of data (PDSCH) and/or control information (PDCCH). In some examples, all of the consecutive transmissions may be referred to as repeated transmissions or repetitions. In some examples, the first transmission may be referred to as conveying original (or new) data and the following transmissions may be referred to as carrying repeated data. In some examples, the first transmission may be referred to as an initial transmission and the second transmission may be referred to as repetitions.

The base station 102 may configure the UE 104 for downlink transmission repetitions via RRC messaging and may indicate the number of repetitions via a time domain resource allocation (TDRA). In some examples, each repetition may be characterized by the same start and length indicator value (SLIV) as the initial transmission. In an mTRP TDD configuration, the TCI state associated with the downlink transmissions may be configurable. For example, an initial transmission may be transmitted via a first slot by a first TRP, and a repeat of the initial transmission may be transmitted via a second slot immediately following the first slot by a second TRP. In another example, an initial transmission may be transmitted via a first slot by a first TRP, and a repeat of the initial transmission may be transmitted via a second slot immediately following the first slot by the first TRP. A second TRP may then transmit a repeat of the initial transmission via a third slot immediately following the second slot, and a fourth slot immediately following the third slot. The relationship between repetition pattern and the TRPs may be referred to as a repetition pattern.

As part of the wireless configuration, the base station 102 may configure the UE 104 for inter-slot downlink repetition via TDM. For example, the wireless configuration may configure the UE with: (i) a first TCI state repetition pattern for mTRP communication with the first TRP and the second TRP via non-SBFD symbols, and (ii) a second TCI state repetition pattern for mTRP communication via the SBFD symbols.

As illustrated, the first TCI state pattern may include an indication of a first TCI state associated with the first TRP, and a second TCI state associated with the second TRP. Accordingly, the first TRP of the base station 102 may transmit a first PDSCH 918*a* to the UE 104 via a first downlink slot 902*a*. In an immediately following second slot 902*b*, the second TRP of the base station 102 may transmit a repetition of the first PDSCH 918*b* to the UE 104 via a second downlink slot 902*b*.

As illustrated, the second TCI pattern may include an indication of a first TCI state associated with the first TRP, and a third TCI state associated with the third TRP. However, it should be noted that in some examples, the second TCI pattern may not include the first TRP, and instead include an indication of the third TCI state associated with the third TRP and a fourth TCI state associated with a fourth TRP. In this example, the UE 104 is configured to receive downlink transmissions during SBFD slots from a set of TRPs different from the set of TRPs used to transmit during non-SBFD slots. Accordingly, the first TRP of the base station 102 may transmit a second PDSCH 924*a* to the UE 104 via a first downlink subband 910 of a first SBFD slot 932*a*. In an immediately following second SBFD slot 932*b*, the third TRP of the base station 102 may transmit a repetition of the second PDSCH 924*b* to the UE 104 via the first downlink subband 910 of the second SBFD slot 932*b*.

Accordingly, in the illustrated example, the UE 104 may receive downlink transmissions from the first TRP via an associated first TCI state and the second TRP via an associated second TCI state, as provided by the first TCI state repetition pattern.

Prior to a transition from non-SBFD slots to SBFD slots, the UE 104 may then switch from the second TRP to the third TRP (e.g., switch from the second TCI state to the third TCI state associated with the third TRP) to continue to receive downlink transmissions during the SBFD slots.

Here, the base station 102 configured the UE 104 to use the same repetition pattern for both non-SBFD slots and non-SBFD slots. That is, one TRP transmits the initial transmission and another TRP transmits a repetition of the initial transmission, and the pattern repeats. Thus, the pattern illustrated is a length of 2 slots. However, in certain aspects, the base station may use and configure the UE with other repetition patterns (e.g., patterns having a length of 4 slots). Moreover, in some examples, the base station 102 may use and configure the UE 104 to reset or continue the repetition pattern after transitioning from SBFD slots to non-SBFD slots, and vice versa.

For example, if the last slot of the non-SBFD slots is used for an initial downlink transmission by a first TRP, then the first slot of the SBFD slots would be used for transmitting a repetition of that initial downlink transmission by another TRP if the base station 102 and the UE 104 were configured to continue the repetition pattern. In another example, the base station 102 and the UE 104 may be configured to reset the repetition pattern upon transitioning from non-SBFD slots to SBFD slots and vice versa. In this example, if the last slot of the non-SBFD slots is used for an initial downlink transmission by a first TRP, then the first slot of the SBFD slots would also be used for an initial downlink transmission by the first TRP. The next SBFD slot may then be used to transmit a repetition of the initial downlink transmission by a second TRP.

Figure 10:
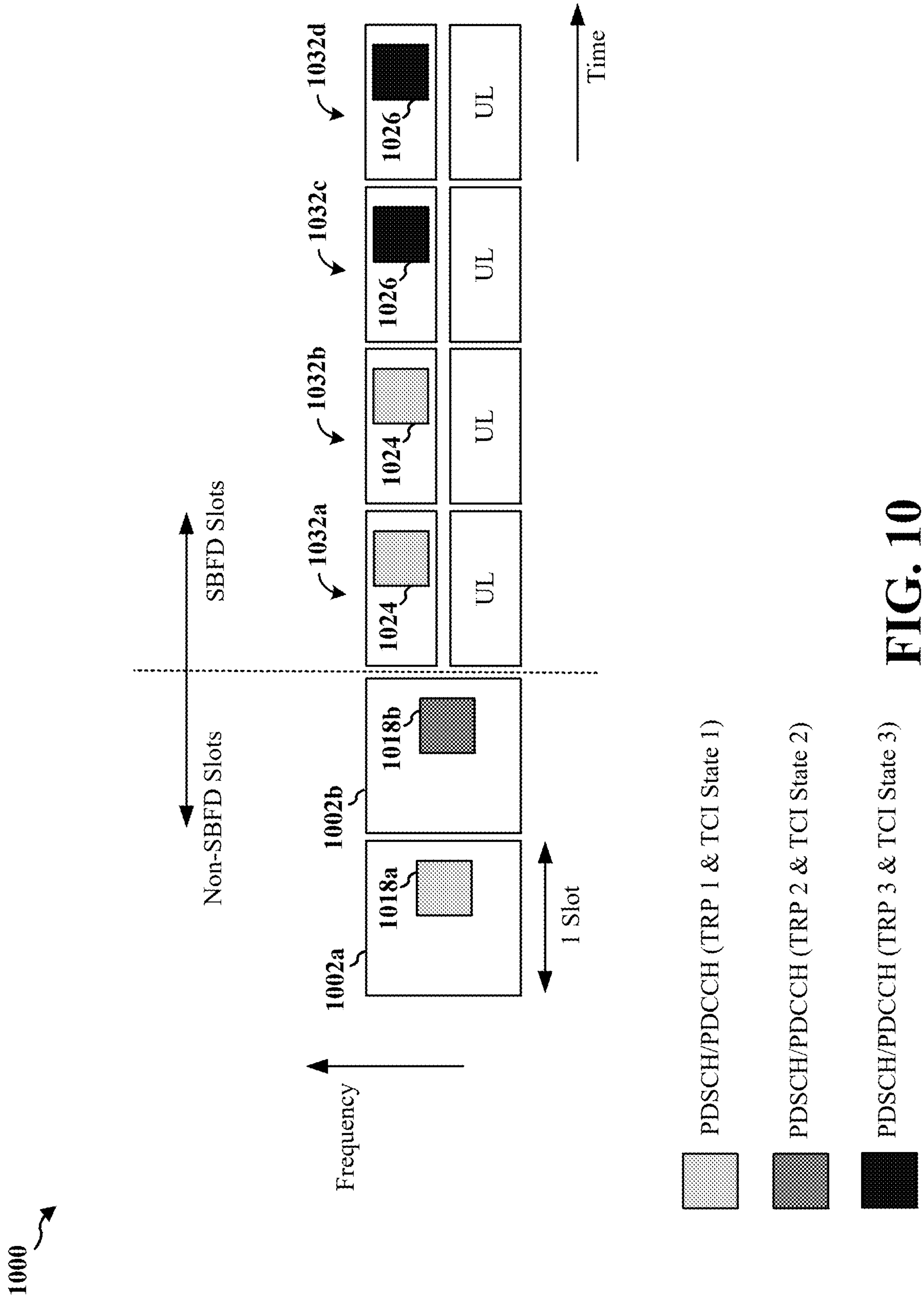
FIG. 10 is a block diagram illustrating another example TDM communication scheme for downlink repetition communications between a UE and a base station.

In certain aspects, the repetition pattern may change based on whether the downlink transmissions are made via SBFD slots or non-SBFD slots. FIG. 10 is a block diagram illustrating another example TDM communication scheme 1000 for downlink repetition communications between a UE 104 and a base station 102. In this illustration, time moves forward in the right-hand direction along an x-axis, and time frequency changes in a vertical direction along a y-axis. It should be noted that FIG. 10 is not limiting, and the SBFD slots may include any suitable subband configuration, including SBFD schemes with more or fewer subbands.

As with FIG. 9, the base station 102 may configure the UE 104 for inter-slot downlink repetition via TDM. The wireless configuration may configure the UE with: (i) a first TCI state repetition pattern for mTRP communication with the first TRP and the second TRP via non-SBFD symbols, and (ii) a second TCI state repetition pattern for mTRP communication via the SBFD symbols.

The first TCI state pattern may include an indication of a first TCI state associated with the first TRP, and a second TCI state associated with the second TRP. Accordingly, the first TRP of the base station 102 may transmit a first PDSCH 1018*a* to the UE 104 via a first downlink slot 1002*a*. In an immediately following second slot 1002*b*, the second TRP of the base station 102 may transmit a repetition of the first PDSCH 1018*b* to the UE 104 via a second downlink slot 1002*b*. Here, the first TCI state pattern is a 2-slot pattern.

The second TCI pattern may include an indication of a first TCI state associated with the first TRP, and a third TCI state associated with the third TRP. The second TCI pattern may also be a 4-slot pattern, where the first TRP transmits an initial downlink signal twice before the third TRP twice transmits a repetition of the initial downlink signal. That is, the first TRP of the base station 102 may transmit an initial PDSCH 1024 to the UE 104 via a downlink subband of a first SBFD slot 1032*a* and a second SBFD slot 1032*b*. The third TRP of the base station 102 may then transmit a repetition of the initial PDSCH 1026 to the UE 104 via the downlink subband of a third SBFD slot 1032*c* and a fourth SBFD slot 1032*d*. Thus, the second TCI pattern may be completed after 4 slots before the pattern repeats.

In certain aspects, wireless nodes may also use retransmission techniques to improve the chances that a transmitted codeword is received. For example, a base station 102 and UE 104 may support techniques for retransmitting multiple versions of a codeword (e.g., redundancy versions (RVs)) to improve the chances that the codeword is received. The redundancy version may tell a wireless device about the amount of redundancy added into a codeword while encoding. There are four different redundancy versions in NR. Redundancy version 0 (RV0) will normally be the first transmission due to its performance relative to the other RVs. Subsequent transmissions may utilize RV1, RV2, or RV3.

As part of the wireless configuration, the base station 102 may configure the UE 104 with an RV pattern associated with each TCI state, as well as an indication of whether the RV will reset during a transition from SBFD slots to non-SBFD slots, and vice versa.

Figure 11:
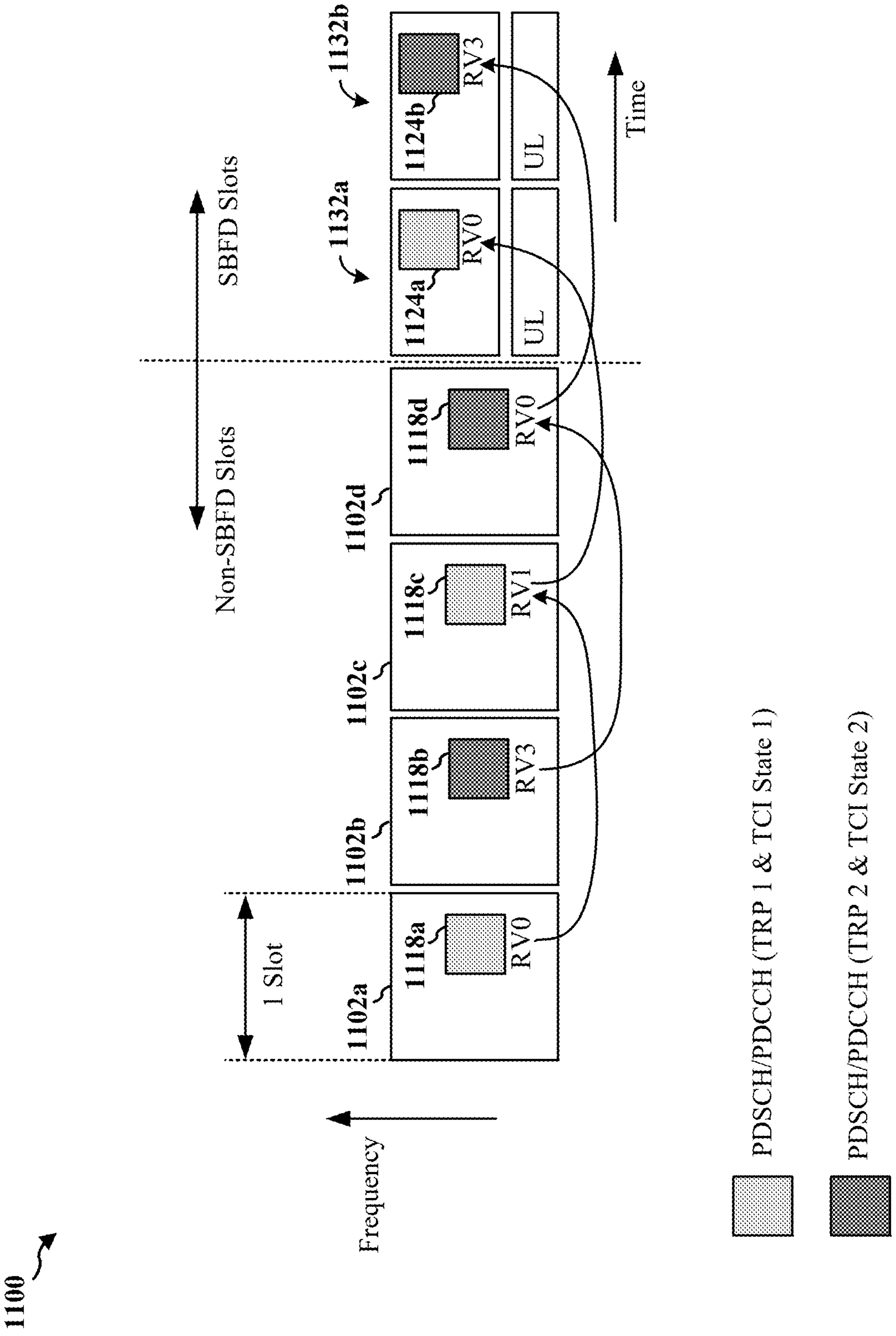
FIG. 11 is a block diagram illustrating another example TDM communication scheme for downlink repetition communications between a UE and a base station.

FIG. 11 is a block diagram illustrating another example TDM communication scheme 1100 for downlink repetition communications between a UE 104 and a base station 102. In this illustration, time moves forward in the right-hand direction along an x-axis, and time frequency changes in a vertical direction along a y-axis. It should be noted that FIG. 11 is not limiting, and the SBFD slots may include any suitable subband configuration, including SBFD schemes with more or fewer subbands. Moreover, the repetition pattern may include any suitable repetition pattern, including those discussed above and throughout the disclosure.

In this example, an mTRP configuration (e.g., first communication 702 of FIG. 7) may indicate a first TCI state pattern and a second TCI state pattern as described above. The mTRP configuration or the SBFD configuration (e.g., the optional second communication 704 of FIG. 7) may include an indication of an RV pattern associated with each TCI state, and whether the RV pattern associated with one or more of the first TCI state and/or the second TCI state should be reset upon transition from a non-SBFD slot to an SBFD slot.

As illustrated in FIG. 11, the RV pattern for the first TCI state of the first TCI state pattern starts at RV0 for a first downlink transmission, then proceeds to RV1 for a second downlink transmission, followed by RV2 and RV3 for a third and fourth downlink transmission, respectively. The RV pattern for the second TCI state of the first TCI state pattern starts at RV3 for a first downlink transmission, then proceeds to RV0 for a second downlink transmission, followed by RV1 and RV2 for a third and fourth downlink transmission, respectively. The RV pattern may be the same for the second TCI state pattern.

Accordingly, at a first slot 1102*a*, the UE 104 may receive an initial downlink transmission 1118*a* from a first TRP associated with the first TCI state, where the initial downlink transmission 1118*a* is RV0. At a second slot 1102*b*, the UE 104 may then receive a repetition of the initial downlink transmission 1118*b* from a second TRP associated with the second TCI state, where the repetition of the initial downlink transmission 1118*b* is RV3. A next downlink transmission 1118*c* at a third slot 1102*c* from the first TRP is associated with RV1, and a repetition of the next downlink transmission 1118*d* at a fourth slot 1102*d* is RV0.

If configured by the base station 102, the UE 104 may reset the RV pattern upon transitioning from the non-SBFD slots to the SBFD slots. Accordingly, the UE 104 may receive an initial downlink transmission 1124*a* from the first TRP having RV0 during a first SBFD slot 1132*a*. This is a reset of the RV pattern because the initial downlink transmission 1124*a* does not continue the pattern progression of the first TCI state of the non-SBFD slots, which would have resulted in RV2 at the first SBFD slot 1132*a*. The UE 104 may then receive a repetition of the initial downlink transmission 1124*b* from the second TRP having RV3 during a second SBFD slot 1132*b*. This is also a reset of the RV pattern because the repetition of the initial downlink transmission 1124*b* does not continue the pattern progression of the second TCI state of the non-SBFD slots, which would have resulted in RV1 at the second SBFD slot 1132*b*.

It should be noted that although FIG. 11 illustrates the same TCI states (the first TCI state associated with the first TRP, and the second TCI state associated with the second TRP) being used for the non-SBFD slots and the SBFD slots, different TCI states may be used depending on whether the slots are non-SBFD or SBFD, as discussed throughout the specification.

Figure 12:
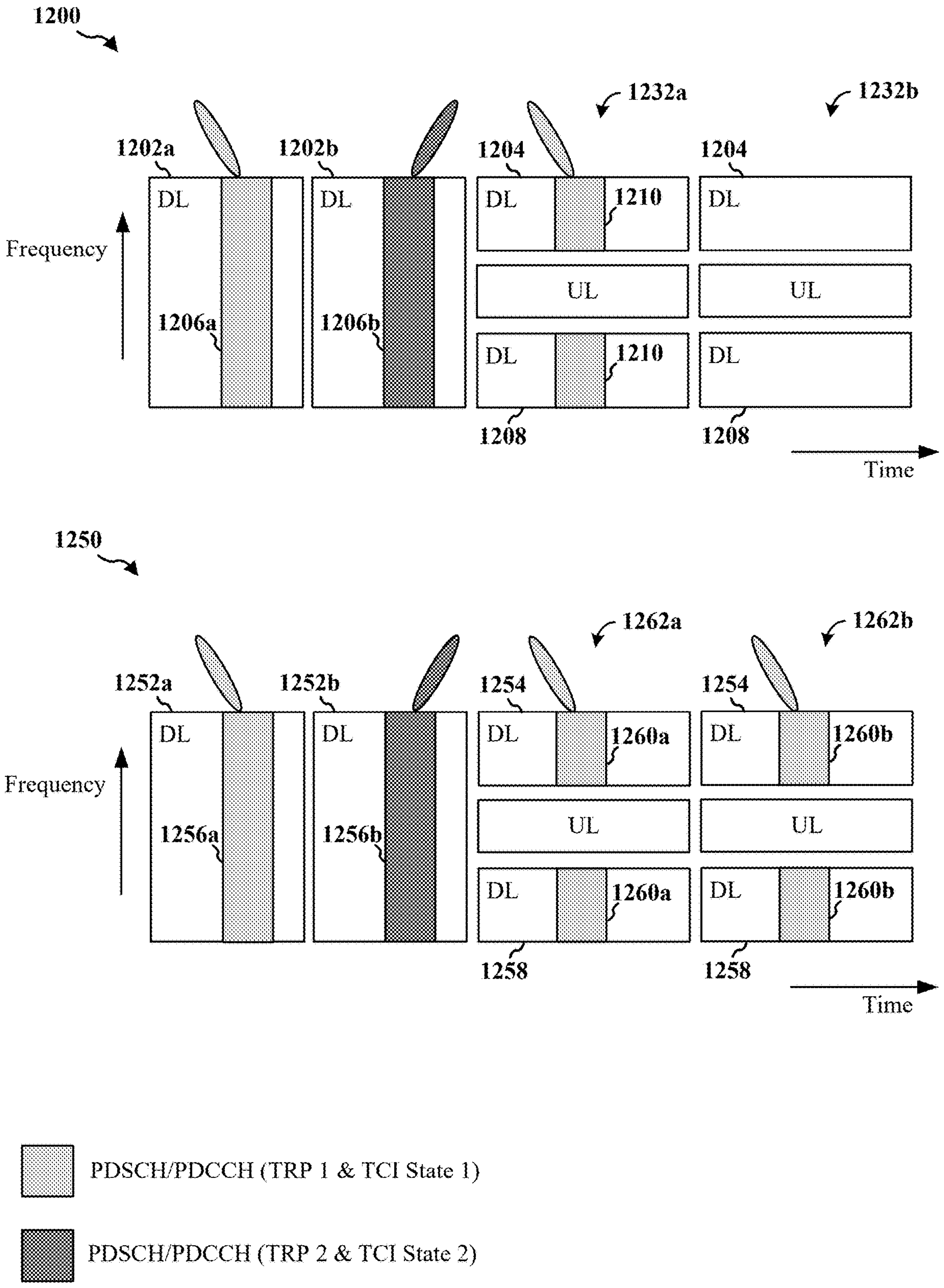
FIG. 12 is a block diagram illustrating two examples of SBFD inter-slot repetition configurations for sTRP fallback during SBFD symbols.

FIG. 12 is a block diagram illustrating two examples of SBFD inter-slot repetition configurations for sTRP fallback during SBFD symbols. In this illustration, time moves forward in the right-hand direction along an x-axis, and time frequency changes in a vertical direction along a y-axis. Here, an mTRP configuration (e.g., first communication 702 of FIG. 7) may indicate a first TCI state pattern and a second TCI state pattern as described above. The mTRP configuration or the SBFD configuration (e.g., the optional second communication 704 of FIG. 7) may include an indication of whether the UE can expect a repetition downlink transmission from the same TRP that transmitted the initial downlink transmission when the UE falls back to an sTRP communication mode.

In a first diagram 1200, the UE 104 may be configured by the base station 102 to fallback to sTRP communications (e.g., via one or more of the first communication 702 and/or the optional second communication 704 of FIG. 7) when transitioning from a non-SBFD symbol to an SBFD symbol in order to receive downlink communications (e.g., PDSCH/PDCCH) during the SBFD symbol. The UE 104 may be configured by the base station 102 to not expect a repetition downlink transmission during the SBFD symbol. At a first non-SBFD downlink resource 1202*a*, the UE 104 may receive an initial PDSCH 1206*a* from the first TRP. At a second non-SBFD downlink resource 1202*b*, the UE 104 may receive a repetition of the initial PDSCH 1206*b* from the second TRP according to the mTRP configuration (e.g., first communication 702 of FIG. 7).

The UE 104 and base station 102 may transition from the non-SBFD resources 1202 to SBFD resources (e.g., first SBFD resources 1232*a* and second SBFD resources 1232*b*-collectively SBFD resources 1232) after the second non-SBFD downlink resource 1202*b*. Based on the configuration, the UE 104 may switch to sTRP communications during transition from the non-SBFD resources 1202 to the SBFD resources 1232. A first SBFD resource 1232*a* and second SBFD resource 1232*b* are characterized by a first downlink subband 1204, an uplink subband, and a second downlink subband 1208. During the first SBFD resource 1232*a*, the first TRP may transmit a downlink signal 1210 via the downlink subbands. However, no transmission is expected by the UE 104 during the second SBFD resource 1232*b*. As such, the UE 104 may refrain from monitoring the second SBFD resource 1232*b*.

In a second diagram 1250, the UE 104 may also be configured by the base station 102 to fallback to sTRP communications when transitioning from a non-SBFD symbol to an SBFD symbol. The UE 104 may be configured by the base station 102 to expect a repetition downlink transmission during the SBFD symbol, where the repetition will be transmitted by the same TRP that transmitted the initial downlink transmission. At a first downlink resource 1252*a*, the UE 104 may receive an initial PDSCH 1256*a* from the first TRP. At a second downlink resource 1252*b*, the UE 104 may receive a repetition of the initial PDSCH 1256*b* from the second TRP according to the mTRP configuration (e.g., first communication 702 of FIG. 7).

The UE 104 and base station 102 may transition from the non-SBFD resources 1252 to SBFD resources 1262 after the second downlink resource 1252*b*. Thus, based on the configuration, the UE 104 may switch to sTRP communications during the SBFD resources 1262. A first SBFD resource 1262*a* and second SBFD resource 1262*b* are characterized by a first downlink subband 1254, an uplink subband, and a second downlink subband 1258. During the first SBFD resource 1262*a*, the first TRP may transmit a downlink signal 1260*a* via the downlink subbands. During the second SBFD resource 1262*b*, the first TRP may transmit a repetition of the downlink signal 1260*b* via the downlink subbands. Accordingly, the UE 104 may continue to receive downlink repetitions in sTRP communication mode if configured by the base station 102.

Figure 13:
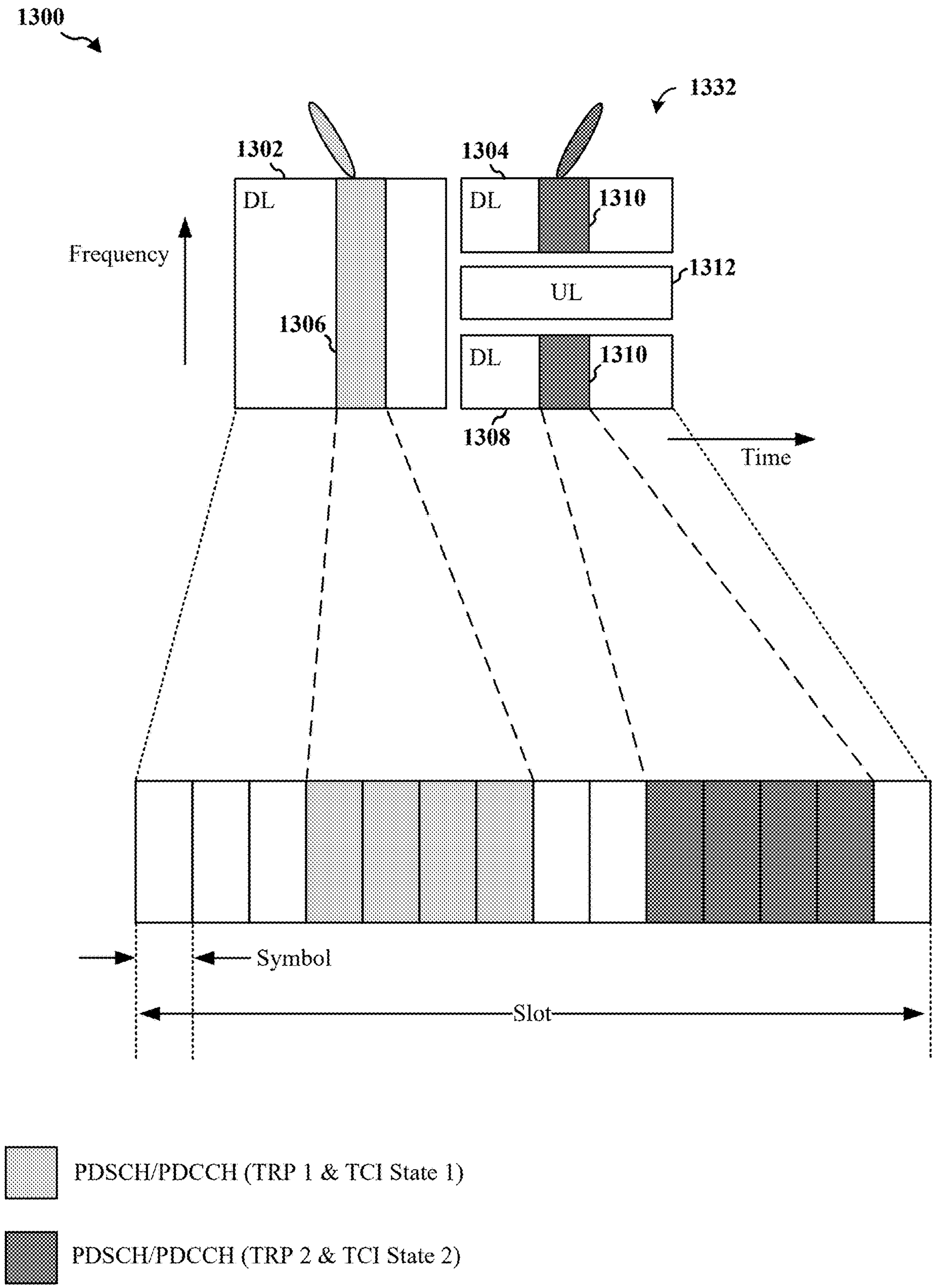
FIG. 13 is a block diagram illustrating an example of an intra-slot SBFD repetition configuration for mTRP communications.

FIG. 13 is a block diagram illustrating an example of an intra-slot SBFD repetition configuration for mTRP communications 1300. In this illustration, time moves forward in the right-hand direction along an x-axis, and time frequency changes in a vertical direction along a y-axis. Here, an mTRP configuration (e.g., first communication 702 of FIG. 7) may indicate a first TCI state pattern and a second TCI state pattern as described above. The mTRP configuration and/or the SBFD configuration (e.g., the optional second communication 704 of FIG. 7) may include an indication of whether the UE can expect an initial downlink transmission and a repetition of the initial downlink transmission from different TRPs within the same slot.

In some examples, mTRP communications may be part of the same slot. In the example illustrated, a single slot may include both SBFD and non-SBFD symbols. Thus, TRPs may transmit downlink signals via SBFD symbols and non-SBFD symbols within the same slot. For example, a slot 1332 may include both non-SBFD symbols in a downlink portion 1302, and SBFD symbols including a first downlink subband 1304, an uplink subband 1312, and a second downlink subband 1308. Thus, a first TRP having a first TCI state may transmit an initial downlink transmission 1306 via the downlink portion 1302, and a second TRP having a second TCI state may transmit a repeat of the initial downlink transmission 1310 via the downlink subbands of the SBFD symbols.

In this example, the UE 104 may determine a transport block size (TBS) associated with the downlink signal and the repetition of the downlink signal based on: (i) a minimum of a total number of physical resources blocks (PRBs) associated with the downlink signal and a total number of PRBs associated with the two repetitions of the downlink signal ($n_{PRB}$=min ($N_{PRB\ (TCI\ \#1)}$, $N_{PRB\ (TCI\ \#1)}$), or (ii) the total number of PRBs of the repetition of the downlink signal associated with the first repetition or second repetition excluding the PRBs outside the downlink subband. Thus, the UE may determine and used the same TBS for decoding both of the initial downlink and the repetition of the initial downlink based on which of the initial downlink or the repetition of the downlink has the lower number of PRBs.

Figure 14:
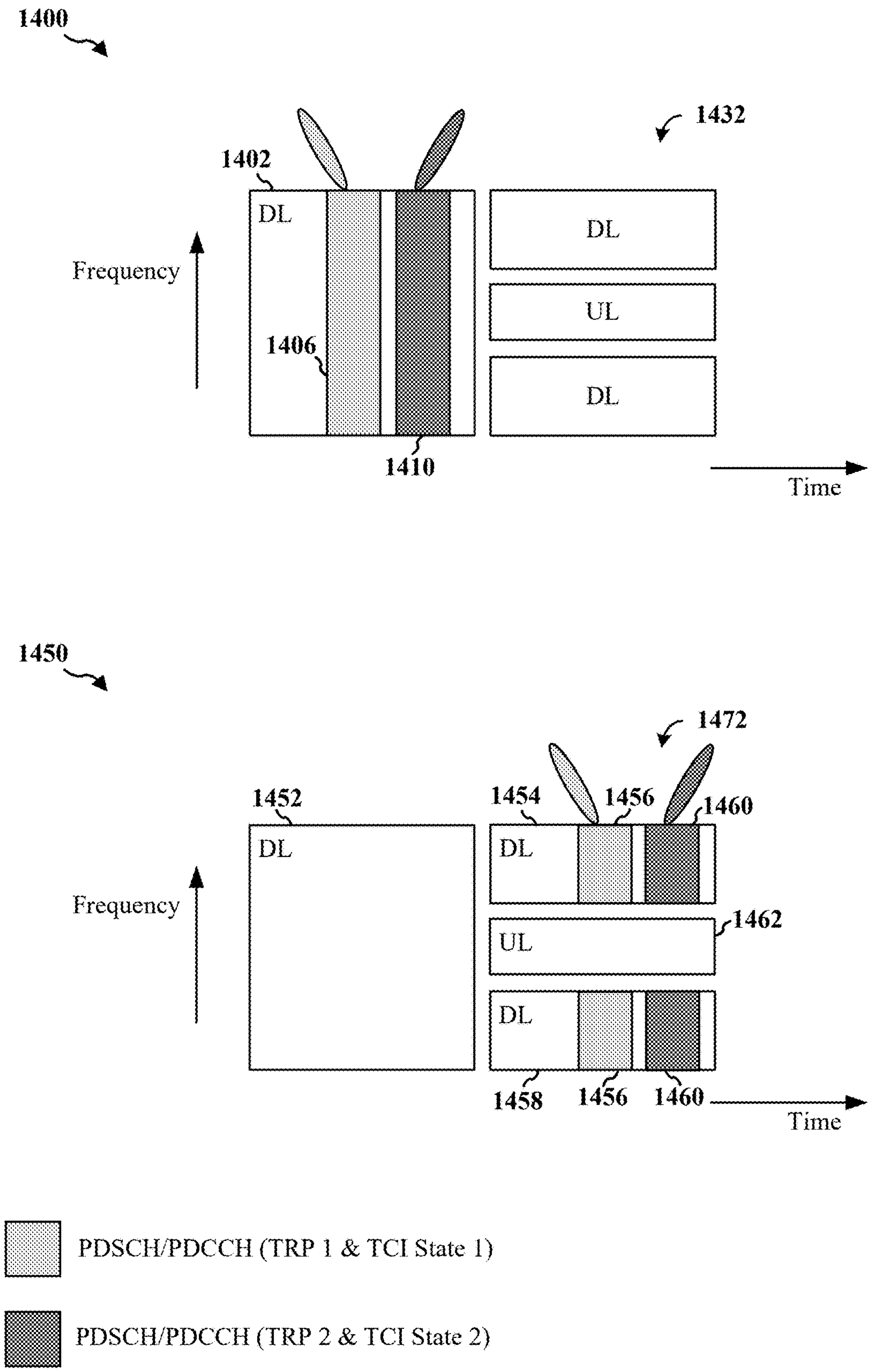
FIG. 14 is a block diagram illustrating a non-SBFD mTRP transmission and an SBFD mTRP transmission.

Alternatively, the base station 102 may determine to transmit both the initial downlink transmission and the repeat of the initial downlink transmission via one of the SBFD symbols or the non-SBFD symbols. FIG. 14 is a block diagram illustrating a non-SBFD mTRP transmission 1400 and an SBFD mTRP transmission 1450. In both examples, the initial downlink signal is transmitted via a first TRP having a first TCI state, and the repetition of the initial downlink signal is transmitted via a second TRP having a second TCI state.

The non-SBFD mTRP transmission 1400 shows an example of a slot having both of an SBFD portion 1432 and a non-SBFD portion 1402 configured for downlink. Here, an mTRP downlink transmission includes the first TRP transmitting an initial downlink signal 1406 and the second TRP transmits a repetition of the initial downlink signal 1410 via the non-SBFD portion 1402 of the slot. The SBFD mTRP transmission 1450 shows an example of a slot having both of a non-SBFD portion 1452 configured for downlink and an SBFD portion 1472 having a first downlink subband 1454, an uplink subband 1462, and a second downlink subband 1458. Here, an mTRP downlink transmission includes the first TRP transmitting an initial downlink signal 1456 via the downlink subbands and the second TRP transmitting a repetition of the initial downlink signal 1460 via the downlink subbands of the SBFD portion 1472. Note that the uplink subband 1462 punctures the downlink transmissions similar to SBFD transmissions of other examples described herein.

Whether the UE 104 can expect the mTRP downlink transmissions (e.g., initial downlink and repeated downlink) to both fall within the non-SBFD symbols of a slot, both fall within the SBFD symbols of a slot, or fall within the non-SBFD symbols and the SBFD symbols of a slot, may be indicated by the base station 102. Such an indication may be part of the mTRP configuration (e.g., first communication 702 of FIG. 7), may be part of the SBFD configuration (e.g., optional second communication 704 of FIG. 7), or both.

In certain aspects, the base station 102 may configure the UE 104 for mTRP communications via an FDM scheme, wherein an initial downlink transmission and a repetition of the initial downlink transmission are both transmitted via the same symbols but in different frequency bands. In one example, each set of two different resource block (RB) sets (e.g., initial downlink and repetition of initial downlink) may be transmitted by a different TRP having a TCI state different from the other TRP. Thus, a first TRP may transmit an initial downlink signal via a first set of frequency-domain resources, and a second TRP may transmit a repetition of the downlink signal via a second set of frequency-domain resources, and both downlink transmissions may share the same time-domain resources.

In one example, a frequency domain resource allocation (FDRA) field in a DCI may provide the UE 104 with an RB allocation associated with each TCI state. In a wideband downlink precoding of mTRP communication, each set of RBs may have the same downlink precoder, and the number of RBs used for the initial downlink transmission and the repetition of the initial downlink transmission may be calculated by the total number of PRBs divided by two. The ceiling is associated with the first RB set and the remaining is associated with the second RB set (e.g., the repetition). Thus, mTRP communications via wideband may use frequency-domain resources that are split evenly among the first RB set and the second RB set.

For a narrowband downlink precoding of mTRP communication, every consecutive set of RBs of a PRG may have the same precoder, and the frequency-domain resources for the mTRP communication may be divided into even PRGs and odd PRGs. The even PRGs may be associated with the first RB set, and the odd PRGs may be associated with the second RB set. go to repeated DL. mTRP communications via narrowband may interleave the use frequency-domain resources used by the first RB set and the second RB set.

Figure 15:
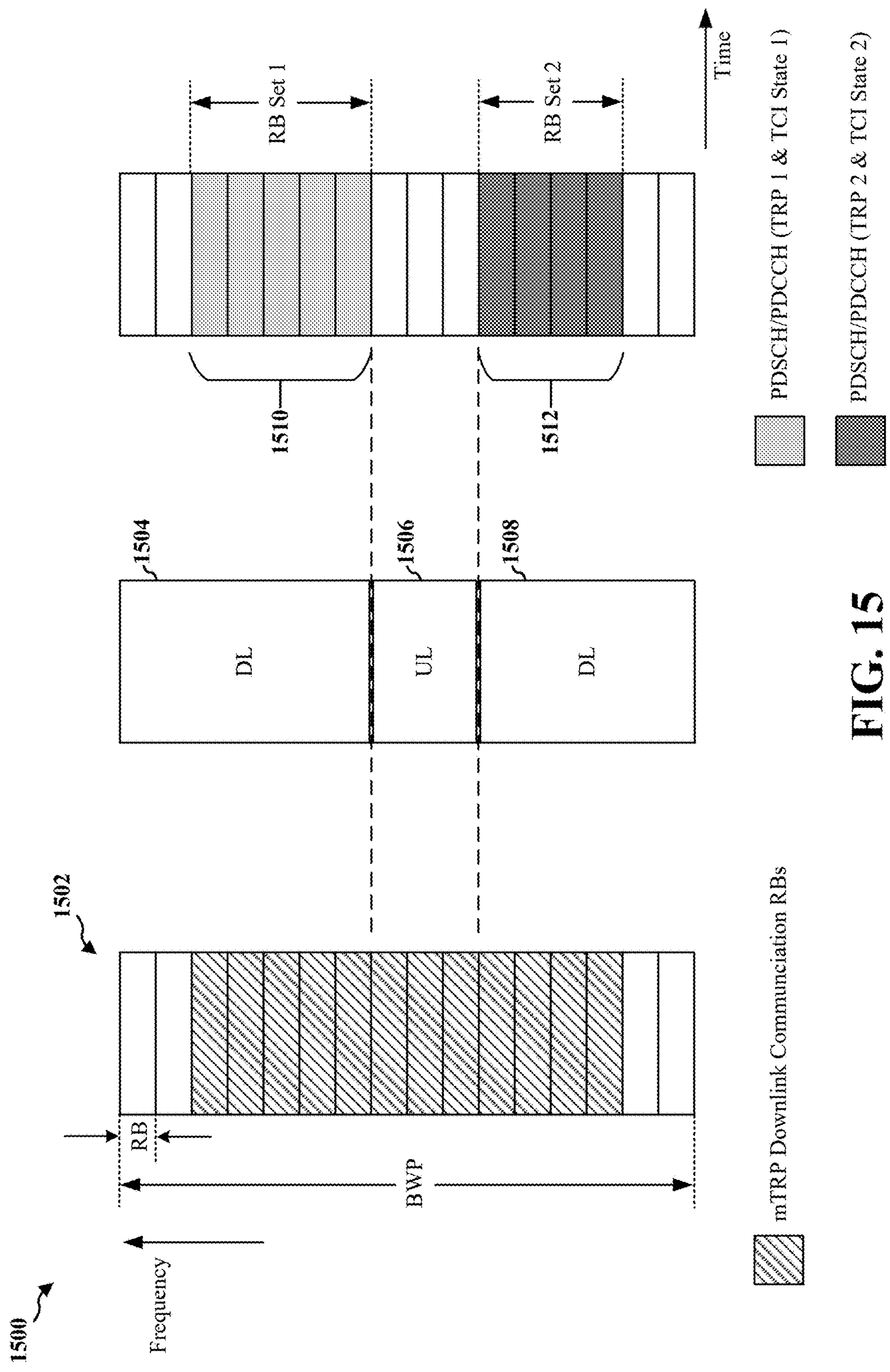
FIG. 15 is a block diagram illustrating an example of wideband mTRP communications.

FIG. 15 is a block diagram illustrating an example of wideband mTRP communication 1500 where a first TRP having a first TCI state transmits downlink signaling via a first RB set (e.g., RB set 1), and a second TRP having a second TCI state transmits downlink signaling via a second RB set (e.g., RB set 2). As illustrated, the RB resources may be part of a bandwidth part (BWP), but such communications may be performed using any suitable RB allocation and/or scheduling.

A configured BWP 1502 may include 16 RBs for downlink communication between the base station 102 and the UE 104, of which 12 RBs may be used for an mTRP communication based on the FDRA of the scheduled downlink communication. When the BWP 1502 falls within one or more SBFD symbols, some resources of the SBFD symbols cannot be used for downlink because they are punctured by the uplink subband 1506. Here, the BWP 1502 may be split into a first downlink subband 1504, an uplink subband 1506, and a second downlink subband 1508. Thus, codeword (CW) allocation for each downlink subband may be restricted. Accordingly, the UE 104 may determine the PRBs for each RB set by considering the uplink subband 1506. As noted above, the FDRA may provide the UE with a start of the RBs and/or a quantity of RBs that will be used for mTRP downlink transmissions (e.g., a sum of RBs in the first RB set and the second RB set). A DCI message may provide the UE 104 with an indication of RB allocation for both TCI states (e.g., both subbands, as each TCI state corresponds to one of the subbands). Accordingly, when PRB is determined as wideband, the UE 104 may exclude the PRBs outside the downlink subband, (e.g., excluding the PRBs) in the uplink subband (and, in some examples, the guard band(s)), and based on this exclusion, associate the first RB set with the RBs in the first downlink subband 1504 and associated the second RB set with the RBs in the second downlink subband 1508.

As such, the UE 104 may map different RB sets to different subbands and receive an initial downlink transmission 1510, from the first TRP having the first TCI state, via the first downlink subband 1504, and receive a repetition of the initial downlink transmission 1512 from the second TRP having the second TCI state, via the second downlink subband 1508.

Figure 16:
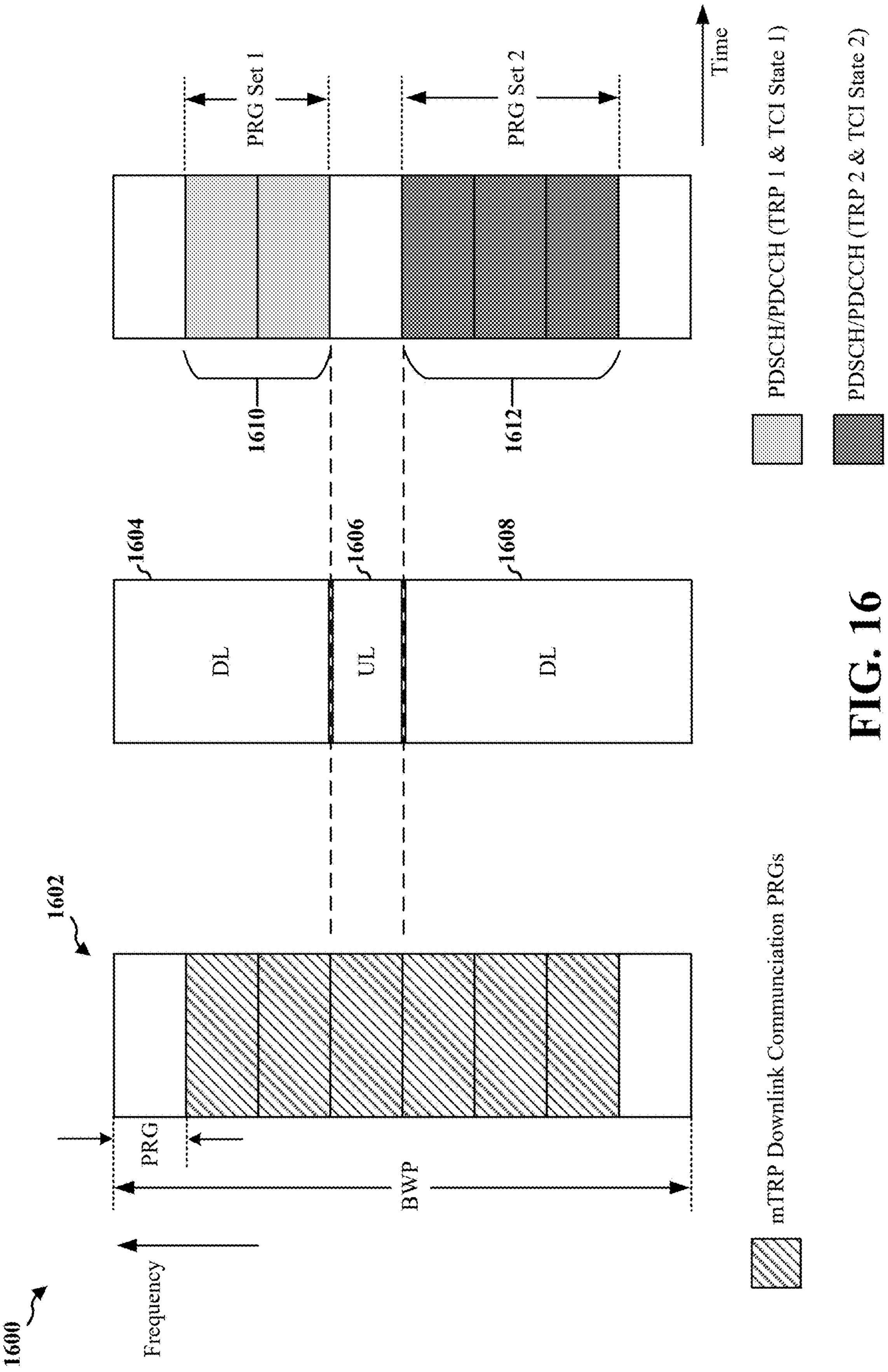
FIG. 16 is a block diagram illustrating an example of narrowband mTRP communications.

FIG. 16 is a block diagram illustrating an example of narrowband mTRP communication 1600 where a first TRP having a first TCI state transmits downlink signaling via a first RB set (e.g., precoder resource group (PRG) set 1), and a second TRP having a second TCI state transmits downlink signaling via a second RB set (e.g., PRG set 2). As illustrated, the PRG resources may be part of a bandwidth part (BWP), but such communications may be performed using any suitable PRG allocation and/or scheduling.

A configured BWP 1602 may include 8 PRGs for downlink communication between the base station 102 and the UE 104, of which 6 PRGs may be used for an mTRP communication. When the BWP 1602 falls within one or more SBFD symbols, some resources of the SBFD symbols cannot be used for downlink because they are punctured by an uplink subband 1606. Here, the BWP 1602 may be split into a first downlink subband 1604, the uplink subband 1606, and a second downlink subband 1608. Thus, codeword (CW) allocation for each downlink subband may be restricted. Accordingly, the UE 104 may determine the PRBs for each RB set by considering the uplink subband 1606.

When PRG is determined as narrowband (e.g., PRG=2 or 4), the UE 104 may exclude the PRGs in the uplink subband (and, in some examples, the guard band(s)), and based on this exclusion, associate the first RB set with the PRGs in the first downlink subband 1604 and associated the second RB set with the PRGs in the second downlink subband 1608.

As such, the UE 104 may map different RB sets to different subbands and receive an initial downlink transmission 1610, from the first TRP having the first TCI state, via the first downlink subband 1604, and receive a repetition of the initial downlink transmission 1612 from the second TRP having the second TCI state, via the second downlink subband 1608. It should be noted that the initial downlink transmission 1610 and the repetition of the initial downlink transmission 1612 may not be interleaved.

In certain aspects, the base station 102 may configure the UE 104 for mTRP communications via an FDM scheme, wherein an initial downlink transmission and a repetition of the initial downlink transmission are both transmitted via the same symbols but in different downlink frequency subbands. In one example, each set of two different RB sets (e.g., initial downlink and repetition of initial downlink) may be transmitted by a different TRP having a TCI state different from the other TRP. In such a scenario, the UE 104 may determine a TBS (e.g., $n_{PRB}$) to avoid a high coding rate in one or both of the RB sets. In one scenario, $n_{PRB}$ is the total number of allocated PRBs corresponding to the first TCI state (or second TCI states) excluding the PRBs excluding the PRBs in UL-SB (and in some scenarios the guardband, if exist), $n_{PRB}=n_{PRB\_1}$ or $n_{PRB}=n_{PRB\_2}$. In another scenario, $n_{PRB}$ is the minimum number of allocated PRBs of the first and second TCIs, $n_{PRB}=\min(n_{PRB\text{-}1}, n_{PRB\_2})$.

Figure 17:
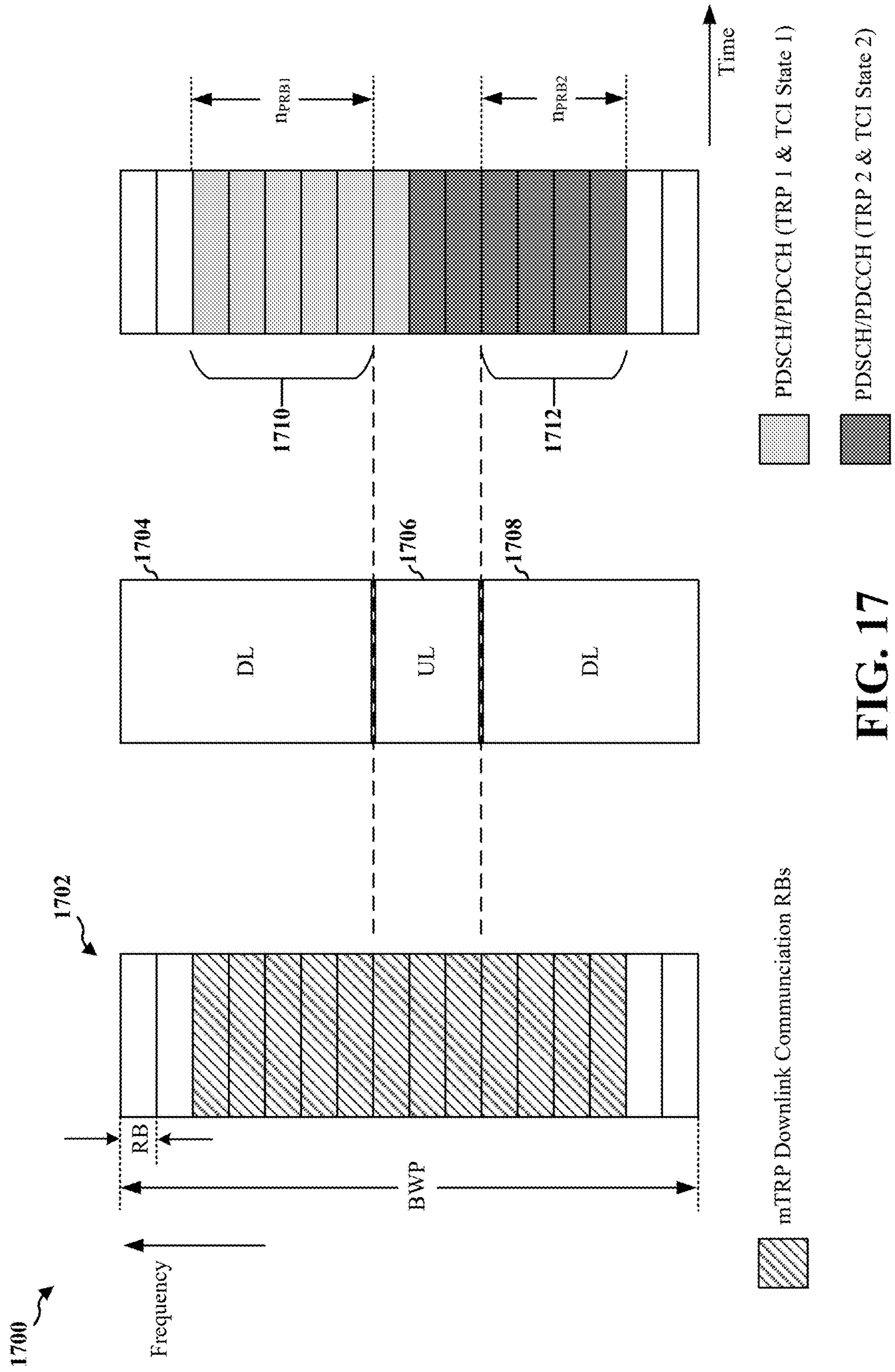
FIG. 17 is a block diagram illustrating an example of mTRP communications.

FIG. 17 is a block diagram illustrating an example of mTRP communication 1700 where a first TRP having a first TCI state transmits downlink signaling via a first RB set and a second TRP having a second TCI state transmits downlink signaling via a second RB set. As illustrated, the PRG resources may be part of a bandwidth part (BWP), but such communications may be performed using any suitable PRG allocation and/or scheduling.

A configured BWP 1702 may include 16 RBs for downlink communication between the base station 102 and the UE 104, of which 12 RBs may be used for an mTRP downlink communication. When the BWP 1702 falls within one or more SBFD symbols, some frequency-domain resources of the SBFD symbols cannot be used for downlink because they are punctured by an uplink subband 1706. Here, the BWP 1702 may be split into a first downlink subband 1704, an uplink subband 1706, and a second downlink subband 1708. As such, the UE 104 may map different RB sets to different subbands and receive an initial downlink transmission 1710, from the first TRP having the first TCI state, via the first downlink subband 1704, and receive a repetition of the initial downlink transmission 1712 from the second TRP having the second TCI state, via the second downlink subband 1708. Conventionally, the UE 104 may determine the TBS based on the first RB set. However, with one or more SBFD symbols, the UE 104 may determine TBS according to the following.

In certain aspects, the UE 104 may determine the TBS based on a determination of an amount of PRBs ($n_{PRB1}$) associated with the first TCI state (e.g., the first RB set) excluding any PRBs that fall within the uplink subband 1706 and/or guard band(s). As illustrated, there are 6 PRBs associated with the first TCI state; however, one of them falls within the uplink subband 1706. Thus, the UE 104 may determine the TBS associated with RBs received via the initial downlink transmission 1710 and the repetition of the initial downlink transmission 1712, is 5.

In certain aspects, the UE 104 may determine the TBS based on a determination of an amount of PRBs associated with both the first TCI state (e.g., the first RB set) and the second TCI state, excluding any PRBs that fall within the uplink subband 1706 and/or guard band(s). Thus, the UE 104 may determine $n_{PRB1}$ and $n_{PRB2}$. The UE 104 may then determine the TBS based on the lowest or minimum of the two PRB amounts. As illustrated, there are 6 PRBs associated with the first TCI state and 6 PRBs associated with the second TCI state. However, the first TCI state has one PRB that falls within the uplink subband 1706 resulting in 5 PRBs, and the second TCI state has two PRBs that fall within the uplink subband 1706 resulting in 4 PRBs. Thus, the UE 104 may determine the TBS associated with RBs received via the initial downlink transmission 1710 and the repetition of the initial downlink transmission 1712, is 4.

In certain aspects, the base station 102 may configure the UE 104 for mTRP communications via an intra-slot downlink PDCCH repetition scheme, wherein an initial downlink PDCCH transmission and a repetition of the initial downlink transmission are both transmitted within the same slot. In some examples, the mTRP downlink repetition scheme may relate to linked search spaces (SSs) associated with downlink control information transmitted via corresponding control resource sets (CORESETs). In some examples, a CORESET may be an SS within a BWP.

An SS is a predefined area within a BWP where the UE 104 is configured to look for control information. Linking SSs to BWPs or CORESETs allows the UE 104 to locate and decode the necessary control information. The base station 102 may configure the UE 104 with one or more BWPs and may link each BWP with one or more CORESETs, each of which corresponds to an SS. Thus, SSs are essentially predefined areas within a BWP where certain information, such as control information, can be found.

In an mTRP scenario, repeat downlink transmission may occur in different, linked SSs with each SS associated with a corresponding CORESET with a different TCI state. For example, the base station 102 may configure the UE 104 with a first SS associated with a first CORESET and a first TCI state of a first TRP, and a second SS associated with a second CORESET and a second TCI state of a second TRP. Here, repeated downlink transmissions occurring in linked SSs may have the same payload (e.g., DCI) and the same coded bits. The base station 102 may notify the linked SSs via RRC configuration message (e.g., mTRP configuration of the first communication 702 of FIG. 7) wherein the RRC provides a one-to-one mapping between the linked SSs. The linked SSs may also be configured with the same aggregation level (AL).

Figure 18:
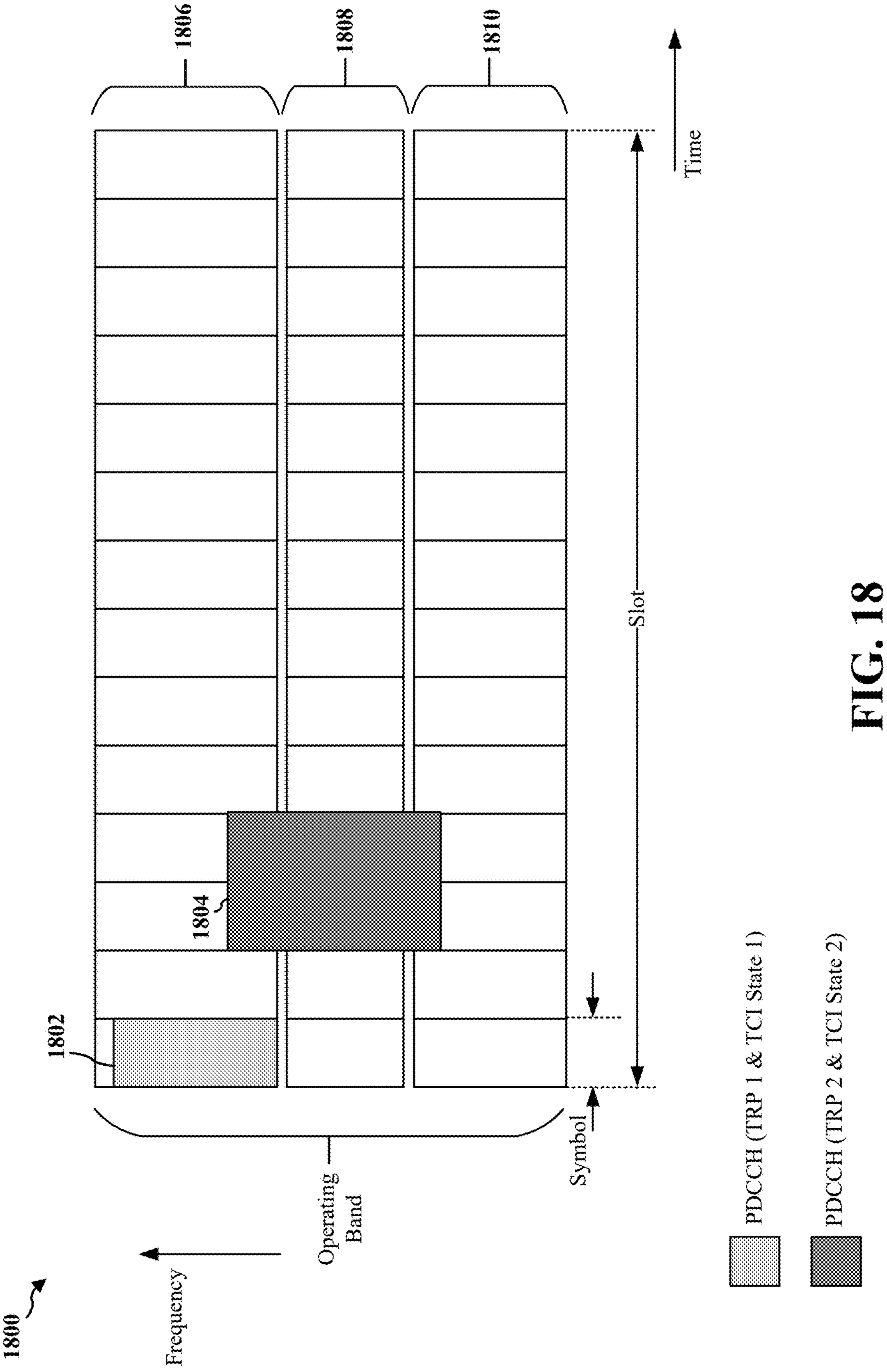
FIG. 18 is a block diagram illustrating an example slot having a first search space (SS) and a second SS configured as linked SSs.

FIG. 18 is a block diagram illustrating an example slot 1800 having a first SS 1802 and a second SS 1804 configured as linked search spaces. The first SS 1802 and the second SS 1804 may be associated or "linked" with a specific BWP. Here, the example slot 1800 includes 14 SBFD symbols that split the slot into a first downlink subband 1806, an uplink subband 1808, and a second downlink subband 1810. In certain aspects, if an SS cannot be received because it is punctured by an overlapping uplink subband and/or guard band(s), then the UE 104 may refrain from monitoring PDCCH candidate in the punctured SS and may instead monitor the linked SS that is not punctured.

In this example, the second SS 1804 is punctured by the uplink subband 1808, and thus, the UE may drop (e.g., not monitor) for PDCCH candidates in the second SS 1804. Thus, the UE 104 may fall back to sTRP communication, and monitor only the TRP not associated with the second SS 1804.

FIG. 19 is a flowchart of a method 1900 of wireless communication. The method may be performed by a UE (e.g., the UE 104; the apparatus 2802). Specifically, the method may be performed by one or more processors and one or more memories (e.g., the controller/processor 359 and memory 360 in FIG. 3).

At 1902, the UE may receive, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. For example, 1902 may be performed by a receiving component 2840. Here, a network entity may configure the UE to receive downlink communications during both SBFD and non-SBFD symbols. During non-SBFD symbols, the UE may receive downlink transmissions via an mTRP scheme. However, during SBFD symbols, the UE may switch to (or fallback to) an sTRP communication scheme where the UE relies on a single TRP, or the UE may maintain the mTRP scheme but one or more of the TRPs used for non-SBFD symbol communications may switch for SBFD symbol communications.

At 1904, the UE may, during the SBFD symbols, switch from the mTRP downlink communication to the sTRP downlink communication or continue the mTRP downlink communication by switching to one or more of the third TRP or the fourth TRP. For example, 1904 may be performed by a switching component 2842. Here, the UE may adjust its method of communication when it transitions from non-SBFD symbols to SBFD symbols.

At 1906, the UE may optionally reset the first TCI state repetition pattern at a transition from the non-SBFD symbols to the SBFD symbols. For example, 1906 may be performed by a resetting component 2844. Here, a same beam mapping pattern may be applicable to both SBFD and non-SBFD symbols. Thus, the beam pattern may be reset after switching from non-SBFD symbols to SBFD symbols, as discussed further in connection with FIGS. 9 and 10.

At 1908, the UE may optionally continue the first TCI state repetition pattern during a transition from the non-SBFD symbols to the SBFD symbols. For example, 1908 may be performed by a repeating component 2846. Here, a same beam mapping pattern may be applicable to both SBFD and non-SBFD symbols. Thus, the beam pattern may be continued after switching from non-SBFD symbols to SBFD symbols, as discussed further in connection with FIGS. 9 and 10.

At 1910, the UE may optionally switch, at a transition from the non-SBFD symbols to the SBFD symbols, to the sTRP downlink communication to continue wireless communication via the SBFD symbols, wherein the wireless configuration further configures the UE to receive one or more of the downlink repetitions from one of the first TRP or the second TRP via one or more subbands of the SBFD symbols. For example, 1910 may be performed by the switching component 2842. Here, the UE and network entity may use a TDM scheme for communicating non-SBFD symbols. Thus, in some examples, if the UE falls back to sTRP for SBFD symbols, the UE may be configured to either ignore repeated downlink signals or receive downlink repetitions from the same TRP, as discussed in connection with FIG. 12.

At 1912, the UE may optionally determine a transport block size (TBS) associated with the downlink signal and the repetition of the downlink signal based on: (i) a minimum of a total number of physical resources blocks (PRBs) associated with the downlink signal and a total number of PRBs associated with the repetition of the downlink signal, or (ii) the total number of PRBs of the repetition of the downlink signal in the SBFD symbols excluding the PRBs outside of downlink SBFD symbols. For example, 1912 may be performed by a determining component 2848.

In certain aspects, the wireless configuration is received via a radio resource control (RRC) message, and wherein the indication that configures the UE to continue wireless communication via the SBFD symbols is an explicit indication of the RRC message.

In certain aspects, the indication that configures the UE to continue wireless communication via the SBFD symbols is an implicit indication comprising one or more transmission configuration indicator (TCI) states associated with one or more of the third TRP or the fourth TRP.

In certain aspects, the wireless configuration for mTRP downlink communication comprises an indication of unified TCI states associated with the first TRP and the second TRP for receiving downlink transmissions via the non-SBFD symbols, and wherein the indication that configures the UE to continue wireless communication via the SBFD symbols comprises the one or more TCI states for receiving downlink transmissions via the SBFD symbols.

In certain aspects, the wireless configuration further configures the UE for inter-slot downlink repetition via a time-division multiplexing (TDM) scheme, and wherein the wireless configuration further configures the UE to reset a redundancy version (RV) associated with the downlink repetition during a transition from the non-SBFD symbols to the SBFD symbols.

In certain aspects, the SBFD symbols and the non-SBFD symbols are contained within a slot, and wherein the indication further configures the UE to receive a downlink signal and a repetition of the downlink signal via either the SBFD symbols or the non-SBFD symbols of the slot.

In certain aspects, the SBFD symbols and the non-SBFD symbols are contained within a slot, and wherein the indication further configures the UE to receive a downlink signal via the non-SBFD symbols of the slot and receive a repetition of the downlink signal via the SBFD symbols of the slot.

Figure 20:
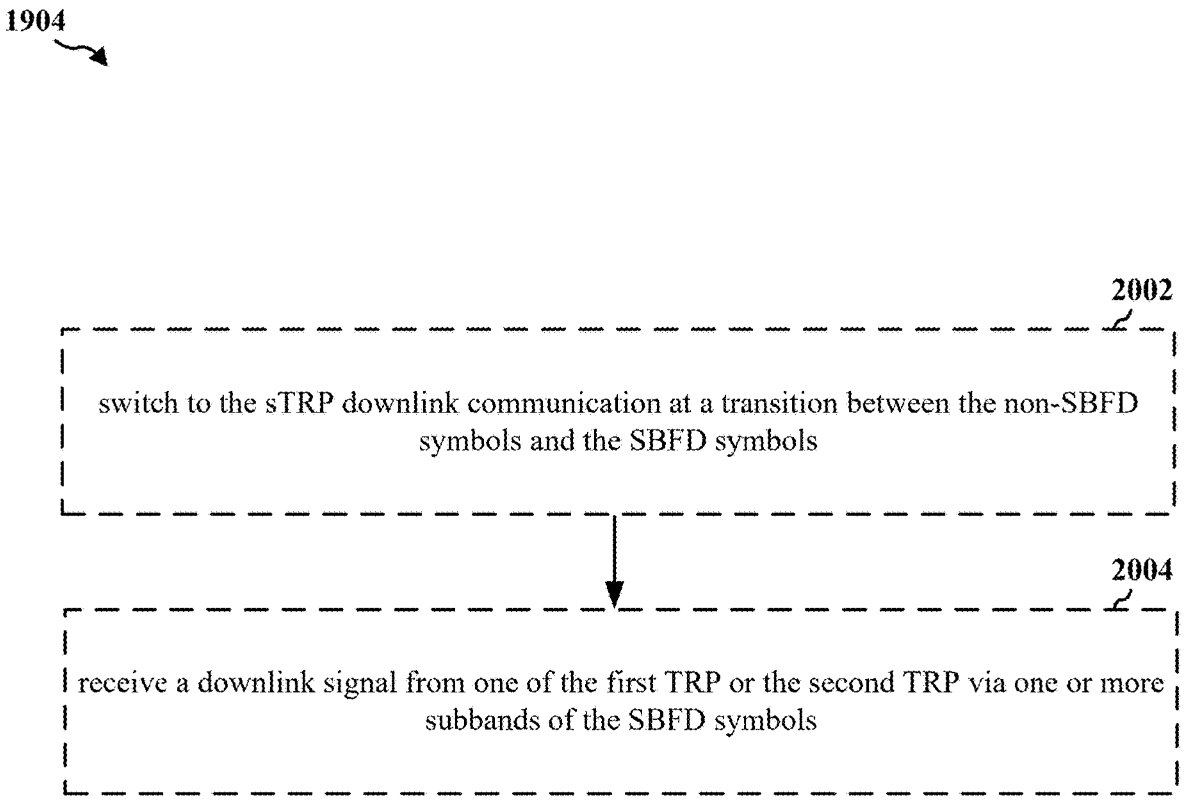
FIG. 20 is another flowchart illustrating additional aspects of the method of wireless communication of FIG. 19.

Referring to FIG. 20, in an alternative or additional aspect the method 1900 at 1904 may optionally include 2002 where the UE may switch to the sTRP downlink communication at a transition between the non-SBFD symbols and the SBFD symbols. For example, 2002 may be performed by the switching component 2842. Here, the UE may switch from an mTRP downlink communication scheme during non-SBFD symbols to an sTRP downlink communication scheme during SBFD symbols.

The method 1900 at 1904 may optionally further include 2004 where the UE may receive a downlink signal from one of the first TRP or the second TRP via one or more subbands of the SBFD symbols. For example, 2004 may be performed by the receiving component 284. Here, the UE may switch (e.g., fallback) to sTRP communications during a transition from non-SBFD symbols to SBFD symbols. Specifically, the UE may maintain communication with one of the TRPs used for mTRP during the non-SBFD symbols.

Figure 21:
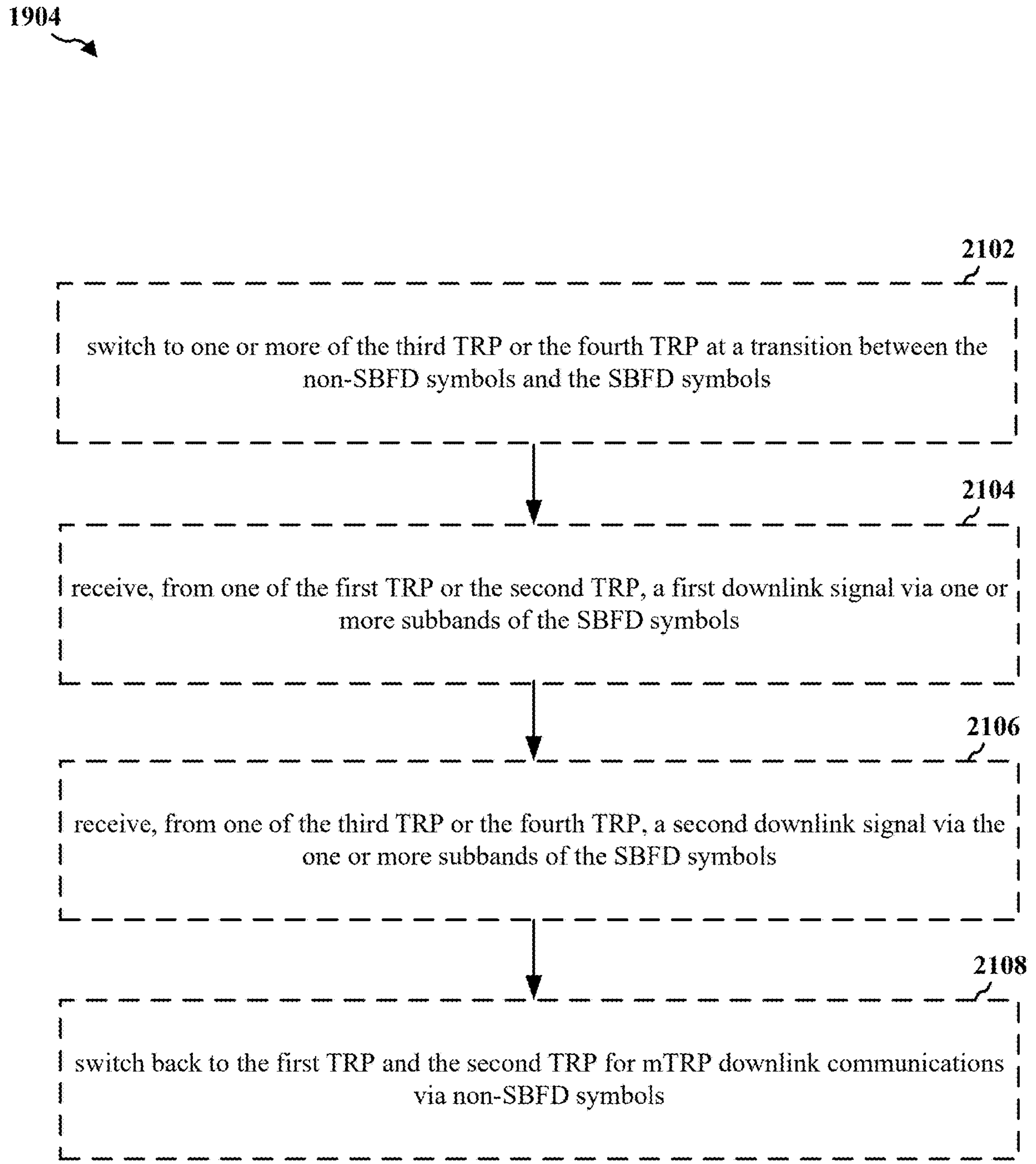
FIG. 21 is another flowchart illustrating additional aspects of the method of wireless communication of FIG. 19.

Referring to FIG. 21, in an alternative or additional aspect the method 1900 at 1904 may optionally include 2102 where the UE may switch to one or more of the third TRP or the fourth TRP at a transition between the non-SBFD symbols and the SBFD symbols. For example, 2102 may be performed by the switching component 2842. Here, during a transition from non-SBFD symbols to SBFD symbols, the UE may maintain mTRP communications (e.g., instead of falling back to sTRP) but my change one or more of the TRPs used during non-SBFD communications.

The method 1900 at 1904 may optionally further include 2104 where the UE may receive, from one of the first TRP or the second TRP, a first downlink signal via one or more subbands of the SBFD symbols. For example, 2104 may be performed by the receiving component 2840. Here, the UE may continue to communicate with the first TRP or the second TRP during SBFD symbols that was used during non-SBFD symbols.

The method 1900 at 1904 may optionally further include 2106 where the UE may receive, from one of the third TRP or the fourth TRP, a second downlink signal via the one or more subbands of the SBFD symbols. For example, 2106 may be performed by the receiving component 2840. Here, during the SBFD symbols, the UE may maintain the mTRP communication scheme but one or more of the TRPs used during the non-SBFD symbols may be replaced by the third TRP or the fourth TRP.

The method 1900 at 1904 may optionally further include 2108 where the UE may switch back to the first TRP and the second TRP for mTRP downlink communications via non-SBFD symbols. For example, 2108 may be performed by the switching component 2842. Here, when the UE transitions from the SBFD symbols back to the non-SBFD symbols, the UE may switch back to the TRPs it used for mTRP communications prior to the switch to SBFD symbols.

In certain aspects, the second downlink signal is a repetition of the first downlink signal, the wireless configuration further configures the UE to receive the first downlink signal and the second downlink signal as single frequency network (SFN) downlink transmissions, or the wireless configuration further configures the UE to receive the first downlink signal and the second downlink signal via time-division multiplexing (TDM), frequency-division multiplexing (FDM), or spatial-division multiplexing (SDM).

Figure 22:
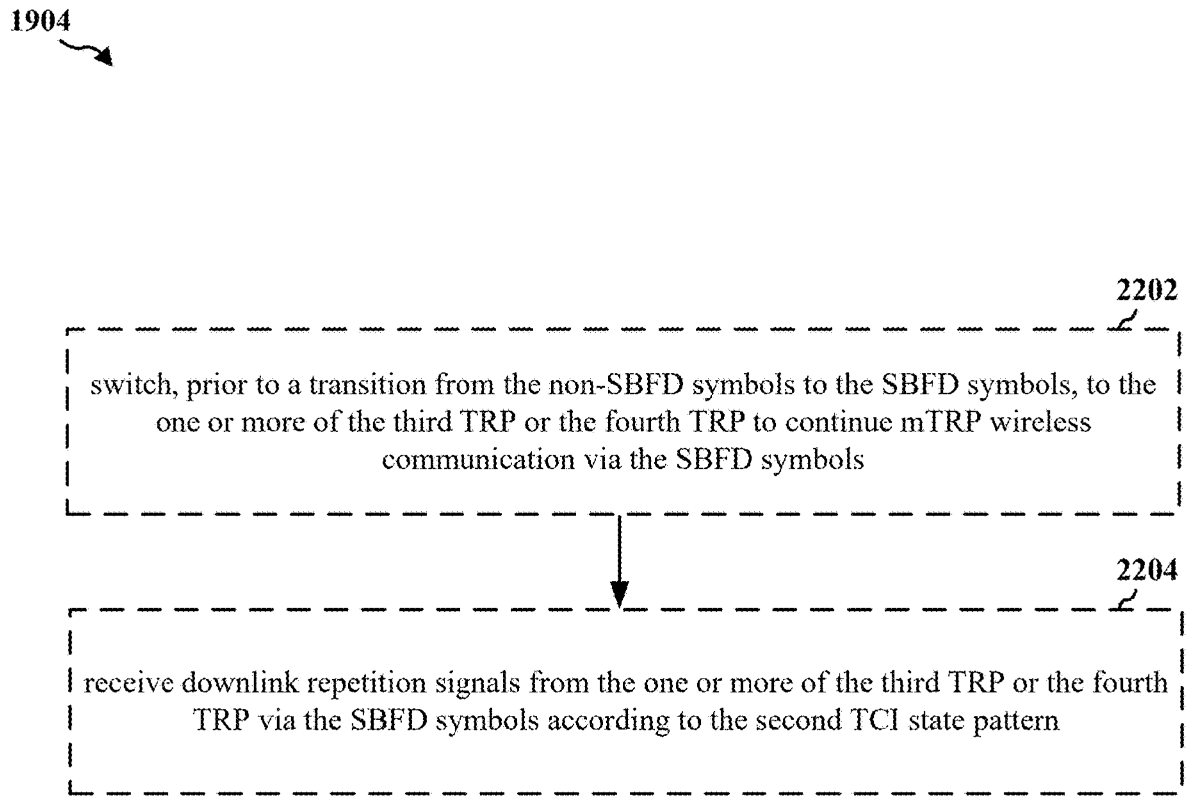
FIG. 22 is another flowchart illustrating additional aspects of the method of wireless communication of FIG. 19.

Referring to FIG. 22, in an alternative or additional aspect the method 1900 at 1904 may optionally include 2202 where the UE may switch, prior to a transition from the non-SBFD symbols to the SBFD symbols, to the one or more of the third TRP or the fourth TRP to continue mTRP wireless communication via the SBFD symbols. For example, 2102 may be performed by the switching component 2842. Here, during a transition from non-SBFD symbols to SBFD symbols, the UE may maintain mTRP communications (e.g., instead of falling back to sTRP) but my change one or more of the TRPs used during non-SBFD communications.

The method 1900 at 1904 may optionally further include 2204 where the UE may receive downlink repetition signals from the one or more of the third TRP or the fourth TRP via the SBFD symbols according to the second TCI state pattern. For example, 2204 may be performed by the receiving component 2840. Here, the UE remains in mTRP communication mode (does not fallback to sTRP) and receives downlink repetition signals via other TRPs associated with the TCI states for SBFD symbols.

In certain aspects, the wireless configuration further configures the UE for inter-slot downlink repetition via a time-division multiplexing (TDM) scheme, and wherein the wireless configuration further configures the UE with: (i) a first transmission configuration indicator (TCI) state repetition pattern for mTRP downlink communication with the first TRP and the second TRP via non-SBFD symbols, and (ii) a second TCI state pattern for mTRP downlink communication via the SBFD symbols.

Figure 23:
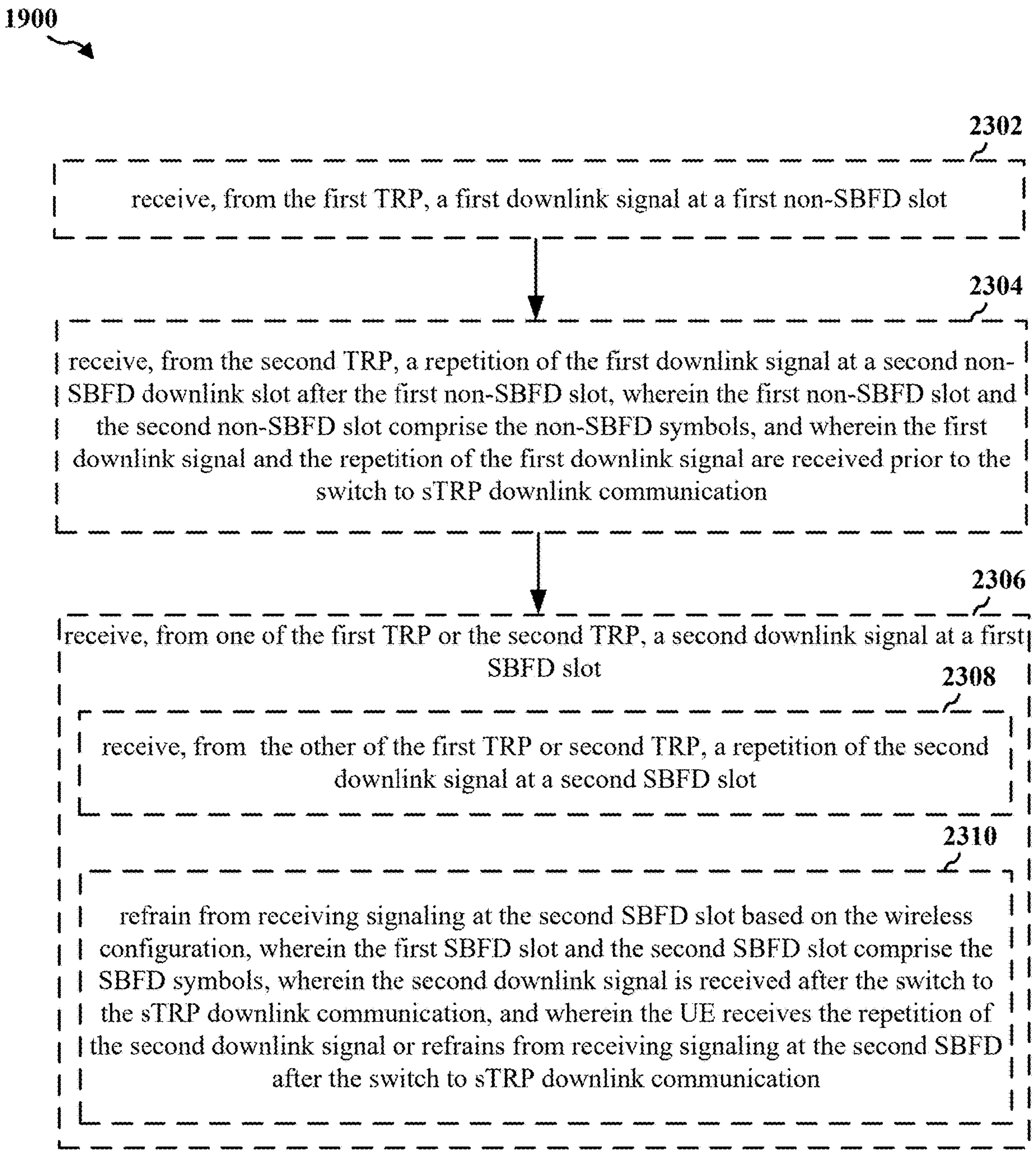
FIG. 23 is another flowchart illustrating additional aspects of the method of wireless communication of FIG. 19.

Referring to FIG. 23, in an alternative or additional aspect the method 1900 may optionally include 2302 where the UE may receive, from the first TRP, a first downlink signal at a first non-SBFD slot. For example, 2302 may be performed by the receiving component 2840.

The method 1900 may optionally further include 2304 where the UE may receive, from the second TRP, a repetition of the first downlink signal at a second non-SBFD downlink slot after the first non-SBFD slot, wherein the first non-SBFD slot and the second non-SBFD slot comprise the non-SBFD symbols, and wherein the first downlink signal and the repetition of the first downlink signal are received prior to the switch to sTRP downlink communication. For example, 2304 may be performed by the receiving component 2840.

The method 1900 may optionally further include 2306 where the UE may receive, from one of the first TRP or the second TRP, a second downlink signal at a first SBFD slot. For example, 2306 may be performed by the receiving component 2840.

The method 1900 may optionally further include 2308 where the UE may receive, from the other of the first TRP or second TRP, a repetition of the second downlink signal at a second SBFD slot. For example, 2308 may be performed by the receiving component 2840.

The method 1900 may optionally further include 2310 where the UE may refrain from receiving signaling at the second SBFD slot based on the wireless configuration, wherein the first SBFD slot and the second SBFD slot comprise the SBFD symbols, wherein the second downlink signal is received after the switch to the sTRP downlink communication, and wherein the UE receives the repetition of the second downlink signal or refrains from receiving signaling at the second SBFD after the switch to sTRP downlink communication. For example, 2310 may be performed by the refraining component 2850.

Here, FIG. 23 relates to a UE receiving downlink repetitions during mTRP communications via non-SBFD slots, and after switching to sTRP during a transition to SBFD slots or symbols, the UE receives repetitions from the same TRP during SBFD slots, or the UE ignores SBFD resources, depending on how the UE is configured.

Figure 24:
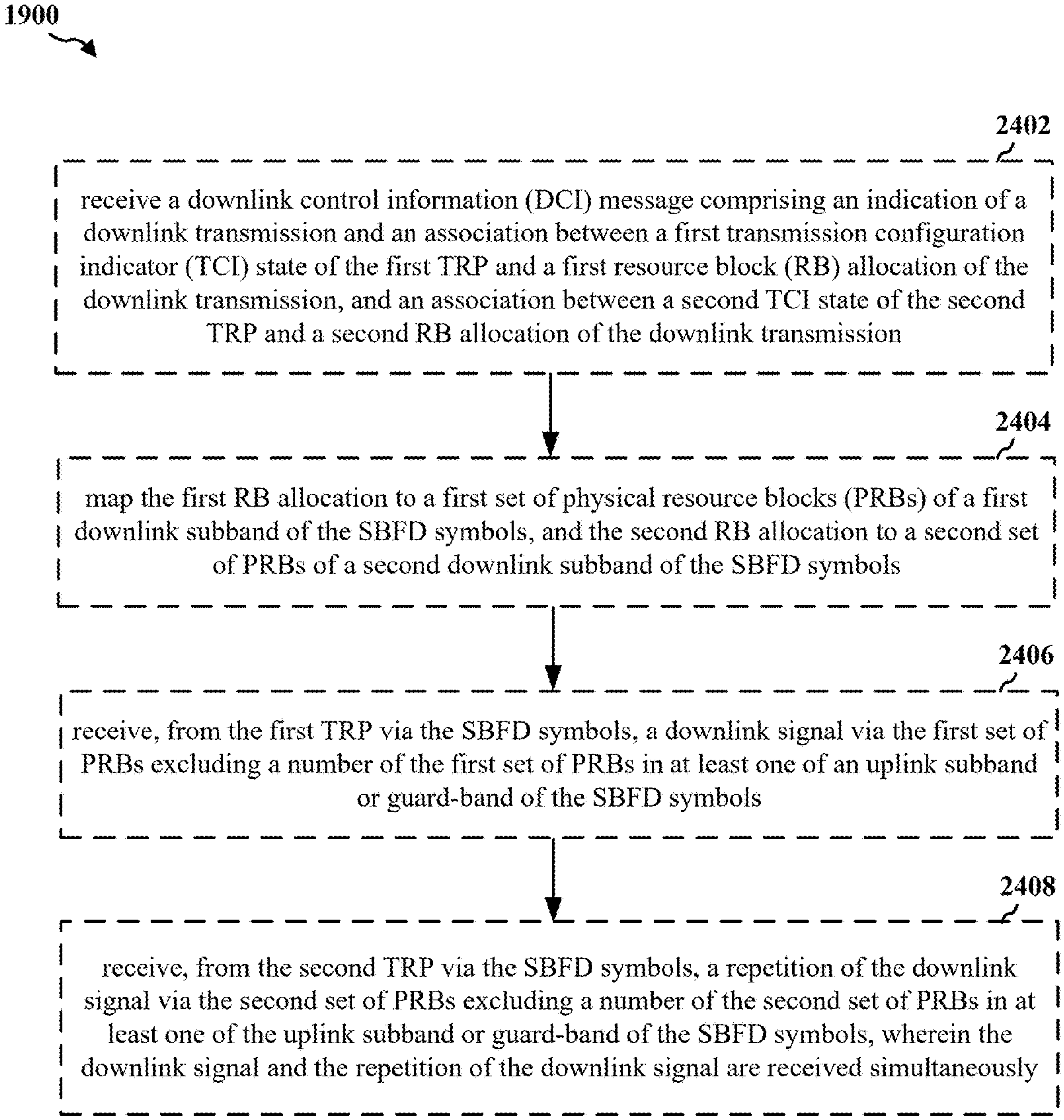
FIG. 24 is another flowchart illustrating additional aspects of the method of wireless communication of FIG. 19.

Referring to FIG. 24, in an alternative or additional aspect the method 1900 may optionally include 2402 where the UE may receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission. For example, 2402 may be performed by the receiving component 2840.

The method 1900 may optionally further include 2404 where the UE may map the first RB allocation to a first set of physical resource blocks (PRBs) of a first downlink subband of the SBFD symbols, and the second RB allocation to a second set of PRBs of a second downlink subband of the SBFD symbols. For example, 2404 may be performed by a mapping component 2852.

The method 1900 may optionally further include 2406 where the UE may receive, from the first TRP via the SBFD symbols, a downlink signal via the first set of PRBs excluding a number of the first set of PRBs in at least one of an uplink subband or guard-band of the SBFD symbols. For example, 2406 may be performed by the receiving component 2840.

The method 1900 may optionally further include 2408 where the UE may receive, from the second TRP via the SBFD symbols, a repetition of the downlink signal via the second set of PRBs excluding a number of the second set of PRBs in at least one of the uplink subband or guard-band of the SBFD symbols, wherein the downlink signal and the repetition of the downlink signal are received simultaneously. For example, 2408 may be performed by the receiving component 2840. Accordingly, aspects of FIG. 24 relates to a UE configured to map an RB allocation indicated in a DCI received from a network node to PRBs of downlink subbands.

Figure 25:
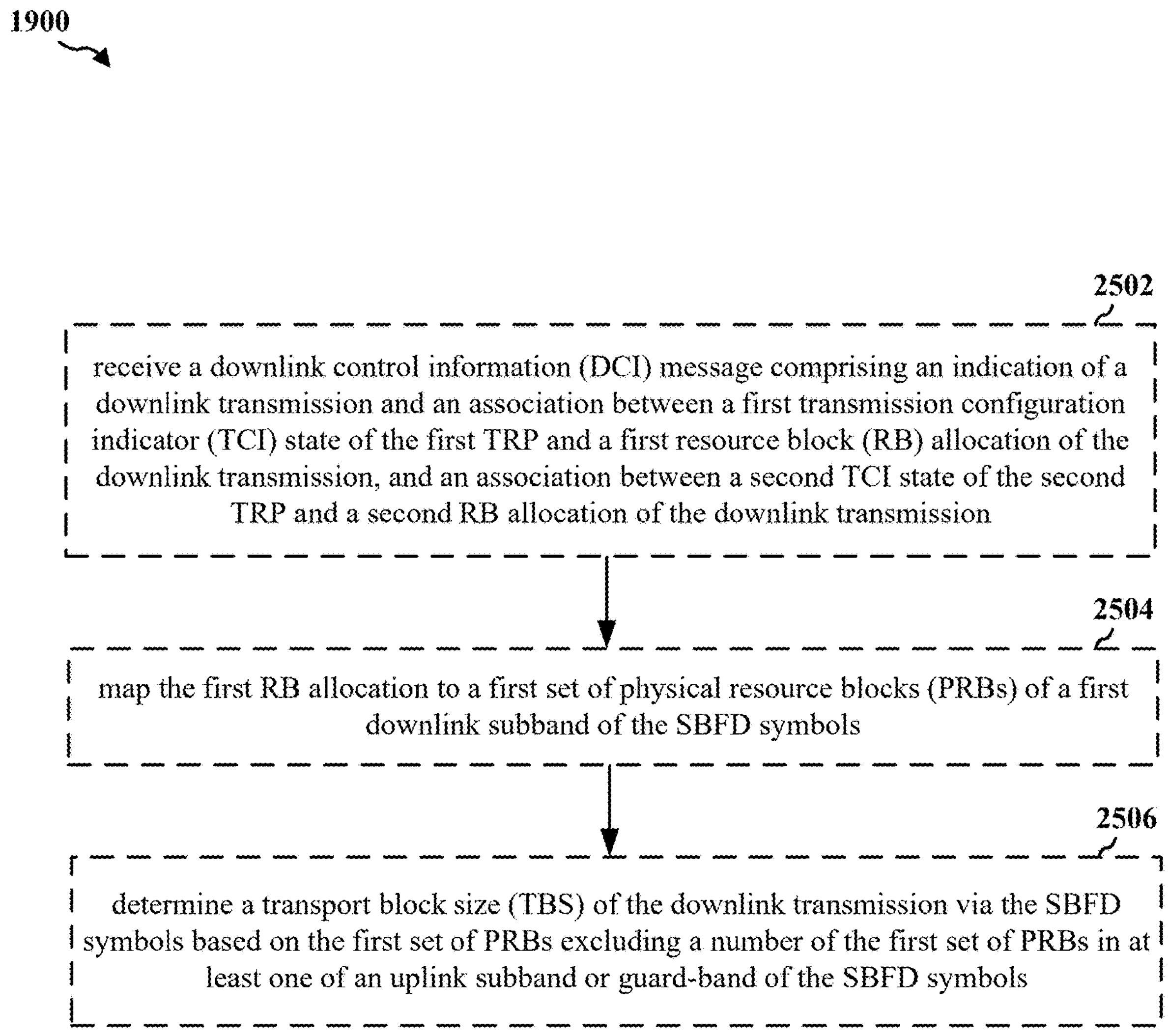
FIG. 25 is another flowchart illustrating additional aspects of the method of wireless communication of FIG. 19.

Referring to FIG. 25, in an alternative or additional aspect the method 1900 may optionally include 2502 where the UE may receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission. For example, 2502 may be performed by the receiving component 2840.

The method 1900 may optionally further include 2504 where the UE may map the first RB allocation to a first set of physical resource blocks (PRBs) of a first downlink subband of the SBFD symbols, and the second RB allocation to a second set of PRBs of a second downlink subband of the SBFD symbols. For example, 2504 may be performed by a mapping component 2852.

The method 1900 may optionally further include 2506 where the UE may determine a transport block size (TBS) of the downlink transmission via the SBFD symbols based on the first set of PRBs excluding a number of the first set of PRBs in at least one of an uplink subband or guard-band of the SBFD symbols. For example, 2506 may be performed by the determining component 2848. Accordingly, FIG. 25 relates to a method whereby the UE determines a TBS based on a number of PRBs associated with a first TCI state (excluding the uplink and/or guard-band portions of the SBFD symbols).

Figure 26:
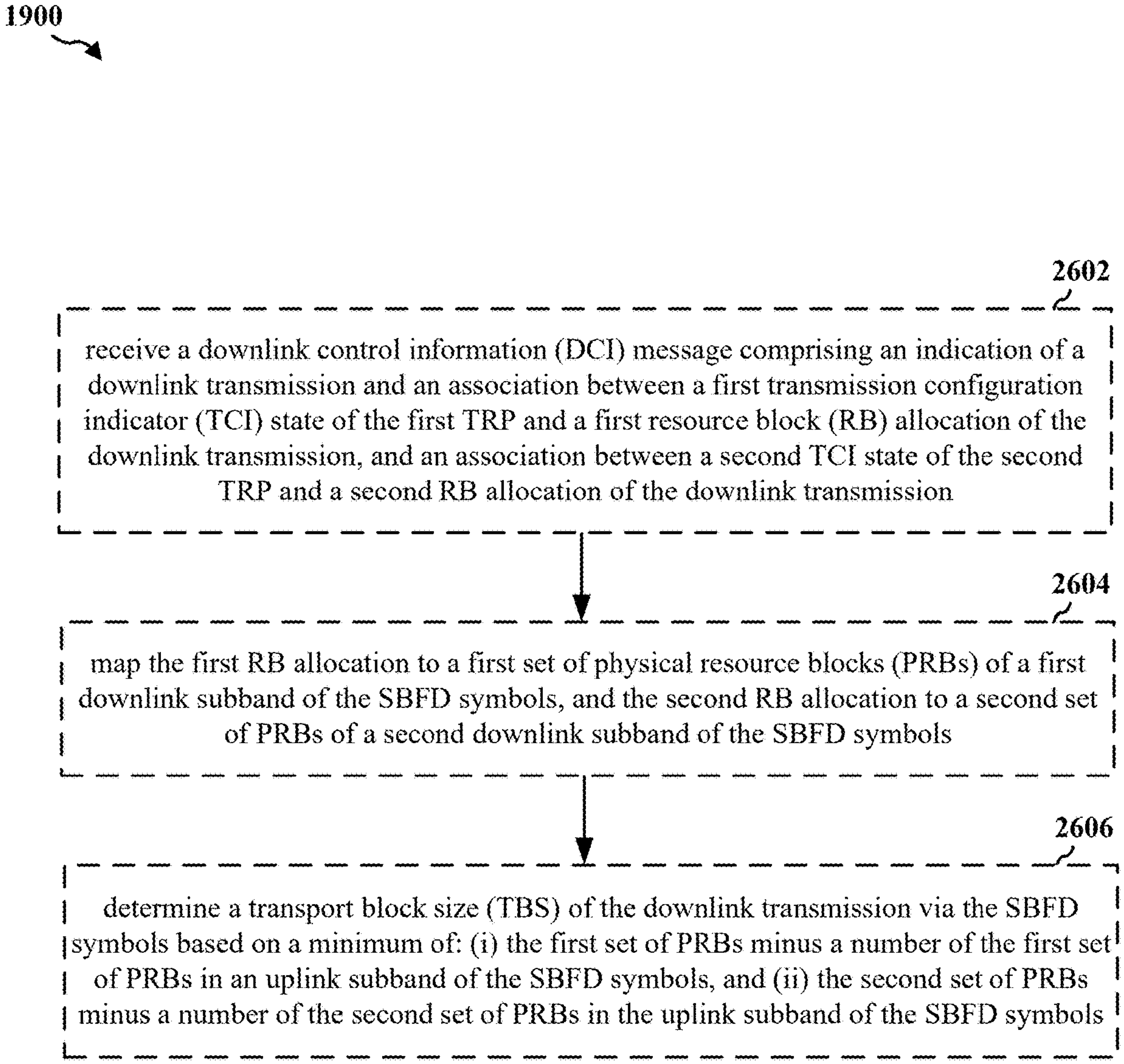
FIG. 26 is another flowchart illustrating additional aspects of the method of wireless communication of FIG. 19.

Referring to FIG. 26, in an alternative or additional aspect the method 1900 may optionally include 2602 where the UE may receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission. For example, 2602 may be performed by the receiving component 2840.

The method 1900 may optionally further include 2604 where the UE may map the first RB allocation to a first set of physical resource blocks (PRBs) of a first downlink subband of the SBFD symbols, and the second RB allocation to a second set of PRBs of a second downlink subband of the SBFD symbols. For example, 2604 may be performed by the mapping component 2852.

The method 1900 may optionally further include 2606 where the UE may determine a transport block size (TBS) of the downlink transmission via the SBFD symbols based on a minimum of: (i) the first set of PRBs minus a number of the first set of PRBs in an uplink subband of the SBFD symbols, and (ii) the second set of PRBs minus a number of the second set of PRBs in the uplink subband of the SBFD symbols. For example, 2606 may be performed by the determining component 2848. Accordingly, FIG. 26 relates to a method whereby the UE determines a TBS based on the lower of the number of PRBs associated with the first TCI state and the second TCI state.

In certain aspects, mapping the first RB allocation and the second RB allocation is based on a determination that a downlink precoding granularity of the first set of PRBs and the second set of PRBs is either wideband or narrowband.

In certain aspects, the wireless configuration further configures the UE for inter-slot downlink repetition via a time-division multiplexing (TDM) scheme, and wherein the wireless configuration further configures the UE with a first transmission configuration indicator (TCI) state repetition pattern for mTRP downlink communication via non-SBFD symbols and the SBFD symbols.

Figure 27:
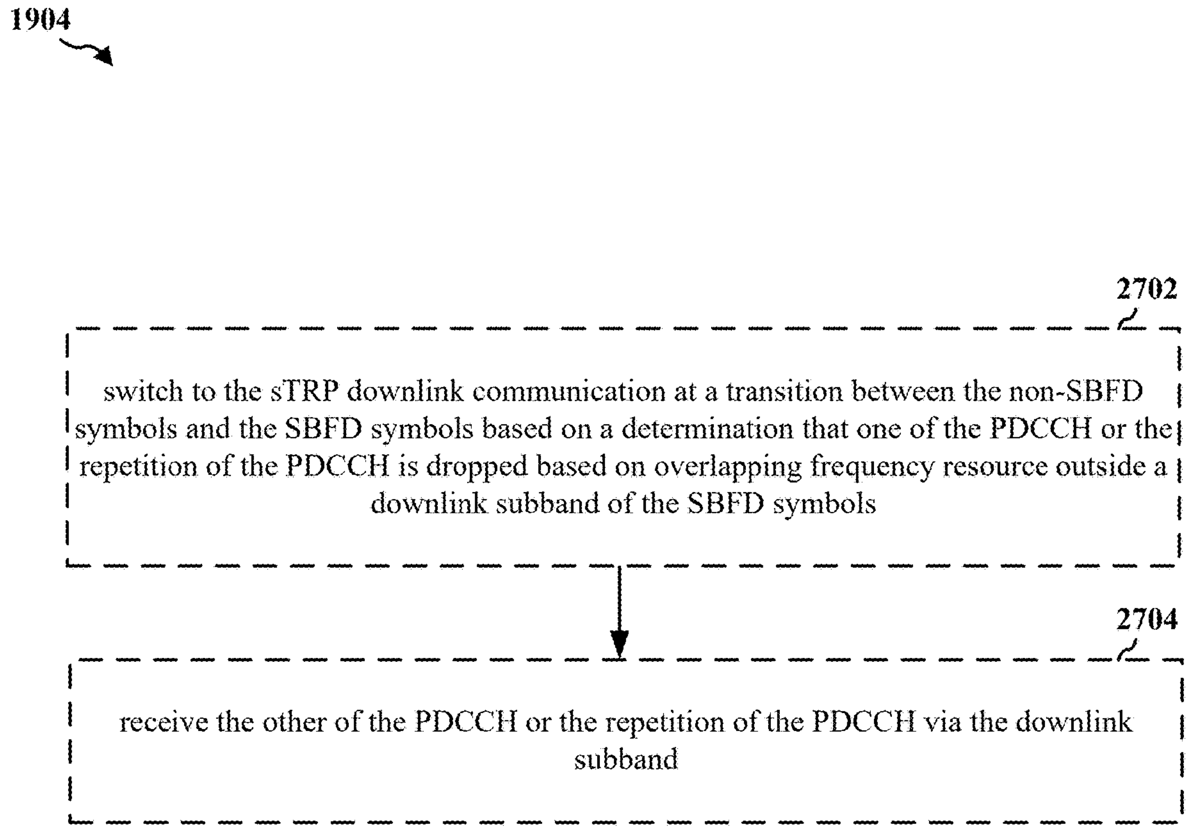
FIG. 27 is another flowchart illustrating additional aspects of the method of wireless communication of FIG. 19.

Referring to FIG. 27, in an alternative or additional aspect the method 1900 at 1904 may optionally include 2702 where the UE may switch to the sTRP downlink communication at a transition between the non-SBFD symbols and the SBFD symbols based on a determination that one of the PDCCH or the repetition of the PDCCH is dropped based on overlapping frequency resource outside a downlink subband of the SBFD symbols. For example, 2702 may be performed by the switching component 2842.

The method 1900 at 1904 may optionally further include 2704 where the UE may receive the other of the PDCCH or the repetition of the PDCCH via the downlink subband. For example, 2704 may be performed by the receiving component 2840. Accordingly, FIG. 27 relates to a method whereby the UE falls back to sTRP and receives a PDCCH not punctured by an UL subband of an SBFD symbol.

Figure 28:
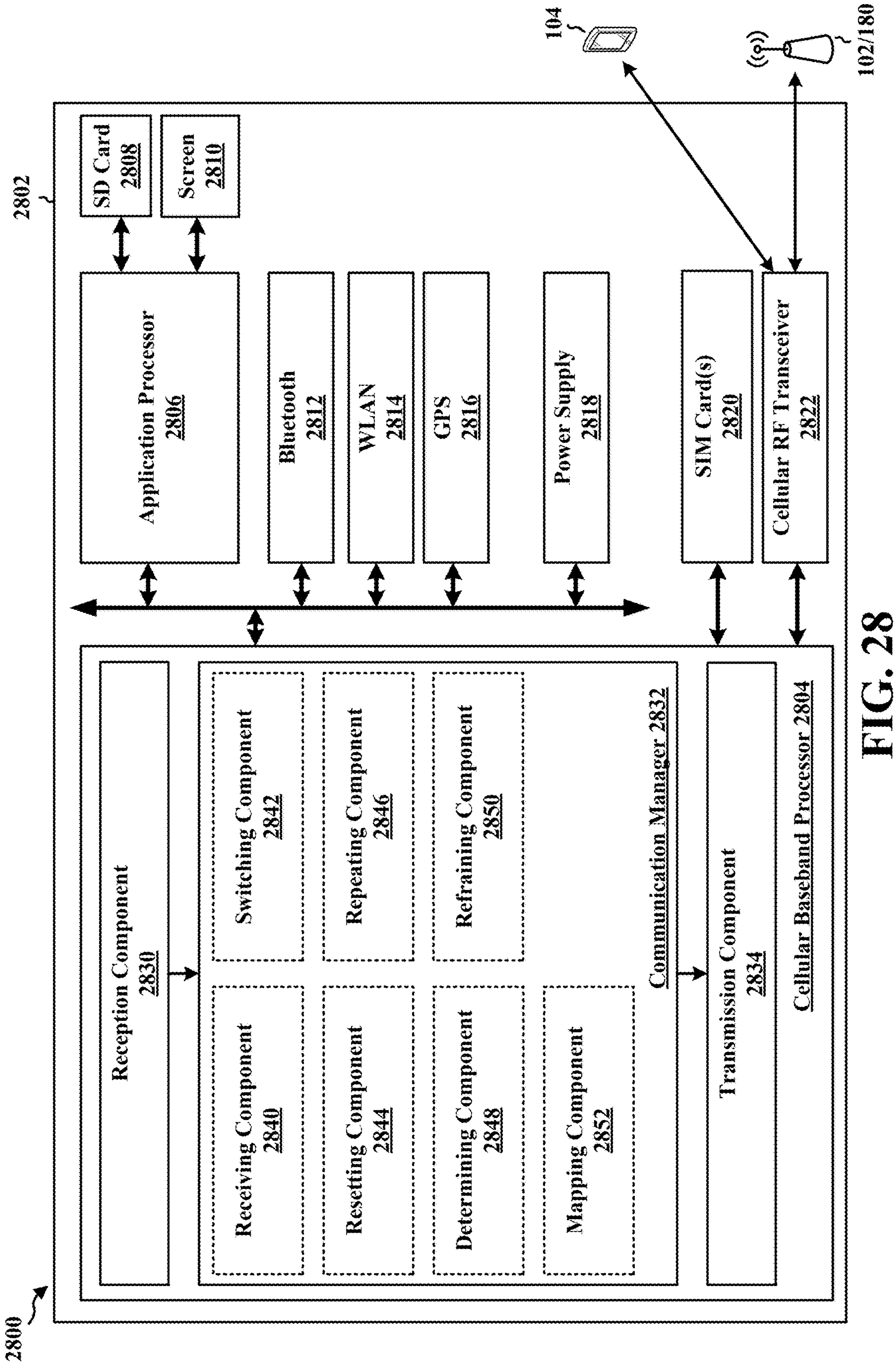
FIG. 28 is a diagram illustrating an example of a hardware implementation for an example apparatus.

FIG. 28 is a diagram 2800 illustrating an example of a hardware implementation for an apparatus 2802. The apparatus 2802 is a UE and includes a cellular baseband processor 2804 (also referred to as a modem) coupled to a cellular RF transceiver 2822 and one or more subscriber identity modules (SIM) cards 2820, an application processor 2806 coupled to a secure digital (SD) card 2808 and a screen 2810, a Bluetooth module 2812, a wireless local area network (WLAN) module 2814, a Global Positioning System (GPS) module 2816, and a power supply 2818. The cellular baseband processor 2804 communicates through the cellular RF transceiver 2822 with the UE 104 and/or BS 102/180. The cellular baseband processor 2804 may include a computer-readable medium/memory. The computer-readable medium/memory may be non-transitory. The cellular baseband processor 2804 is responsible for general processing, including the execution of software stored on the computer-readable medium/memory. The software, when executed by the cellular baseband processor 2804, causes the cellular baseband processor 2804 to perform the various functions described supra. The computer-readable medium/memory may also be used for storing data that is manipulated by the cellular baseband processor 2804 when executing software. The cellular baseband processor 2804 further includes a reception component 2830, a communication manager 2832, and a transmission component 2834. The communication manager 2832 includes the one or more illustrated components. The components within the communication manager 2832 may be stored in the computer-readable medium/memory and/or configured as hardware within the cellular baseband processor 2804. The cellular baseband processor 2804 may be a component of the UE 104 and may include the memory 360 and/or at least one of the TX processor 368, the RX processor 356, and the controller/processor 359. In one configuration, the apparatus 2802 may be a modem chip and include just the baseband processor 2804, and in another configuration, the apparatus 2802 may be the entire UE (e.g., see UE 104 of FIG. 3) and include the aforediscussed additional modules of the apparatus 2802. In various examples, the apparatus 2802 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 2832 includes a receiving component 2840 that is configured to receive, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; receive a downlink signal from one of the first TRP or the second TRP via one or more subbands of the SBFD symbols; receive, from one of the first TRP or the second TRP, a first downlink signal via one or more subbands of the SBFD symbols; receive, from one of the third TRP or the fourth TRP, a second downlink signal via the one or more subbands of the SBFD symbols; receive downlink repetition signals from the one or more of the third TRP or the fourth TRP via the SBFD symbols according to the second TCI state pattern; receive, from the first TRP, a first downlink signal at a first non-SBFD slot; receive, from the second TRP, a repetition of the first downlink signal at a second non-SBFD downlink slot after the first non-SBFD slot, wherein the first non-SBFD slot and the second non-SBFD slot comprise the non-SBFD symbols, and wherein the first downlink signal and the repetition of the first downlink signal are received prior to the switch to sTRP downlink communication; receive, from one of the first TRP or the second TRP, a second downlink signal at a first SBFD slot; receive, from the other of the first TRP or second TRP, a repetition of the second downlink signal at a second SBFD slot; receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; receive, from the first TRP via the SBFD symbols, a downlink signal via the first set of PRBs excluding a number of the first set of PRBs in at least one of an uplink subband or guard-band of the SBFD symbols; receive, from the second TRP via the SBFD symbols, a repetition of the downlink signal via the second set of PRBs excluding a number of the second set of PRBs in at least one of the uplink subband or guard-band of the SBFD symbols, wherein the downlink signal and the repetition of the downlink signal are received simultaneously; receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; and receive the other of the PDCCH or the repetition of the PDCCH via the downlink subband; e.g., as described in connection with FIGS. 19-27.

The communication manager 2832 further includes a switching component 2842 configured to switch, at a transition from the non-SBFD symbols to the SBFD symbols, to the sTRP downlink communication to continue wireless communication via the SBFD symbols, wherein the wireless configuration further configures the UE to receive one or more of the downlink repetitions from one of the first TRP or the second TRP via one or more subbands of the SBFD symbols; switch to the sTRP downlink communication at a transition between the non-SBFD symbols and the SBFD symbols; switch to one or more of the third TRP or the fourth TRP at a transition between the non-SBFD symbols and the SBFD symbols; switch back to the first TRP and the second TRP for mTRP downlink communications via non-SBFD symbols; switch, prior to a transition from the non-SBFD symbols to the SBFD symbols, to the one or more of the third TRP or the fourth TRP to continue mTRP wireless communication via the SBFD symbols; and switch to the sTRP downlink communication at a transition between the non-SBFD symbols and the SBFD symbols based on a determination that one of the PDCCH or the repetition of the PDCCH is dropped based on overlapping frequency resource outside a downlink subband of the SBFD symbols; e.g., as described in connection with FIGS. 19-22 and 27.

The communication manager 2832 further includes a resetting component 2844 configured to reset the first TCI state repetition pattern at a transition from the non-SBFD symbols to the SBFD symbols, e.g., as described in connection with FIG. 19.

The communication manager 2832 further includes a repeating component 2846 configured to continue the first TCI state repetition pattern during a transition from the non-SBFD symbols to the SBFD symbols, e.g., as described in connection with FIG. 19.

The communication manager 2832 further includes a determining component 2848 configured to determine a transport block size (TBS) associated with the downlink signal and the repetition of the downlink signal based on: (i) a minimum of a total number of physical resources blocks (PRBs) associated with the downlink signal and a total number of PRBs associated with the repetition of the downlink signal, or (ii) the total number of PRBs of the repetition of the downlink signal in the SBFD symbols excluding the PRBs outside of downlink SBFD symbols; determine a transport block size (TBS) of the downlink transmission via the SBFD symbols based on the first set of PRBs excluding a number of the first set of PRBs in at least one of an uplink subband or guard-band of the SBFD symbols; determine a transport block size (TBS) of the downlink transmission via the SBFD symbols based on a minimum of: (i) the first set of PRBs minus a number of the first set of PRBs in an uplink subband of the SBFD symbols, and (ii) the second set of PRBs minus a number of the second set of PRBs in the uplink subband of the SBFD symbols; e.g., as described in connection with FIGS. 19, 25, and 26.

The communication manager 2832 further includes a refraining component 2850 configured to refrain from receiving signaling at the second SBFD slot based on the wireless configuration, wherein the first SBFD slot and the second SBFD slot comprise the SBFD symbols, wherein the second downlink signal is received after the switch to the sTRP downlink communication, and wherein the UE receives the repetition of the second downlink signal or refrains from receiving signaling at the second SBFD after the switch to sTRP downlink communication; e.g., as described in connection with FIG. 23.

The communication manager 2832 further includes a mapping component 2852 configured to map the first RB allocation to a first set of physical resource blocks (PRBs) of a first downlink subband of the SBFD symbols, and the second RB allocation to a second set of PRBs of a second downlink subband of the SBFD symbols; map the first RB allocation to a first set of physical resource blocks (PRBs) of a first downlink subband of the SBFD symbols; map the first RB allocation to a first set of physical resource blocks (PRBs) of a first downlink subband of the SBFD symbols, and the second RB allocation to a second set of PRBs of a second downlink subband of the SBFD symbols, e.g., as described in connection with FIGS. 24-26.

The apparatus may include additional components that perform each of the blocks of the algorithm in the aforementioned flowcharts of FIGS. 19-27. As such, each block in the aforementioned flowcharts may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2802, and in particular the cellular baseband processor 2804, includes: means for receiving, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; means for, during the SBFD symbols, switching from the mTRP downlink communication to the sTRP downlink communication or continue the mTRP downlink communication by switching to one or more of the third TRP or the fourth TRP; means for resetting the first TCI state repetition pattern at a transition from the non-SBFD symbols to the SBFD symbols; means for continuing the first TCI state repetition pattern during a transition from the non-SBFD symbols to the SBFD symbols; means for switching, at a transition from the non-SBFD symbols to the SBFD symbols, to the sTRP downlink communication to continue wireless communication via the SBFD symbols, wherein the wireless configuration further configures the UE to receive one or more of the downlink repetitions from one of the first TRP or the second TRP via one or more subbands of the SBFD symbols; means for determining a transport block size (TBS) associated with the downlink signal and the repetition of the downlink signal based on: (i) a minimum of a total number of physical resources blocks (PRBs) associated with the downlink signal and a total number of PRBs associated with the repetition of the downlink signal, or (ii) the total number of PRBs of the repetition of the downlink signal in the SBFD symbols excluding the PRBs outside of downlink SBFD symbols; means for switching to the sTRP downlink communication at a transition between the non-SBFD symbols and the SBFD symbols; means for receiving a downlink signal from one of the first TRP or the second TRP via one or more subbands of the SBFD symbols; means for switching to one or more of the third TRP or the fourth TRP at a transition between the non-SBFD symbols and the SBFD symbols; means for receiving, from one of the first TRP or the second TRP, a first downlink signal via one or more subbands of the SBFD symbols; means for receiving, from one of the third TRP or the fourth TRP, a second downlink signal via the one or more subbands of the SBFD symbols; means for switching back to the first TRP and the second TRP for mTRP downlink communications via non-SBFD symbols; means for switching, prior to a transition from the non-SBFD symbols to the SBFD symbols, to the one or more of the third TRP or the fourth TRP to continue mTRP wireless communication via the SBFD symbols; means for receiving downlink repetition signals from the one or more of the third TRP or the fourth TRP via the SBFD symbols according to the second TCI state pattern; means for receiving, from the first TRP, a first downlink signal at a first non-SBFD slot; means for receiving, from the second TRP, a repetition of the first downlink signal at a second non-SBFD downlink slot after the first non-SBFD slot, wherein the first non-SBFD slot and the second non-SBFD slot comprise the non-SBFD symbols, and wherein the first downlink signal and the repetition of the first downlink signal are received prior to the switch to sTRP downlink communication; means for receiving, from one of the first TRP or the second TRP, a second downlink signal at a first SBFD slot; means for receiving, from the other of the first TRP or second TRP, a repetition of the second downlink signal at a second SBFD slot; means for refraining from receiving signaling at the second SBFD slot based on the wireless configuration, wherein the first SBFD slot and the second SBFD slot comprise the SBFD symbols, wherein the second downlink signal is received after the switch to the sTRP downlink communication, and wherein the UE receives the repetition of the second downlink signal or refrains from receiving signaling at the second SBFD after the switch to sTRP downlink communication; means for receiving a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; means for mapping the first RB allocation to a first set of physical resource blocks (PRBs) of a first downlink subband of the SBFD symbols, and the second RB allocation to a second set of PRBs of a second downlink subband of the SBFD symbols; means for receiving, from the first TRP via the SBFD symbols, a downlink signal via the first set of PRBs excluding a number of the first set of PRBs in at least one of an uplink subband or guard-band of the SBFD symbols; means for receiving, from the second TRP via the SBFD symbols, a repetition of the downlink signal via the second set of PRBs excluding a number of the second set of PRBs in at least one of the uplink subband or guard-band of the SBFD symbols, wherein the downlink signal and the repetition of the downlink signal are received simultaneously; means for receiving a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; means for mapping the first RB allocation to a first set of physical resource blocks (PRBs) of a first downlink subband of the SBFD symbols; means for determining a transport block size (TBS) of the downlink transmission via the SBFD symbols based on the first set of PRBs excluding a number of the first set of PRBs in at least one of an uplink subband or guard-band of the SBFD symbols; means for receiving a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; means for mapping the first RB allocation to a first set of physical resource blocks (PRBs) of a first downlink subband of the SBFD symbols, and the second RB allocation to a second set of PRBs of a second downlink subband of the SBFD symbols; means for determining a transport block size (TBS) of the downlink transmission via the SBFD symbols based on a minimum of: (i) the first set of PRBs minus a number of the first set of PRBs in an uplink subband of the SBFD symbols, and (ii) the second set of PRBs minus a number of the second set of PRBs in the uplink subband of the SBFD symbols; means for switching to the sTRP downlink communication at a transition between the non-SBFD symbols and the SBFD symbols based on a determination that one of the PDCCH or the repetition of the PDCCH is dropped based on overlapping frequency resource outside a downlink subband of the SBFD symbols; and means for receiving the other of the PDCCH or the repetition of the PDCCH via the downlink subband.

The aforementioned means may be one or more of the aforementioned components of the apparatus 2802 configured to perform the functions recited by the aforementioned means. As described supra, the apparatus 2802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 29:
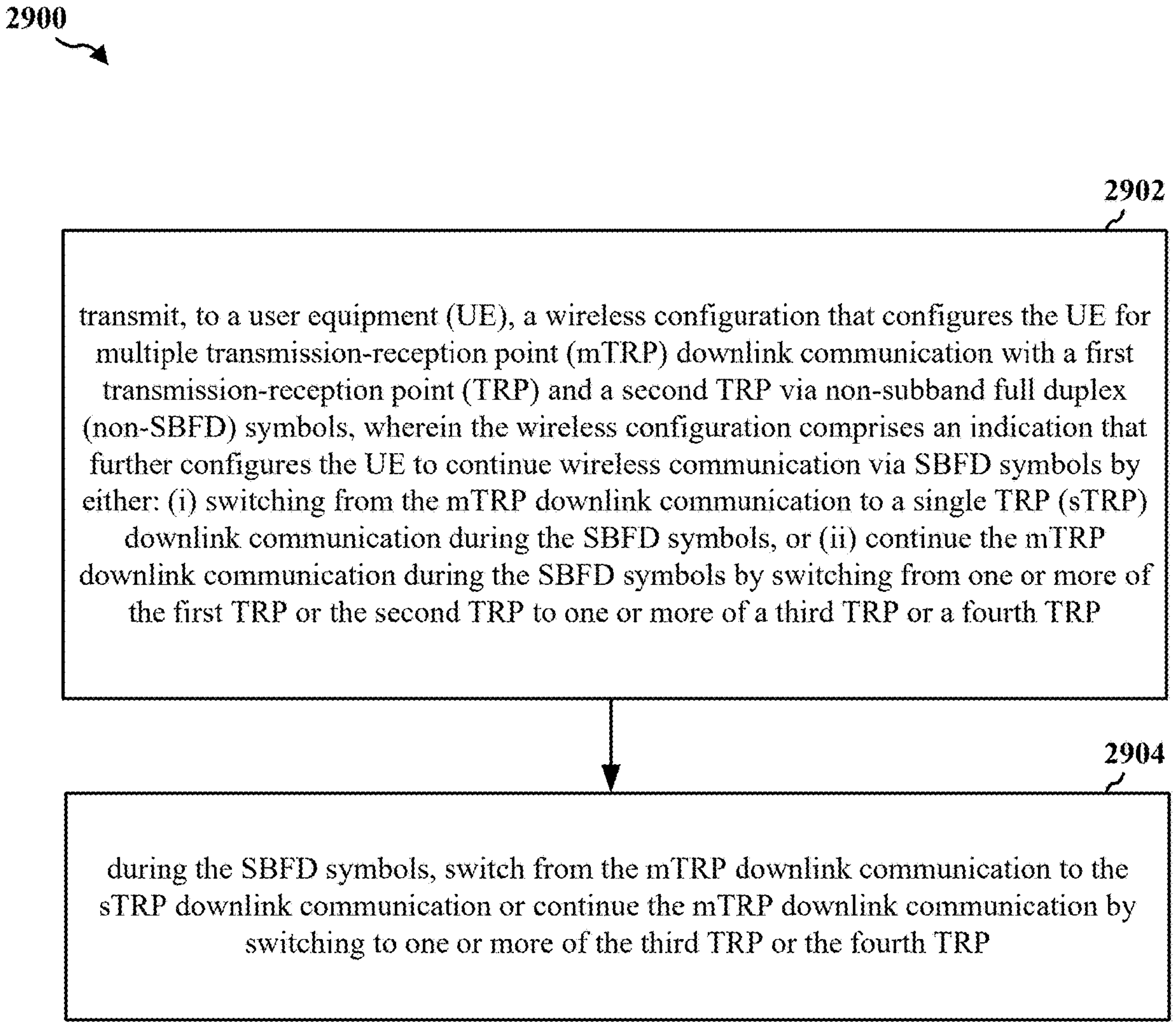
FIG. 29 is a flowchart illustrating a method of wireless communication.

FIG. 29 is a flowchart 2900 of a method of wireless communication. The method may be performed by a base station (e.g., the base station 102/180; the apparatus 3002). Specifically, the method may be performed by one or more processors and memories (e.g., controller/processor 375 and memory 376).

At 2902, the base station may transmit, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP. For example, 2902 may be performed by a transmitting component 3040.

At 2904, the base station may, during the SBFD symbols, switch from the mTRP downlink communication to the sTRP downlink communication or continue the mTRP downlink communication by switching to one or more of the third TRP or the fourth TRP. For example, 2904 may be performed by a switching component 3042.

In certain aspects, the wireless configuration is transmitted via a radio resource control (RRC) message, and wherein the indication that further configures the UE to continue wireless communication via the SBFD symbols is an explicit indication of the RRC message.

In certain aspects, the indication that further configures the UE to continue wireless communication via the SBFD symbols is an implicit indication comprising one or more transmission configuration indicator (TCI) states associated with one or more of the third TRP or the fourth TRP.

In certain aspects, the wireless configuration for mTRP downlink communication comprises an indication of unified TCI states associated with the first TRP and the second TRP for receiving downlink transmissions via the non-SBFD symbols, and wherein the indication that further configures the UE to continue wireless communication via the SBFD symbols comprises the one or more TCI states for receiving downlink transmissions via the SBFD symbols.

In certain aspects, the first TRP, the second TRP, the third TRP, and the fourth TRP are implemented as a first radio unit (RU), a second RU, a third RU, and a fourth RU, respectively, of the base station.

Figure 30:
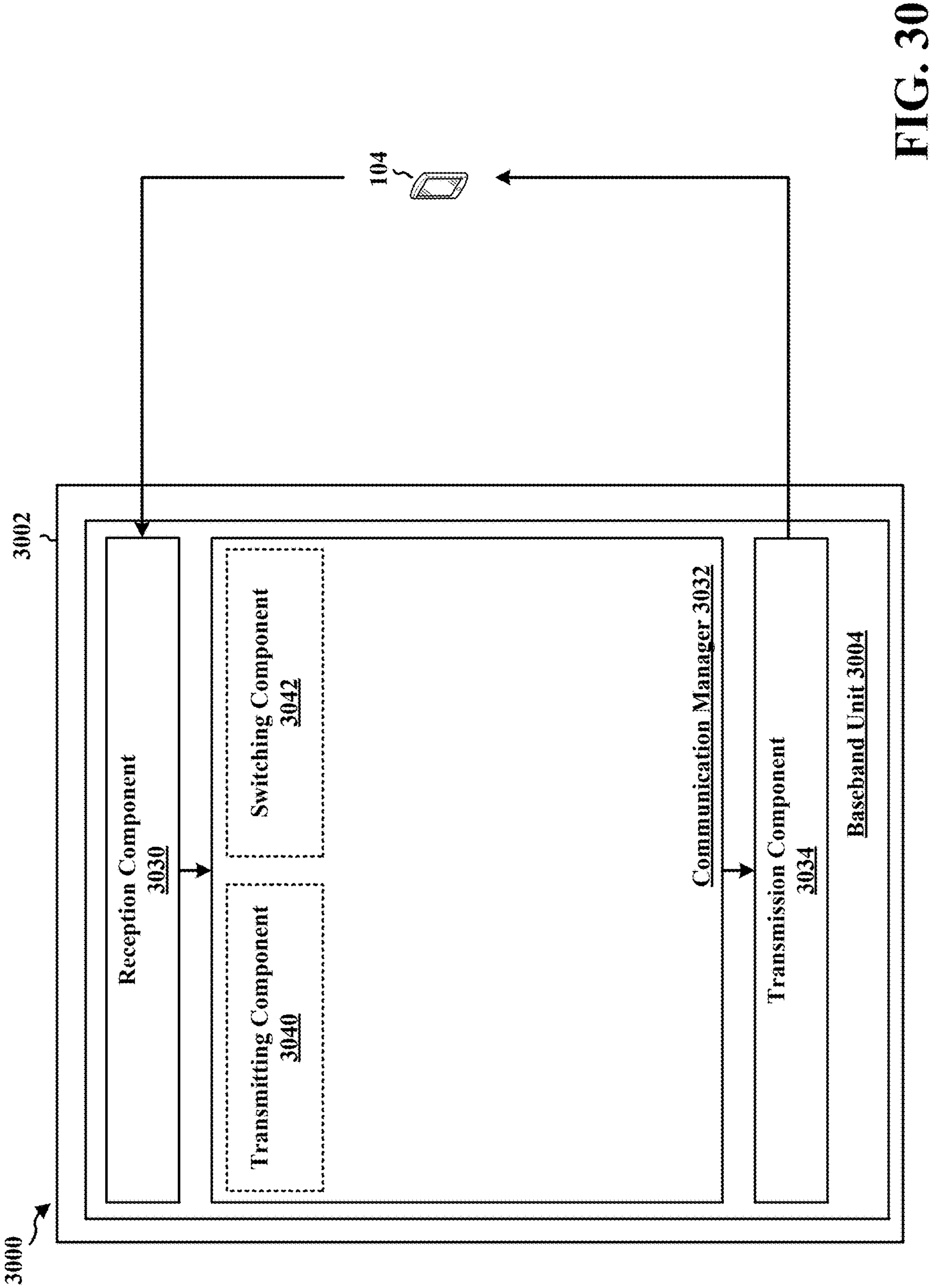
FIG. 30 is a diagram illustrating another example of a hardware implementation for another example apparatus.

FIG. 30 is a diagram 3000 illustrating an example of a hardware implementation for an apparatus 3002. The apparatus 3002 is a BS and includes a baseband unit 3004. The baseband unit 3004 may communicate through a cellular RF transceiver with the UE 104. The baseband unit 3004 may include a computer-readable medium/memory. The baseband unit 3004 is responsible for general processing, including the execution of software stored on the computer-readable medium/memory. The software, when executed by the baseband unit 3004, causes the baseband unit 3004 to perform the various functions described supra. The computer-readable medium/memory may also be used for storing data that is manipulated by the baseband unit 3004 when executing software. The baseband unit 3004 further includes a reception component 3030, a communication manager 3032, and a transmission component 3034. The communication manager 3032 includes the one or more illustrated components. The components within the communication manager 3032 may be stored in the computer-readable medium/memory and/or configured as hardware within the baseband unit 3004. The baseband unit 3004 may be a component of the BS 102/180 and may include the memory 376 and/or at least one of the TX processor 316, the RX processor 370, and the controller/processor 375. In various examples, the apparatus 3002 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 3032 includes a transmitting component 3040 configured to transmit, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; e.g., as described in connection with FIG. 29.

The communication manager 3032 further includes a switching component 3042 configured to, during the SBFD symbols, switch from the mTRP downlink communication to the sTRP downlink communication or continue the mTRP downlink communication by switching to one or more of the third TRP or the fourth TRP; e.g., as described in connection with FIG. 29.

The apparatus may include additional components that perform each of the blocks of the algorithm in the aforementioned flowchart of FIG. 29. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3002, and in particular the baseband unit 3004, includes: means for transmitting, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and means for, during the SBFD symbols, switching from the mTRP downlink communication to the sTRP downlink communication or continue the mTRP downlink communication by switching to one or more of the third TRP or the fourth TRP.

The aforementioned means may be one or more of the aforementioned components of the apparatus 3002 configured to perform the functions recited by the aforementioned means. As described supra, the apparatus 3002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method of wireless communication at a user equipment (UE) comprising: receiving, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and during the SBFD symbols, switching from the mTRP downlink communication to the sTRP downlink communication or continue the mTRP downlink communication by switching to one or more of the third TRP or the fourth TRP.

Example 2 is the method of Example 1, further comprising: switching to the sTRP downlink communication at a transition between the non-SBFD symbols and the SBFD symbols; and receiving a downlink signal from one of the first TRP or the second TRP via one or more subbands of the SBFD symbols.

Example 3 is the method of any of Examples 1 and 2, further comprising: switching to one or more of the third TRP or the fourth TRP at a transition between the non-SBFD symbols and the SBFD symbols; receiving, from one of the first TRP or the second TRP, a first downlink signal via one or more subbands of the SBFD symbols; and receiving, from one of the third TRP or the fourth TRP, a second downlink signal via the one or more subbands of the SBFD symbols.

Example 4 is the method of Example 3, wherein at least one of: the second downlink signal is a repetition of the first downlink signal; the wireless configuration further configures the UE to receive the first downlink signal and the second downlink signal as single frequency network (SFN) downlink transmissions; or the wireless configuration further configures the UE to receive the first downlink signal and the second downlink signal via time-division multiplexing (TDM), frequency-division multiplexing (FDM), or spatial-division multiplexing (SDM).

Example 5 is the method of Example 3, further comprising: switching back to the first TRP and the second TRP for mTRP downlink communications via non-SBFD symbols.

Example 6 is the method of any of Examples 1-5, wherein the wireless configuration is received via a radio resource control (RRC) message, and wherein the indication that further configures the UE to continue wireless communication via the SBFD symbols is an explicit indication of the RRC message.

Example 7 is the method of any of Examples 1-5, wherein the indication that configures the UE to continue wireless communication via the SBFD symbols is an implicit indication comprising one or more transmission configuration indicator (TCI) states associated with one or more of the third TRP or the fourth TRP.

Example 8 is the method of Example 7, wherein the wireless configuration for mTRP downlink communication comprises an indication of unified TCI states associated with the first TRP and the second TRP for receiving downlink transmissions via the non-SBFD symbols, and wherein the indication that configures the UE to continue wireless communication via the SBFD symbols comprises the one or more TCI states for receiving downlink transmissions via the SBFD symbols.

Example 9 is the method of any of Examples 1-8, wherein the wireless configuration further configures the UE for inter-slot downlink repetition via a time-division multiplexing (TDM) scheme, and wherein the wireless configuration further configures the UE with: (i) a first transmission configuration indicator (TCI) state repetition pattern for mTRP downlink communication with the first TRP and the second TRP via non-SBFD symbols, and (ii) a second TCI state pattern for mTRP downlink communication via the SBFD symbols.

Example 10 is the method of Example 9, further comprising: switching, prior to a transition from the non-SBFD symbols to the SBFD symbols, to the one or more of the third TRP or the fourth TRP to continue mTRP wireless communication via the SBFD symbols; and receiving downlink repetition signals from the one or more of the third TRP or the fourth TRP via the SBFD symbols according to the second TCI state pattern.

Example 11 is the method of any of Examples 1-10, wherein the wireless configuration further configures the UE for inter-slot downlink repetition via a time-division multiplexing (TDM) scheme, and wherein the wireless configuration further configures the UE with a first transmission configuration indicator (TCI) state repetition pattern for mTRP downlink communication via non-SBFD symbols and the SBFD symbols.

Example 12 is the method of Example 11, further comprising: resetting the first TCI state repetition pattern at a transition from the non-SBFD symbols to the SBFD symbols; or continuing the first TCI state repetition pattern during a transition from the non-SBFD symbols to the SBFD symbols.

Example 13 is the method of any of Examples 1-12, wherein the wireless configuration further configures the UE for inter-slot downlink repetition via a time-division multiplexing (TDM) scheme, and wherein the wireless configuration further configures the UE to reset a redundancy version (RV) associated with the downlink repetition during a transition from the non-SBFD symbols to the SBFD symbols.

Example 14 is the method of any of Examples 1-13, wherein the wireless configuration further configures the UE for inter-slot downlink repetition via a time-division multiplexing (TDM) scheme, and wherein the method further comprises: switching, at a transition from the non-SBFD symbols to the SBFD symbols, to the sTRP downlink communication to continue wireless communication via the SBFD symbols, wherein the wireless configuration further configures the UE to receive one or more of the downlink repetitions from one of the first TRP or the second TRP via one or more subbands of the SBFD symbols.

Example 15 is the method of Example 14, wherein the downlink repetitions are scheduled across two contiguous slots, and wherein the method further comprises: receiving, from the first TRP, a first downlink signal at a first non-SBFD slot; receiving, from the second TRP, a repetition of the first downlink signal at a second non-SBFD downlink slot after the first non-SBFD slot, wherein the first non-SBFD slot and the second non-SBFD slot comprise the non-SBFD symbols, and wherein the first downlink signal and the repetition of the first downlink signal are received prior to the switch to sTRP downlink communication; receiving, from one of the first TRP or the second TRP, a second downlink signal at a first SBFD slot; and receiving, from the other of the first TRP or second TRP, a repetition of the second downlink signal at a second SBFD slot, or refraining from receiving signaling at the second SBFD slot based on the wireless configuration, wherein the first SBFD slot and the second SBFD slot comprise the SBFD symbols, wherein the second downlink signal is received after the switch to the sTRP downlink communication, and wherein the UE receives the repetition of the second downlink signal or refrains from receiving signaling at the second SBFD after the switch to sTRP downlink communication.

Example 16 is the method of any of Examples 1-15, wherein the SBFD symbols and the non-SBFD symbols are contained within a slot, and wherein the indication further configures the UE to receive a downlink signal and a repetition of the downlink signal via either the SBFD symbols or the non-SBFD symbols of the slot.

Example 17 is the method of any of Examples 1-16, wherein the SBFD symbols and the non-SBFD symbols are contained within a slot, and wherein the indication further configures the UE to receive a downlink signal via the non-SBFD symbols of the slot and receive a repetition of the downlink signal via the SBFD symbols of the slot.

Example 18 is the method of Example 17, further comprising: determining a transport block size (TBS) associated with the downlink signal and the repetition of the downlink signal based on: (i) a minimum of a total number of physical resources blocks (PRBs) associated with the downlink signal and a total number of PRBs associated with the repetition of the downlink signal, or (ii) the total number of PRBs of the repetition of the downlink signal in the SBFD symbols excluding the PRBs outside of downlink SBFD symbols.

Example 19 is the method of any of Examples 1-18, wherein the wireless configuration further configures the UE for downlink repetition via a frequency-division multiplexing (FDM) scheme, and wherein the method further comprises: receiving a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; mapping the first RB allocation to a first set of physical resource blocks (PRBs) of a first downlink subband of the SBFD symbols, and the second RB allocation to a second set of PRBs of a second downlink subband of the SBFD symbols; receiving, from the first TRP via the SBFD symbols, a downlink signal via the first set of PRBs excluding a number of the first set of PRBs in at least one of an uplink subband or guard-band of the SBFD symbols; and receiving, from the second TRP via the SBFD symbols, a repetition of the downlink signal via the second set of PRBs excluding a number of the second set of PRBs in at least one of the uplink subband or guard-band of the SBFD symbols, wherein the downlink signal and the repetition of the downlink signal are received simultaneously.

Example 20 is the method of Example 19, wherein mapping the first RB allocation and the second RB allocation is based on a determination that a downlink precoding granularity of the first set of PRBs and the second set of PRBs is either wideband or narrowband.

Example 21 is the method of any of Examples 1-20, wherein the wireless configuration further configures the UE for downlink repetition via a frequency-division multiplexing (FDM) scheme, and wherein the method further comprises: receiving a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; mapping the first RB allocation to a first set of physical resource blocks (PRBs) of a first downlink subband of the SBFD symbols; and determining a transport block size (TBS) of the downlink transmission via the SBFD symbols based on the first set of PRBs excluding a number of the first set of PRBs in at least one of an uplink subband or guard-band of the SBFD symbols.

Example 22 is the method of any of Examples 1-21, wherein the wireless configuration further configures the UE for downlink repetition via a frequency-division multiplexing (FDM) scheme, and wherein the method further comprises: receiving a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission; mapping the first RB allocation to a first set of physical resource blocks (PRBs) of a first downlink subband of the SBFD symbols, and the second RB allocation to a second set of PRBs of a second downlink subband of the SBFD symbols; and determining a transport block size (TBS) of the downlink transmission via the SBFD symbols based on a minimum of: (i) the first set of PRBs minus a number of the first set of PRBs in an uplink subband of the SBFD symbols, and (ii) the second set of PRBs minus a number of the second set of PRBs in the uplink subband of the SBFD symbols.

Example 23 is the method of any of Examples 1-22, wherein the wireless configuration further configures the UE to receive a physical downlink control channel (PDCCH) from the first TRP via a first search space (SS) and receive a repetition of the PDCCH from the second TRP via a second SS linked to the first SS, and wherein the method further comprises: switching to the sTRP downlink communication at a transition between the non-SBFD symbols and the SBFD symbols based on a determination that one of the PDCCH or the repetition of the PDCCH is dropped based on overlapping frequency resource outside a downlink subband of the SBFD symbols; and receiving the other of the PDCCH or the repetition of the PDCCH via the downlink subband.

Example 24 is a method for wireless communication at a base station, comprising: transmitting, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and during the SBFD symbols, switching from the mTRP downlink communication to the sTRP downlink communication or continue the mTRP downlink communication by switching to one or more of the third TRP or the fourth TRP.

Example 25 is the method of Example 24, wherein the wireless configuration is transmitted via a radio resource control (RRC) message, and wherein the indication that further configures the UE to continue wireless communication via the SBFD symbols is an explicit indication of the RRC message.

Example 26 is the method of Example 24, wherein the indication that further configures the UE to continue wireless communication via the SBFD symbols is an implicit indication comprising one or more transmission configuration indicator (TCI) states associated with one or more of the third TRP or the fourth TRP.

Example 27 is the method of Example 26, wherein the wireless configuration for mTRP downlink communication comprises an indication of unified TCI states associated with the first TRP and the second TRP for receiving downlink transmissions via the non-SBFD symbols, and wherein the indication that further configures the UE to continue wireless communication via the SBFD symbols comprises the one or more TCI states for receiving downlink transmissions via the SBFD symbols.

Example 28 is the method of any of Examples 24-27, wherein the first TRP, the second TRP, the third TRP, and the fourth TRP are implemented as a first radio unit (RU), a second RU, a third RU, and a fourth RU, respectively, of the base station.

Example 29 is a user equipment (UE) comprising: one or more memories, individually or in combination, having instructions; and one or more processors, individually or in combination, configured to execute the instructions and cause the UE to perform the method of any of Examples 1-23.

Example 30 is a base station comprising: one or more memories, individually or in combination, having instructions; and one or more processors, individually or in combination, configured to execute the instructions and cause the base station to perform the method of any of Examples 24-28.

Example 31 is a user equipment (UE) comprising: one or more means for performing the method of any of Examples 1-23.

Example 32 is a base station comprising: one or more means for performing the method of any of Examples 24-28.

Example 33 is a non-transitory, computer-readable medium comprising computer executable code, the code when executed by one or more processors causes the one or more processors to, individually or in combination, perform the method of any of Examples 1-23 for wireless communication by a user equipment (UE).

Example 34 is a non-transitory, computer-readable medium comprising computer executable code, the code when executed by one or more processors causes the one or more processors to, individually or in combination, perform the method of any of Examples 24-28 for wireless communication by a base station.

What is claimed is:

1. A user equipment (UE) for wireless communication, comprising:

one or more memories having instructions; and one or more processors configured to execute the instructions and cause the UE to:

receive, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and during the SBFD symbols, switch from the mTRP downlink communication to the sTRP downlink communication or continue the mTRP downlink communication by switching from the one or more of the first TRP or the second TRP to the one or more of the third TRP or the fourth TRP.

2. The UE of claim 1, wherein the one or more processors are further configured to cause the UE to:

switch to the sTRP downlink communication at a transition between the non-SBFD symbols and the SBFD symbols; and receive a downlink signal from one of the first TRP or the second TRP via one or more subbands of the SBFD symbols.

3. The UE of claim 1, wherein the one or more processors are further configured to cause the UE to:

switch to the one or more of the third TRP or the fourth TRP at a transition between the non-SBFD symbols and the SBFD symbols;

receive, from one of the first TRP or the second TRP, a first downlink signal via one or more subbands of the SBFD symbols; and receive, from one of the third TRP or the fourth TRP, a second downlink signal via the one or more subbands of the SBFD symbols.

4. The UE of claim 3, wherein at least one of:

the second downlink signal is a repetition of the first downlink signal;

the wireless configuration further configures the UE to receive the first downlink signal and the second downlink signal as single frequency network (SFN) downlink transmissions; or the wireless configuration further configures the UE to receive the first downlink signal and the second downlink signal via time-division multiplexing (TDM), frequency-division multiplexing (FDM), or spatial-division multiplexing (SDM).

5. The UE of claim 3, wherein the one or more processors are further configured to cause the UE to:

switch back to the one or more of the first TRP or the second TRP from the one or more of the third TRP or the fourth TRP for mTRP downlink communications via non-SBFD symbols.

6. The UE of claim 1, wherein the wireless configuration is received via a radio resource control (RRC) message, and wherein the indication that further configures the UE to continue wireless communication via the SBFD symbols is an explicit indication of the RRC message.

7. The UE of claim 1, wherein the indication that configures the UE to continue wireless communication via the SBFD symbols is an implicit indication comprising one or more transmission configuration indicator (TCI) states associated with one or more of the third TRP or the fourth TRP.

8. The UE of claim 7, wherein the wireless configuration for mTRP downlink communication comprises an indication of unified TCI states associated with the first TRP and the second TRP for receiving downlink transmissions via the non-SBFD symbols, and wherein the indication that configures the UE to continue wireless communication via the SBFD symbols comprises the one or more TCI states for receiving downlink transmissions via the SBFD symbols.

9. The UE of claim 1, wherein the wireless configuration further configures the UE for inter-slot downlink repetition via a time-division multiplexing (TDM) scheme, and wherein the wireless configuration further configures the UE with: (i) a first transmission configuration indicator (TCI) state repetition pattern for mTRP downlink communication with the first TRP and the second TRP via the non-SBFD symbols, and (ii) a second TCI state pattern for mTRP downlink communication via the SBFD symbols.

10. The UE of claim 9, wherein the one or more processors are further configured to cause the UE to:

switch, prior to a transition from the non-SBFD symbols to the SBFD symbols, to the one or more of the third TRP or the fourth TRP to continue mTRP wireless communication via the SBFD symbols; and receive downlink repetition signals from the one or more of the third TRP or the fourth TRP via the SBFD symbols according to the second TCI state pattern.

11. The UE of claim 1, wherein the wireless configuration further configures the UE for inter-slot downlink repetition via a time-division multiplexing (TDM) scheme, and wherein the wireless configuration further configures the UE with a first transmission configuration indicator (TCI) state repetition pattern for mTRP downlink communication via the non-SBFD symbols and the SBFD symbols.

12. The UE of claim 11, wherein the one or more processors are further configured to cause the UE to:

reset the first TCI state repetition pattern at a transition from the non-SBFD symbols to the SBFD symbols; or continue the first TCI state repetition pattern during a transition from the non-SBFD symbols to the SBFD symbols.

13. The UE of claim 1, wherein the wireless configuration further configures the UE for inter-slot downlink repetition via a time-division multiplexing (TDM) scheme, and wherein the wireless configuration further configures the UE to reset a redundancy version (RV) associated with the inter-slot downlink repetition during a transition from the non-SBFD symbols to the SBFD symbols.

14. The UE of claim 1, wherein the wireless configuration further configures the UE for inter-slot downlink repetitions via a time-division multiplexing (TDM) scheme, and wherein the one or more processors are further configured to cause the UE to perform the switch, at a transition from the non-SBFD symbols to the SBFD symbols, to the sTRP downlink communication to continue wireless communication via the SBFD symbols, wherein the wireless configuration further configures the UE to receive one or more of the downlink repetitions from one of the first TRP or the second TRP via one or more subbands of the SBFD symbols.

15. The UE of claim 14, wherein the downlink repetitions are scheduled across two contiguous slots, and wherein the one or more processors are further configured to cause the UE to:

receive, from the first TRP, a first downlink signal at a first non-SBFD slot;

receive, from the second TRP, a repetition of the first downlink signal at a second non-SBFD downlink slot after the first non-SBFD slot, wherein the first non-SBFD slot and the second non-SBFD downlink slot comprise the non-SBFD symbols, and wherein the first downlink signal and the repetition of the first downlink signal are received prior to the switch to the sTRP downlink communication;

receive, from the first TRP, a second downlink signal at a first SBFD slot; and receive, from the second TRP, a repetition of the second downlink signal at a second SBFD slot, or refrain from receiving signaling at the second SBFD slot based on the wireless configuration, wherein the first SBFD slot and the second SBFD slot comprise the SBFD symbols, wherein the second downlink signal is received after the switch to the sTRP downlink communication, and wherein the UE receives the repetition of the second downlink signal or refrains from receiving signaling at the second SBFD slot after the switch to the sTRP downlink communication.

16. The UE of claim 1, wherein the SBFD symbols and the non-SBFD symbols are contained within a slot, and wherein the indication further configures the UE to receive a downlink signal and a repetition of the downlink signal via either the SBFD symbols or the non-SBFD symbols of the slot.

17. The UE of claim 1, wherein the SBFD symbols and the non-SBFD symbols are contained within a slot, and wherein the indication further configures the UE to receive a downlink signal via the non-SBFD symbols of the slot and receive a repetition of the downlink signal via the SBFD symbols of the slot.

18. The UE of claim 17, wherein the one or more processors are further configured to cause the UE to:

determine a transport block size (TBS) associated with the downlink signal and the repetition of the downlink signal based on: (i) a minimum of a total number of physical resources blocks (PRBs) associated with the downlink signal and a total number of PRBs associated with the repetition of the downlink signal, or (ii) a total number of PRBs associated with the repetition of the downlink signal in the SBFD symbols excluding PRBs outside of downlink SBFD symbols.

19. The UE of claim 1, wherein the wireless configuration further configures the UE for downlink repetition via a frequency-division multiplexing (FDM) scheme, and wherein the one or more processors are further configured to cause the UE to:

receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission;

map the first RB allocation to a first set of physical resource blocks (PRBs) of a first downlink subband of the SBFD symbols, and the second RB allocation to a second set of PRBs of a second downlink subband of the SBFD symbols;

receive, from the first TRP via the SBFD symbols, a downlink signal via the first set of PRBs excluding a number of the first set of PRBs in at least one of an uplink subband or guard-band of the SBFD symbols; and receive, from the second TRP via the SBFD symbols, a repetition of the downlink signal via the second set of PRBs excluding a number of the second set of PRBs in at least one of the uplink subband or guard-band of the SBFD symbols, wherein the downlink signal and the repetition of the downlink signal are received simultaneously.

20. The UE of claim 19, wherein the mapping of the first RB allocation and the second RB allocation is based on a downlink precoding granularity of the first set of PRBs and the second set of PRBs being either wideband or narrowband.

21. The UE of claim 1, wherein the wireless configuration further configures the UE for downlink repetition via a frequency-division multiplexing (FDM) scheme, and wherein the one or more processors are further configured to cause the UE to:

receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission;

map the first RB allocation to a first set of physical resource blocks (PRBs) of a first downlink subband of the SBFD symbols; and determine a transport block size (TBS) of the downlink transmission via the SBFD symbols based on the first set of PRBs excluding a number of the first set of PRBs in at least one of an uplink subband or guard-band of the SBFD symbols.

22. The UE of claim 1, wherein the wireless configuration further configures the UE for downlink repetition via a frequency-division multiplexing (FDM) scheme, and wherein the one or more processors are further configured to cause the UE to:

receive a downlink control information (DCI) message comprising an indication of a downlink transmission and an association between a first transmission configuration indicator (TCI) state of the first TRP and a first resource block (RB) allocation of the downlink transmission, and an association between a second TCI state of the second TRP and a second RB allocation of the downlink transmission;

map the first RB allocation to a first set of physical resource blocks (PRBs) of a first downlink subband of the SBFD symbols, and the second RB allocation to a second set of PRBs of a second downlink subband of the SBFD symbols; and determine a transport block size (TBS) of the downlink transmission via the SBFD symbols based on a minimum of: (i) the first set of PRBs minus a number of the first set of PRBs in an uplink subband of the SBFD symbols, and (ii) the second set of PRBs minus a number of the second set of PRBs in the uplink subband of the SBFD symbols.

23. The UE of claim 1, wherein the wireless configuration further configures the UE to receive a physical downlink control channel (PDCCH) from the first TRP via a first search space (SS) and receive a repetition of the PDCCH from the second TRP via a second SS linked to the first SS, and wherein the one or more processors are further configured to cause the UE to:

drop one of the PDCCH or the repetition of the PDCCH based on an overlapping frequency resource outside a downlink subband of the SBFD symbols;

switch to the sTRP downlink communication at a transition between the non-SBFD symbols and the SBFD symbols based on the drop; and receive the other of the PDCCH or the repetition of the PDCCH that was not dropped via the downlink subband.

24. A base station configured for wireless communication, comprising:

one or more memories having instructions; and one or more processors configured to execute the instructions and cause the base station to:

transmit, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and during the SBFD symbols, switch from the mTRP downlink communication to the sTRP downlink communication or continue the mTRP downlink communication by switching from the one or more of the first TRP or the second TRP to the one or more of the third TRP or the fourth TRP.

25. The base station of claim 24, wherein the wireless configuration is transmitted via a radio resource control (RRC) message, and wherein the indication that further configures the UE to continue wireless communication via the SBFD symbols is an explicit indication of the RRC message.

26. The base station of claim 24, wherein the indication that further configures the UE to continue wireless communication via the SBFD symbols is an implicit indication comprising one or more transmission configuration indicator (TCI) states associated with one or more of the third TRP or the fourth TRP.

27. The base station of claim 26, wherein the wireless configuration for mTRP downlink communication comprises an indication of unified TCI states associated with the first TRP and the second TRP for receiving downlink transmissions via the non-SBFD symbols, and wherein the indication that further configures the UE to continue wireless communication via the SBFD symbols comprises the one or more TCI states for receiving downlink transmissions via the SBFD symbols.

28. The base station of claim 24, wherein the first TRP, the second TRP, the third TRP, and the fourth TRP are implemented as a first radio unit (RU), a second RU, a third RU, and a fourth RU, respectively, of the base station.

29. A method of wireless communication at a user equipment (UE), comprising:

receiving, from a network entity, a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and during the SBFD symbols, switching from the mTRP downlink communication to the sTRP downlink communication or continue the mTRP downlink communication by switching from the one or more of the first TRP or the second TRP to the one or more of the third TRP or the fourth TRP.

30. A method of wireless communication at base station, comprising:

transmitting, to a user equipment (UE), a wireless configuration that configures the UE for multiple transmission-reception point (mTRP) downlink communication with a first transmission-reception point (TRP) and a second TRP via non-subband full duplex (non-SBFD) symbols, wherein the wireless configuration comprises an indication that further configures the UE to continue wireless communication via SBFD symbols by either: (i) switching from the mTRP downlink communication to a single TRP (sTRP) downlink communication during the SBFD symbols, or (ii) continue the mTRP downlink communication during the SBFD symbols by switching from one or more of the first TRP or the second TRP to one or more of a third TRP or a fourth TRP; and during the SBFD symbols, switching from the mTRP downlink communication to the sTRP downlink communication or continue the mTRP downlink communication by switching from the one or more of the first TRP or the second TRP to the one or more of the third TRP or the fourth TRP.

* * * * *